United States Patent
Uragami et al.

(10) Patent No.: US 12,146,802 B2
(45) Date of Patent: Nov. 19, 2024

(54) CAPACITANCE-BASED LOAD SENSOR FOR DETECTING EXTERNALLY APPLIED FORCES

(71) Applicant: Panasonic Intellectual Property Management Co., Ltd., Osaka (JP)

(72) Inventors: Susumu Uragami, Osaka (JP); Hiroyuki Furuya, Osaka (JP); Yuta Moriura, Osaka (JP); Takashi Matsumoto, Osaka (JP); Hironobu Ukitsu, Osaka (JP); Yodai Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 260 days.

(21) Appl. No.: 17/874,795

(22) Filed: Jul. 27, 2022

(65) Prior Publication Data
US 2022/0357220 A1 Nov. 10, 2022

Related U.S. Application Data

(63) Continuation of application No. PCT/JP2020/047064, filed on Dec. 16, 2020.

(30) Foreign Application Priority Data

Jan. 27, 2020 (JP) ................................. 2020-011204
Feb. 10, 2020 (JP) ................................. 2020-020491
Jun. 8, 2020 (JP) ................................. 2020-099701

(51) Int. Cl.
*G01L 1/14* (2006.01)
*G01L 5/00* (2006.01)

(52) U.S. Cl.
CPC .............. *G01L 1/14* (2013.01); *G01L 5/0038* (2013.01)

(58) Field of Classification Search
CPC .................................. G01L 1/14; G01L 1/146
See application file for complete search history.

(56) References Cited

U.S. PATENT DOCUMENTS

| 5,209,126 A | * | 5/1993 | Grahn | ..................... G01L 1/255 |
| | | | | 73/862.68 |
| 8,451,013 B1 | * | 5/2013 | Hsiao | ..................... B29C 70/54 |
| | | | | 324/609 |

(Continued)

FOREIGN PATENT DOCUMENTS

| GB | 2443208 A | 4/2008 |
| JP | S63-136416 A | 6/1988 |

(Continued)

OTHER PUBLICATIONS

International Search Report issued in corresponding International Patent Application No. PCT/JP2020/047064, dated Jan. 26, 2021, with English translation.

*Primary Examiner* — Tran M. Tran
(74) *Attorney, Agent, or Firm* — Rimon P.C.

(57) ABSTRACT

A load sensor includes: a first base member and a second base member disposed so as to face each other; an electrically-conductive elastic body disposed on an opposing face of the first base member; and a conductor wire disposed between the second base member and the electrically-conductive elastic body and configured as a plurality of element wires being twisted. Each element wire is configured as an electrically-conductive member which has a linear shape and of which the surface is covered by a dielectric body. A twist pitch of the plurality of element wires satisfies a conditional expression "$p \leq 12nd$". In the expression, p is the twist pitch of the plurality of element wires, n is the number of the element wires included in the conductor wire and d is the outer diameter of each element wire.

5 Claims, 32 Drawing Sheets

(56) References Cited

U.S. PATENT DOCUMENTS

| | | | | |
|---|---|---|---|---|
| 8,621,942 B2* | 1/2014 | Sleeman | ................ | G01L 1/146 |
| | | | | 73/862.626 |
| 8,933,330 B2* | 1/2015 | Hayashishita | ....... | H01B 7/0009 |
| | | | | 174/28 |
| 10,663,360 B2* | 5/2020 | Ibrocevic | .................. | G01L 1/26 |
| 10,908,034 B2* | 2/2021 | Moriura | ................ | B62D 1/046 |
| 11,150,147 B2* | 10/2021 | Horter | ..................... | G01L 1/146 |
| 11,421,974 B2* | 8/2022 | Kon | ......................... | G01B 7/18 |
| 11,740,141 B2* | 8/2023 | Uragami | ................ | G01L 1/144 |
| | | | | 73/862.626 |
| 2001/0020714 A1 | 9/2001 | Kraetzl et al. | | |
| 2012/0105370 A1* | 5/2012 | Moore | ................. | G06F 3/0445 |
| | | | | 345/174 |
| 2015/0294756 A1* | 10/2015 | Ben Shalom | ........... | G01L 1/246 |
| | | | | 28/169 |
| 2019/0241204 A1* | 8/2019 | Uematsu | ................ | B62D 1/065 |
| 2019/0277713 A1* | 9/2019 | Moriura | ................... | B62D 1/06 |
| 2024/0282476 A1* | 8/2024 | Kumada | ................ | H01B 7/187 |

FOREIGN PATENT DOCUMENTS

| | | | | |
|---|---|---|---|---|
| JP | 2010-256270 A | | 11/2010 | |
| JP | 2011-163889 A | | 8/2011 | |
| JP | 5405766 B2 * | | 2/2014 | |
| WO | WO-2018096901 A1 * | | 5/2018 | ............... B62D 1/04 |

* cited by examiner

FIG. 1A  EMBODIMENT 1
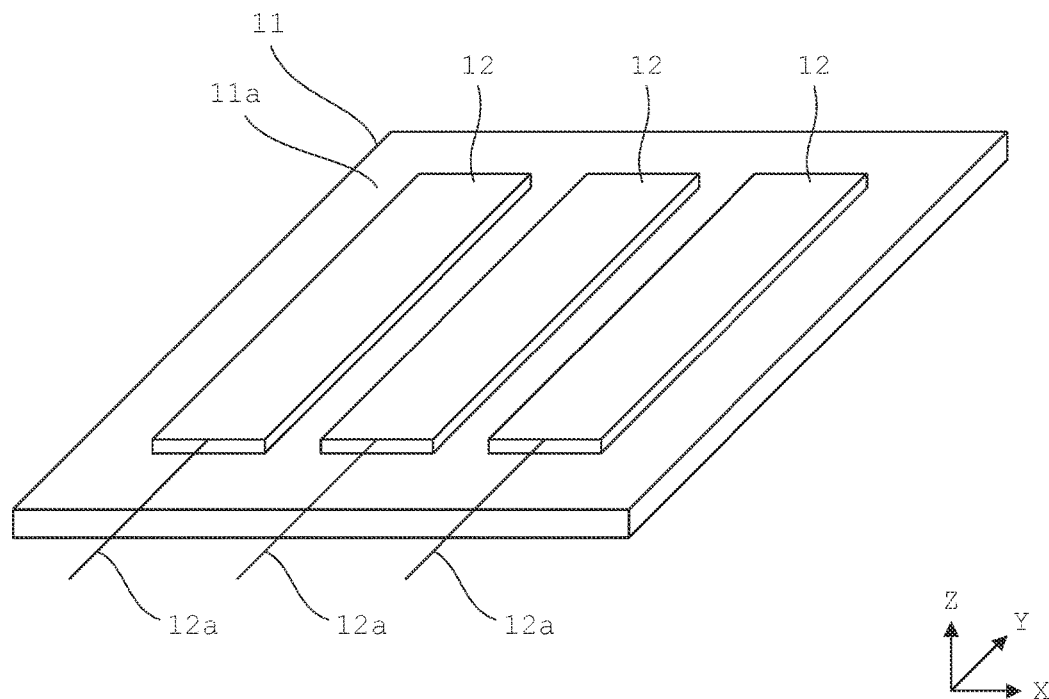
FIG. 1B
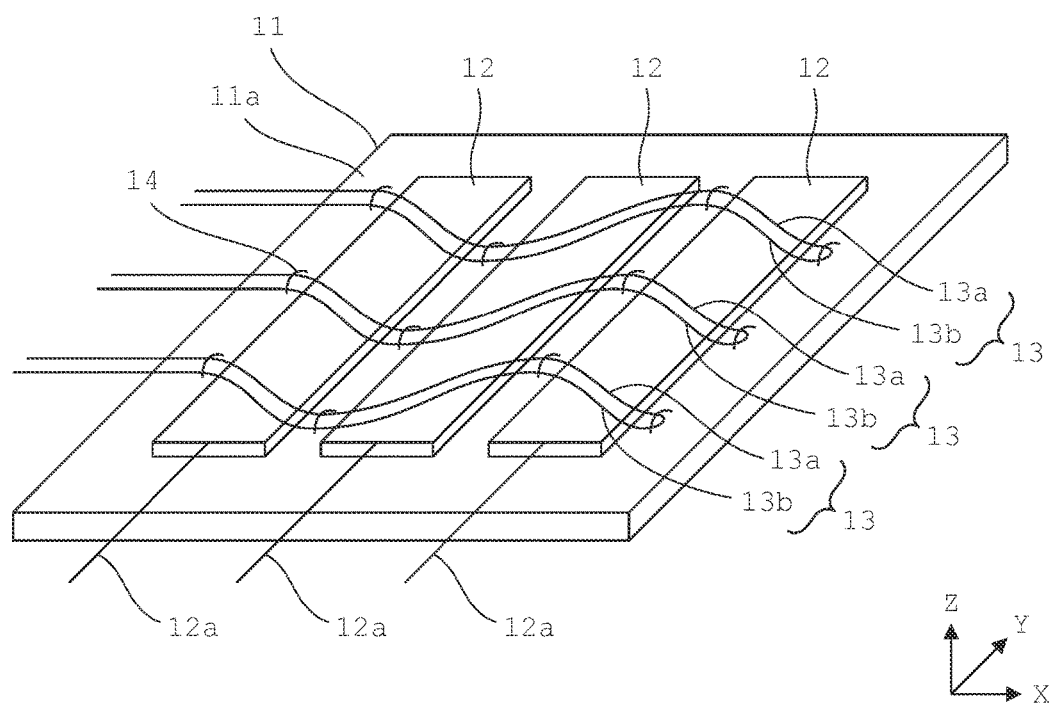

*FIG. 6A*  COMPARATIVE EXAMPLE 1
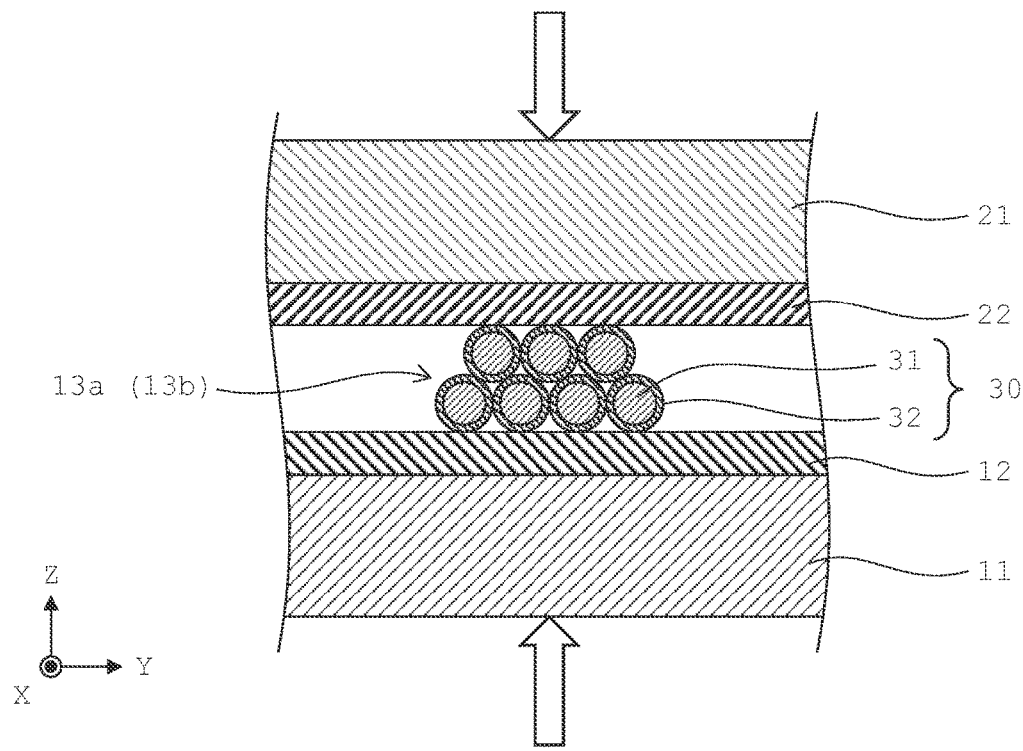
*FIG. 6B*  COMPARATIVE EXAMPLE 1
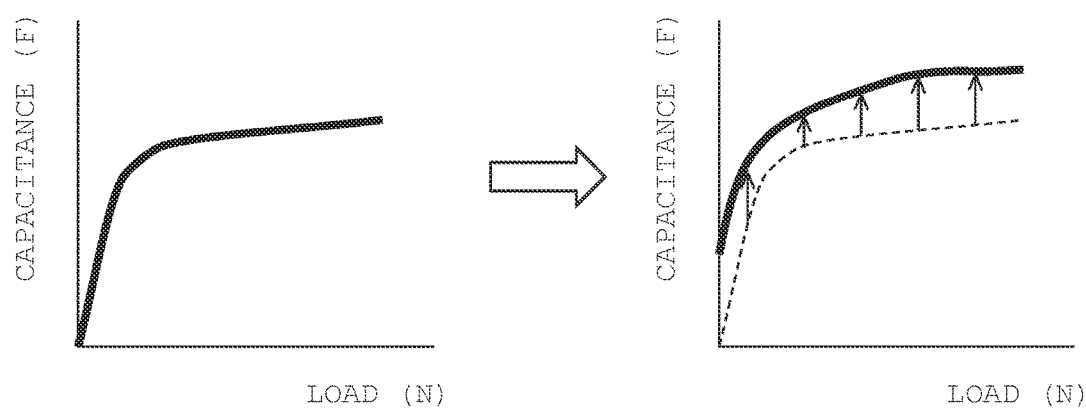

| ELEMENT WIRE | | 12nd | TWIST PITCH p | | | | |
|---|---|---|---|---|---|---|---|
| OUTER DIAMETER d (mm) | NUMBER n | | 3 (mm) | 5 (mm) | 10 (mm) | 15 (mm) | 20 (mm) |
| 0.055 | 7 | 4.6 | ○ | × | × | × | × |
| 0.073 | 11 | 9.6 | — | ○ | × | × | × |
| 0.105 | 15 | 18.9 | — | — | ○ | ○ | × |

FIG. 7B  EMBODIMENT 1

FIG. 8 EMBODIMENT 2
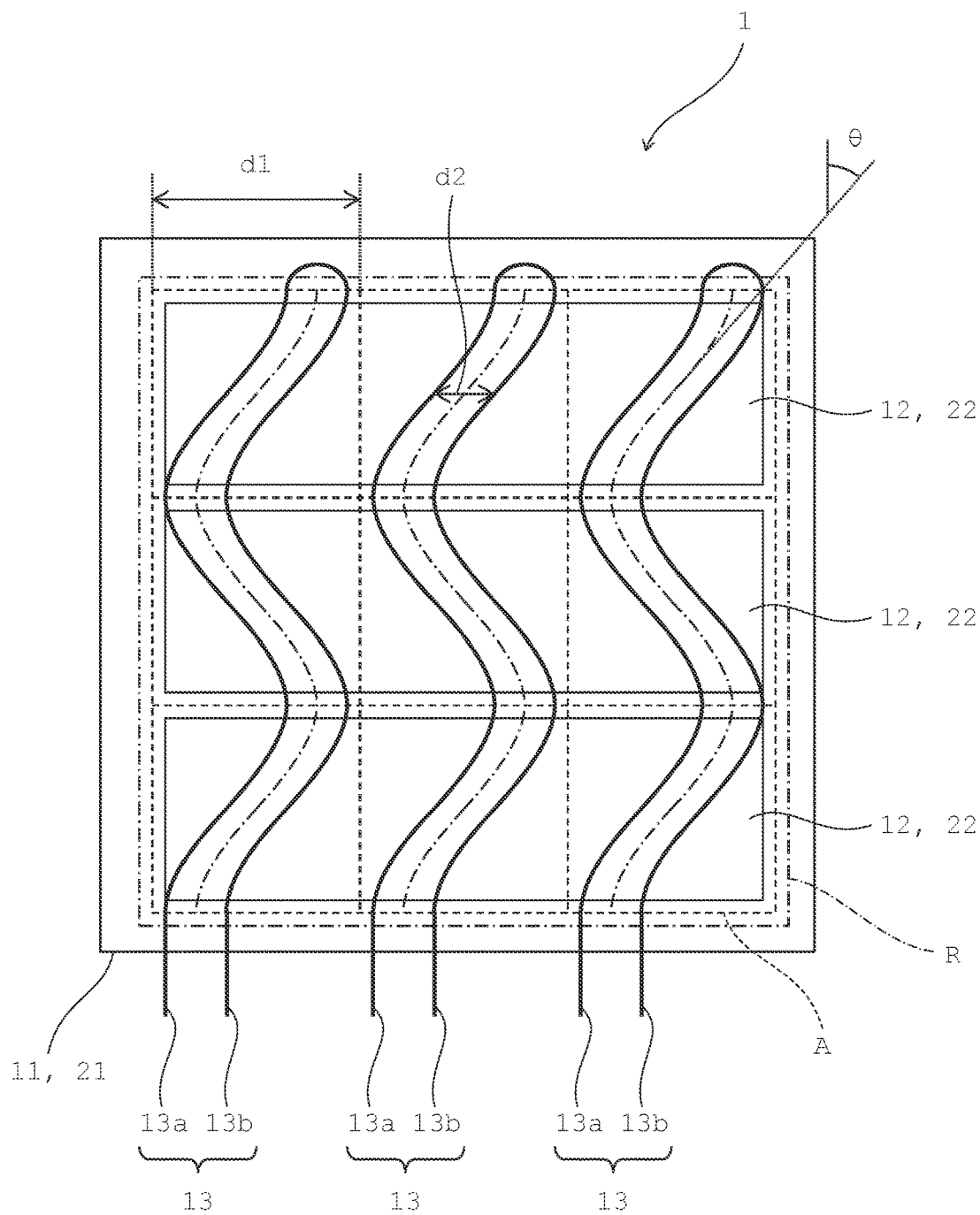

FIG.10A    EMBODIMENT 2 (d2<d1/2)
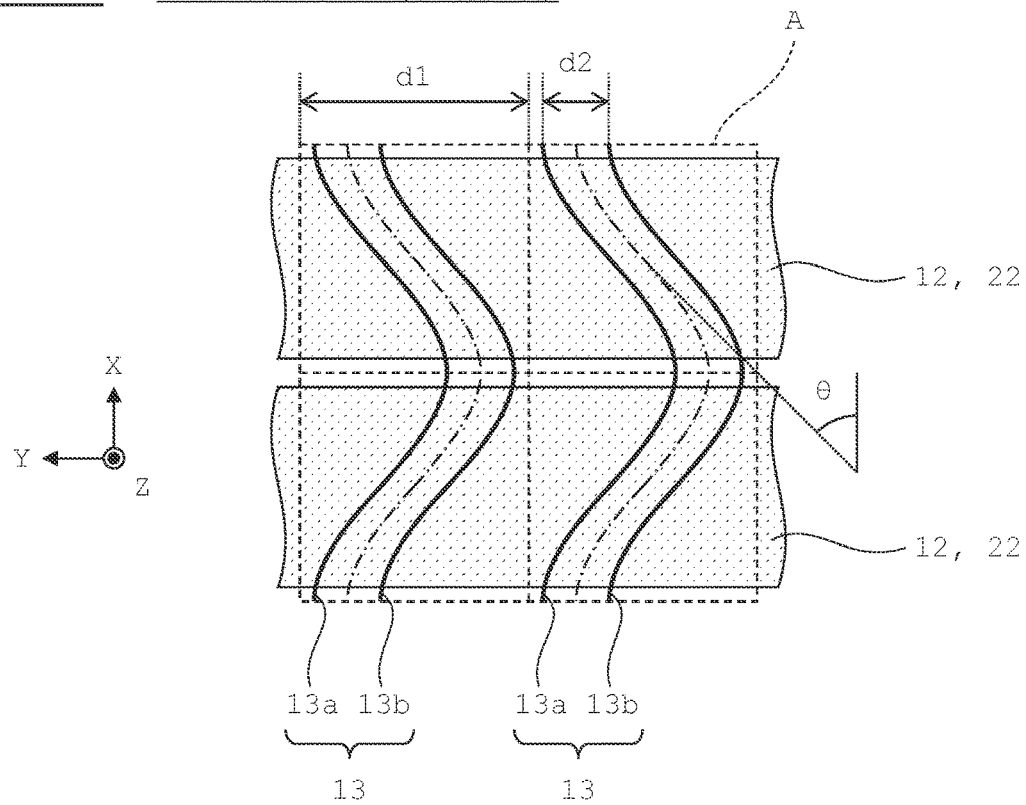
FIG.10B    COMPARATIVE EXAMPLE 2 (d2≥d1/2)
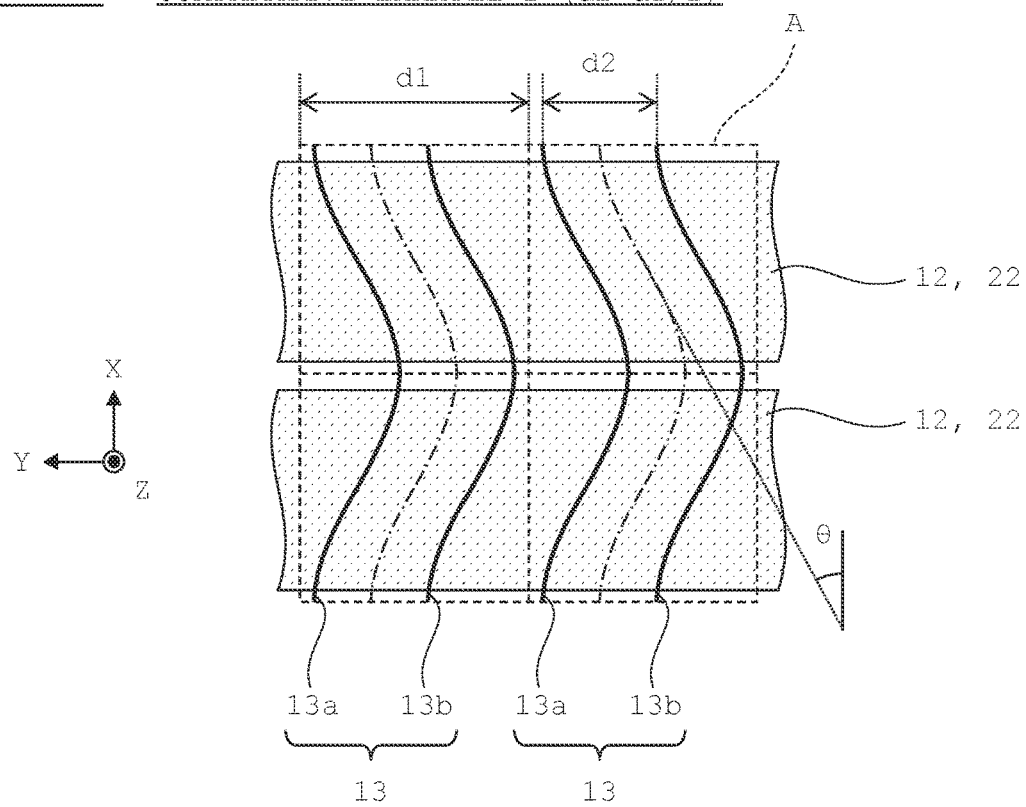

FIG. 14    COMPARATIVE EXAMPLE 3
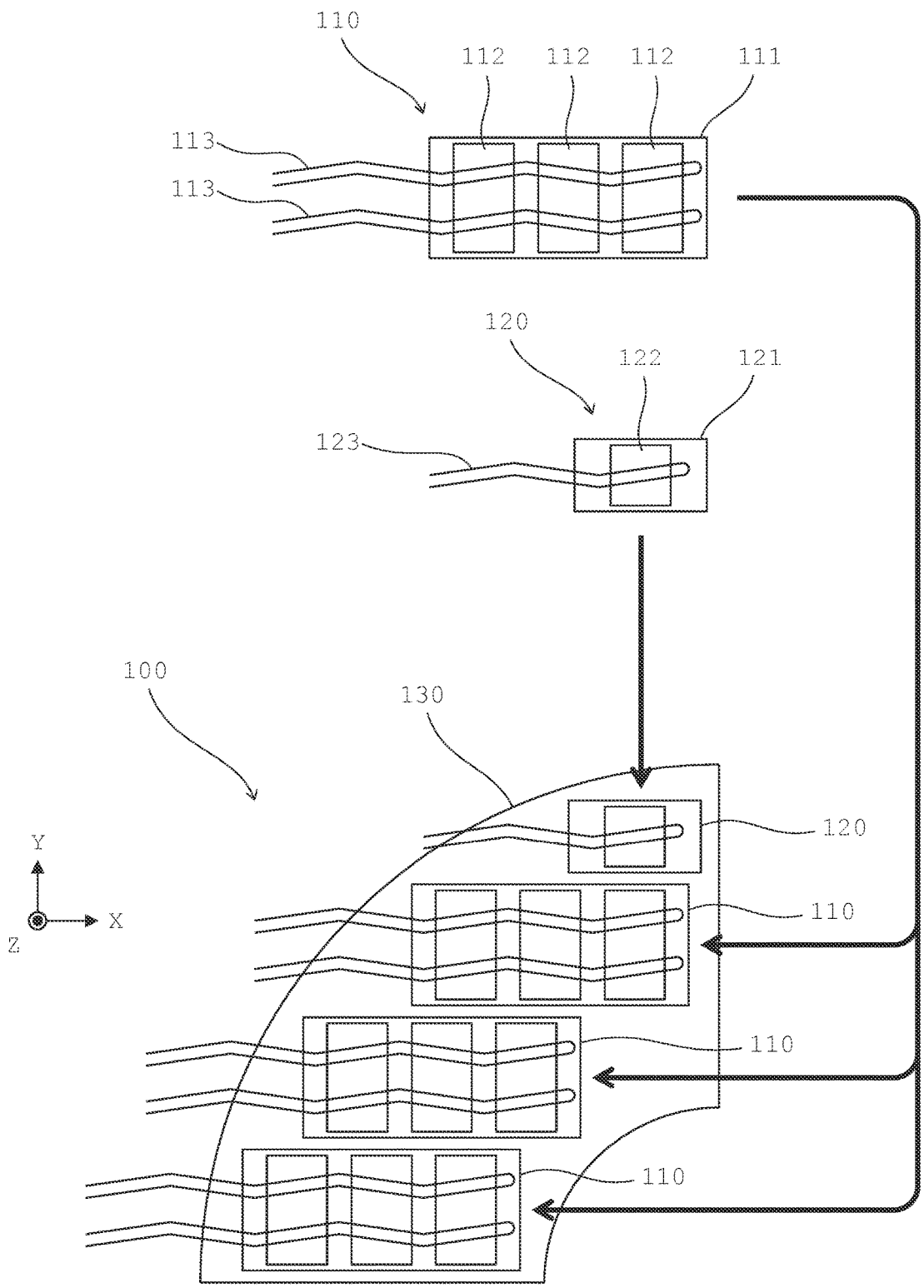

FIG.18A  REFERENCE EXAMPLE 1
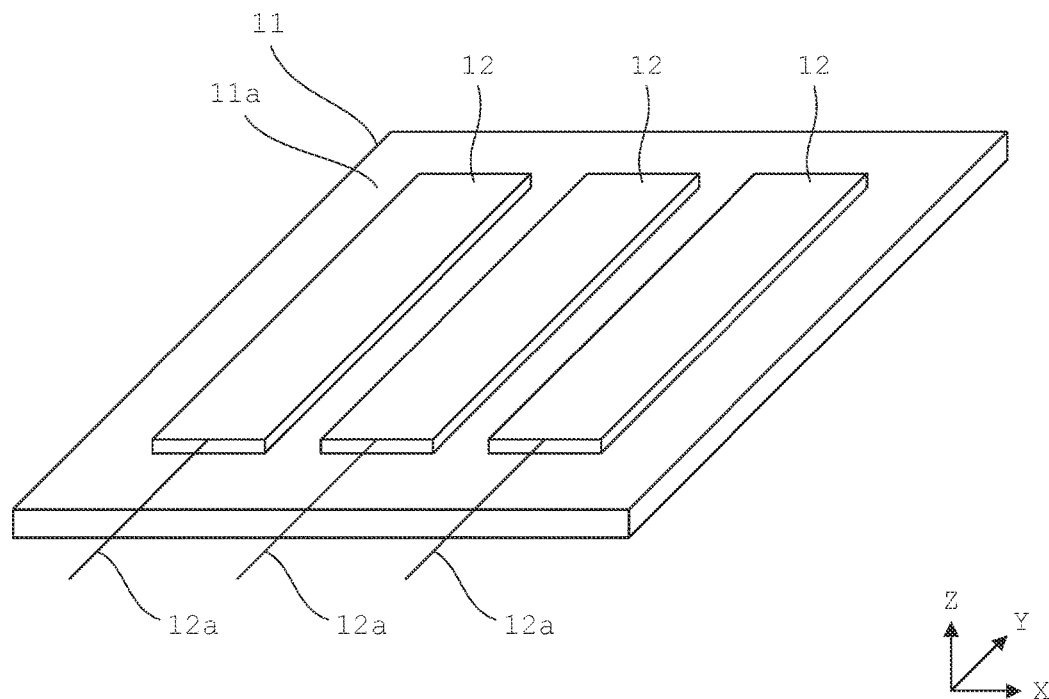
FIG.18B
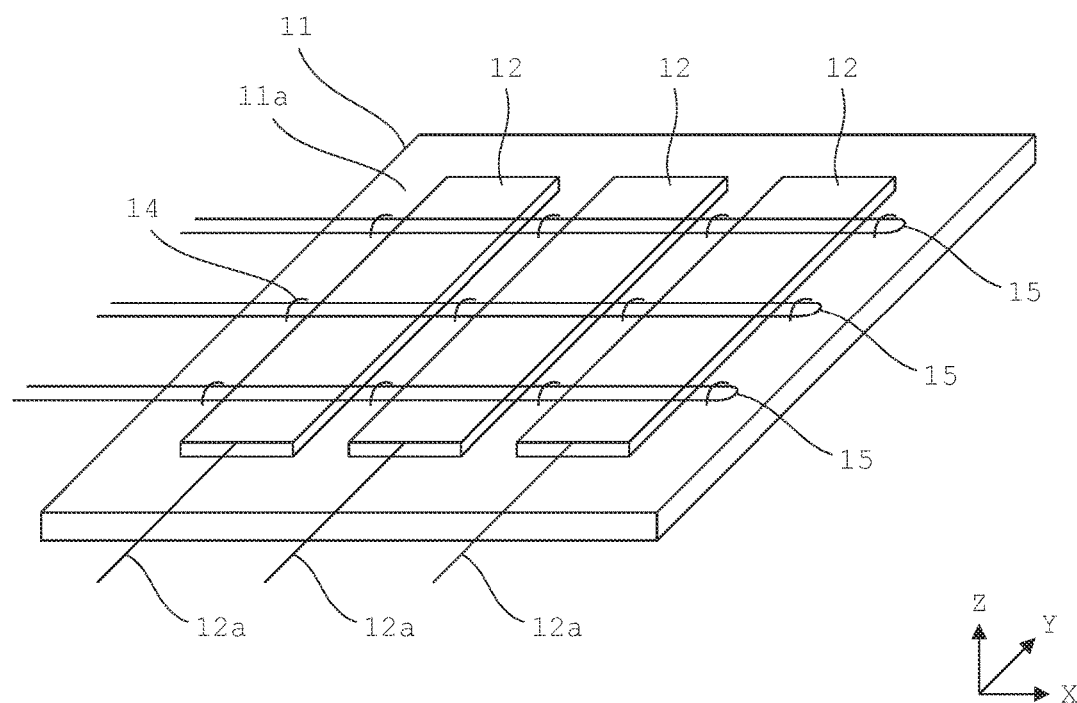

FIG. 23A    COMPARATIVE EXAMPLE 1, WITHOUT POSITIONAL DISPLACEMENT
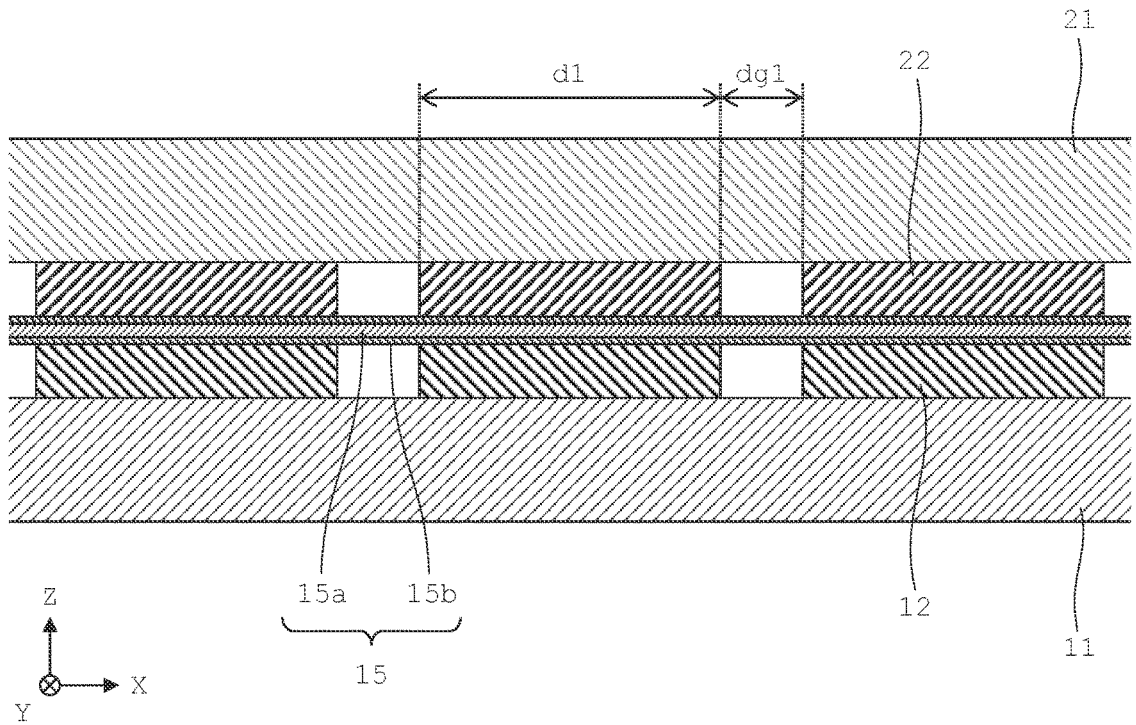
FIG. 23B    COMPARATIVE EXAMPLE 1, WITH POSITIONAL DISPLACEMENT
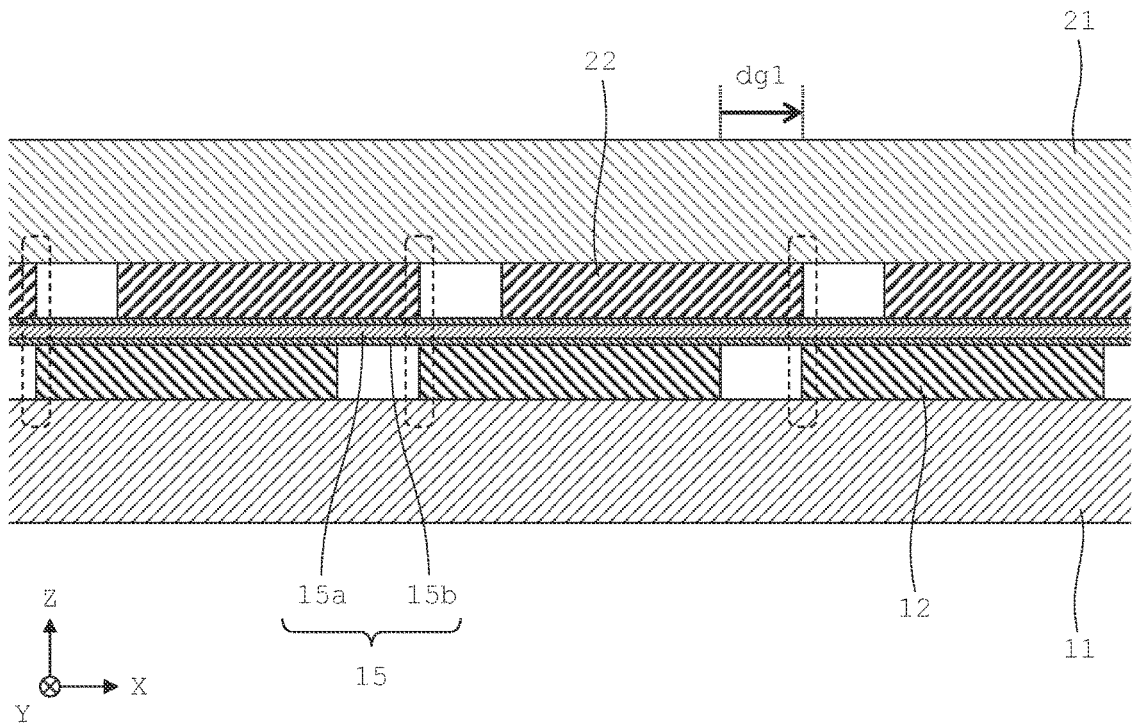

FIG. 24A    COMPARATIVE EXAMPLE 2, WITHOUT POSITIONAL DISPLACEMENT
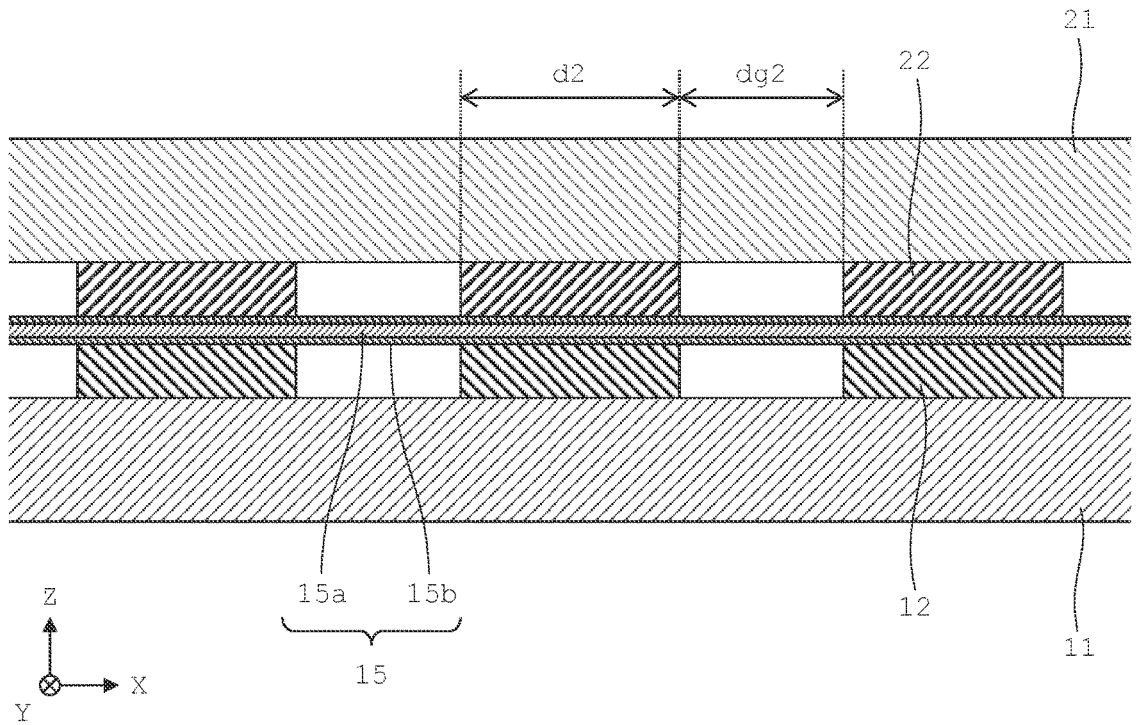
FIG. 24B    COMPARATIVE EXAMPLE 2, WITH POSITIONAL DISPLACEMENT
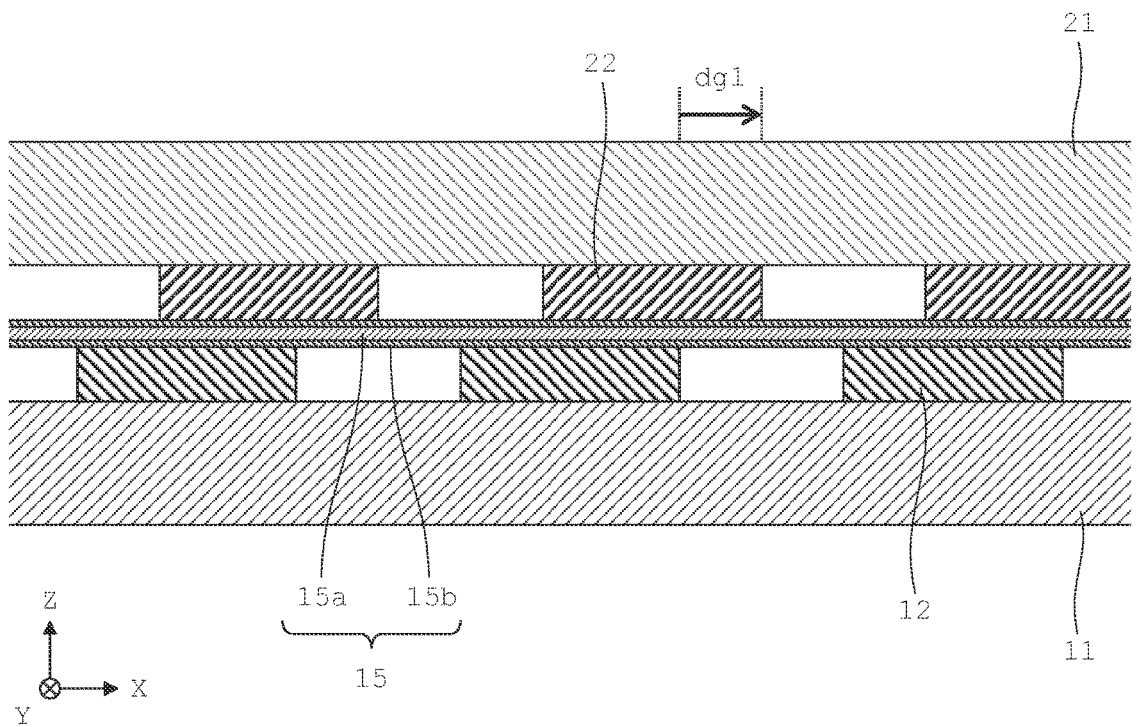

*FIG. 25A* REFERENCE EXAMPLE 1, WITHOUT POSITIONAL DISPLACEMENT
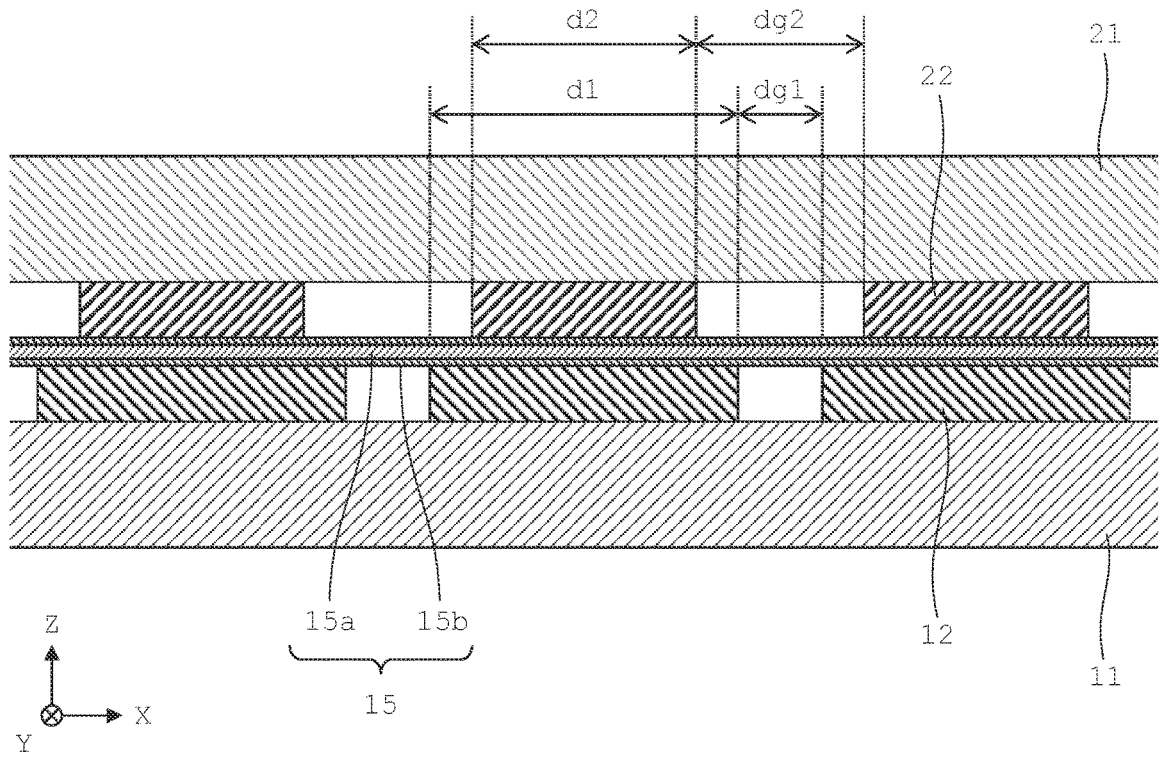
*FIG. 25B* REFERENCE EXAMPLE 1, WITH POSITIONAL DISPLACEMENT
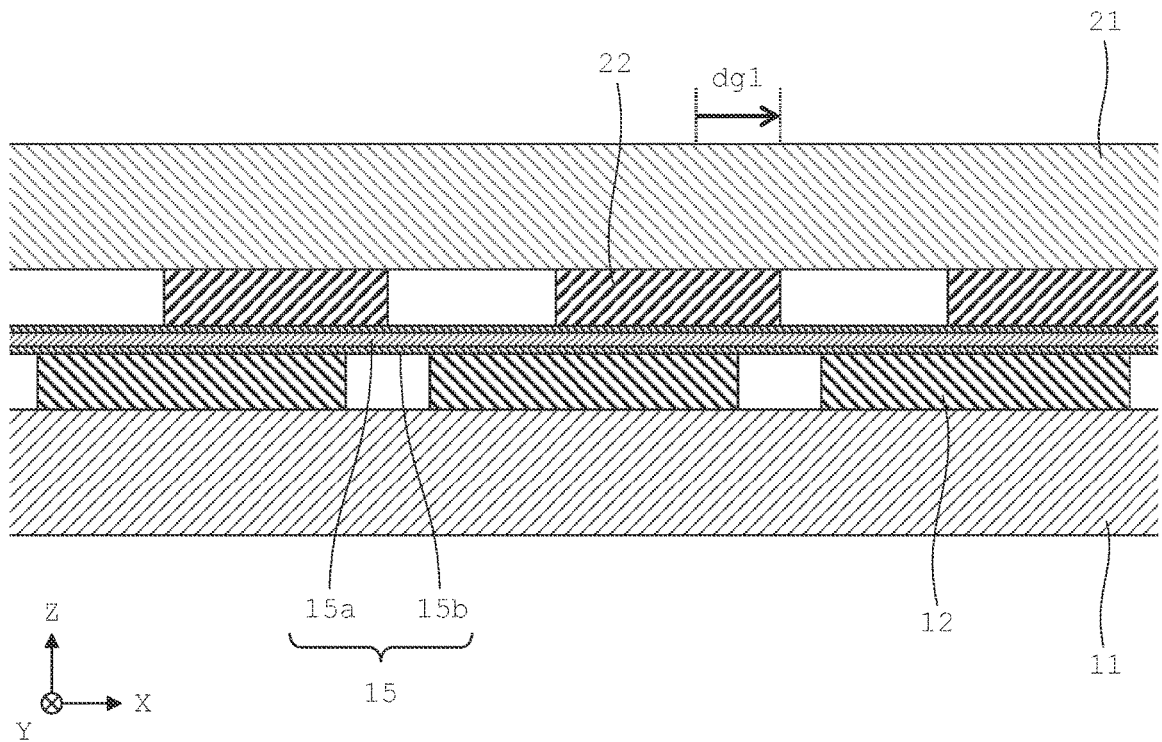

FIG.26   REFERENCE EXAMPLE 2
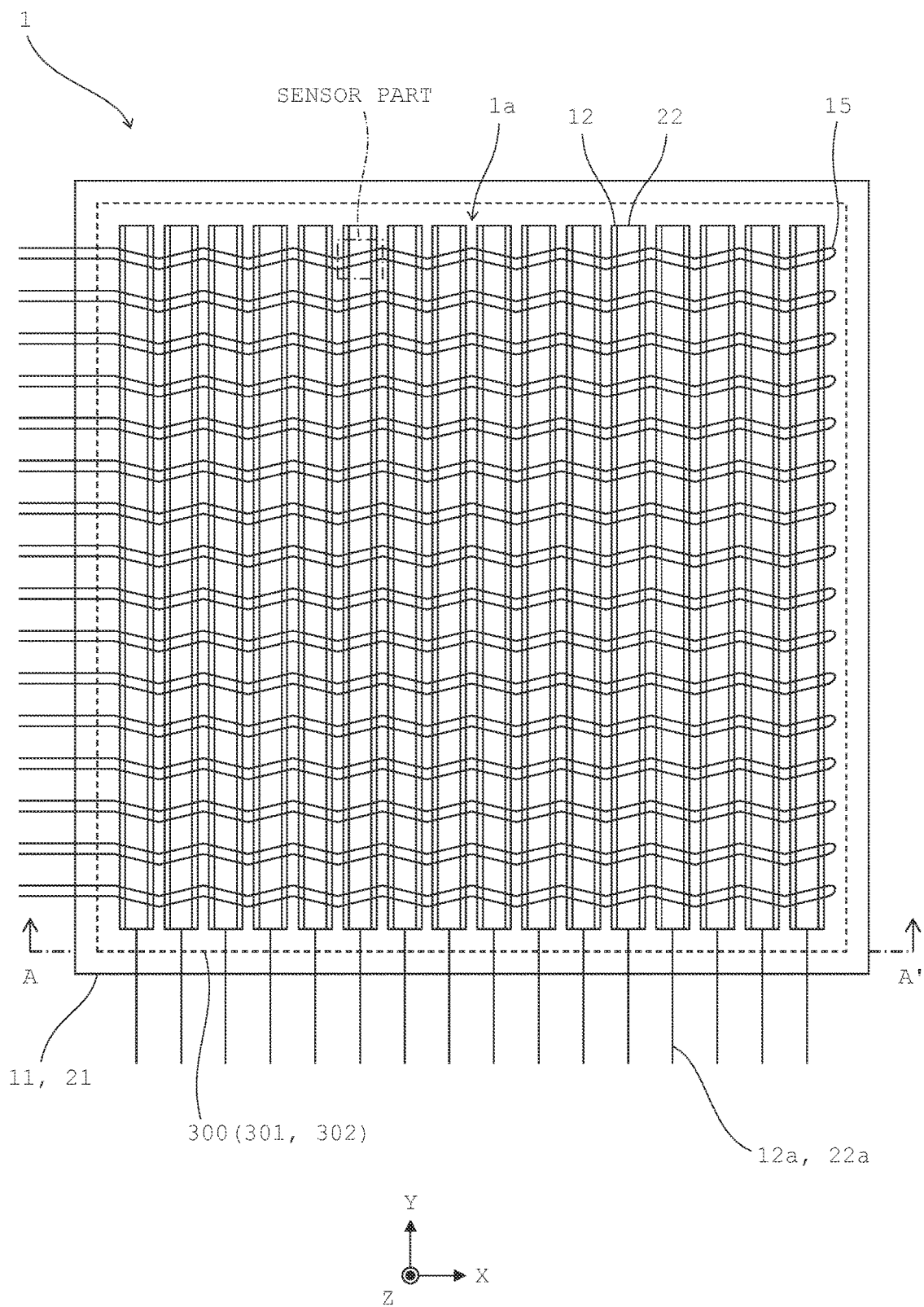

*FIG.27A* A-A' CROSS-SECTIONAL VIEW

| THICKNESS t1, t2 (mm) | PITCH p (mm) | | | | | |
|---|---|---|---|---|---|---|
| | 0.5 | 1.0 | 1.5 | 2.0 | 2.5 | 3.0 |
| 0.5 | × | × | × | × | × | ○ |
| 1.0 | × | × | ○ | ○ | ○ | ○ |
| 1.5 | × | ○ | ○ | ○ | ○ | ○ |

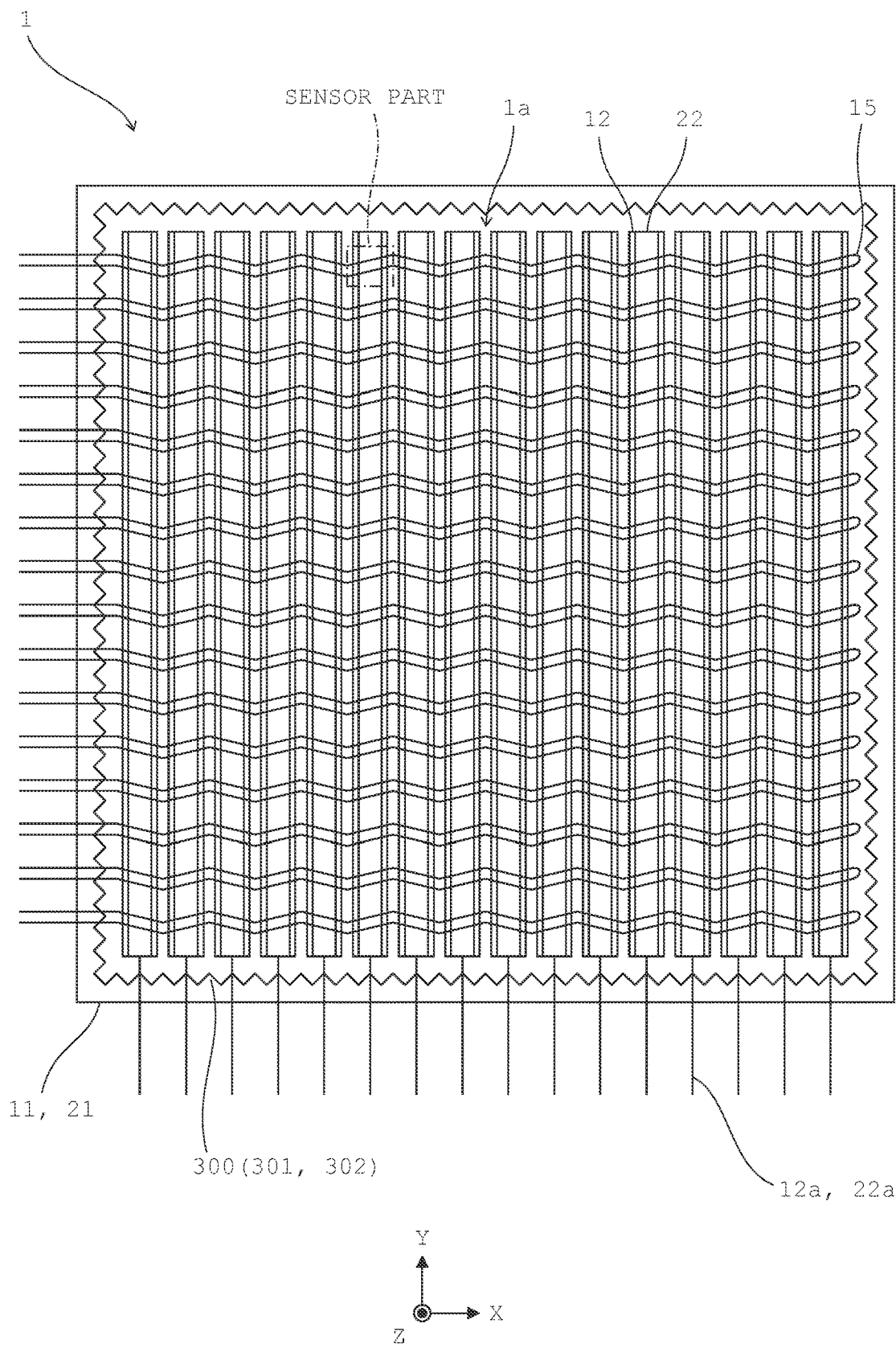
FIG.28  REFERENCE EXAMPLE 3

*FIG. 29A*
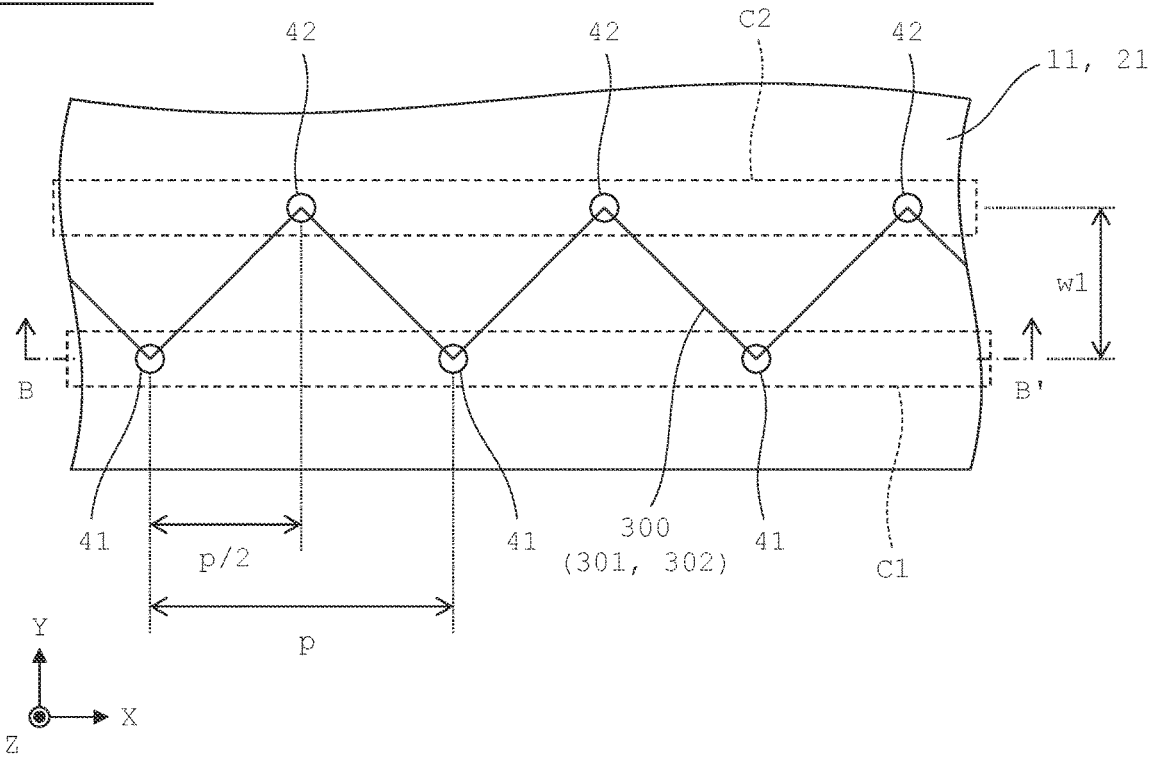
*FIG. 29B* B-B' CROSS-SECTIONAL VIEW
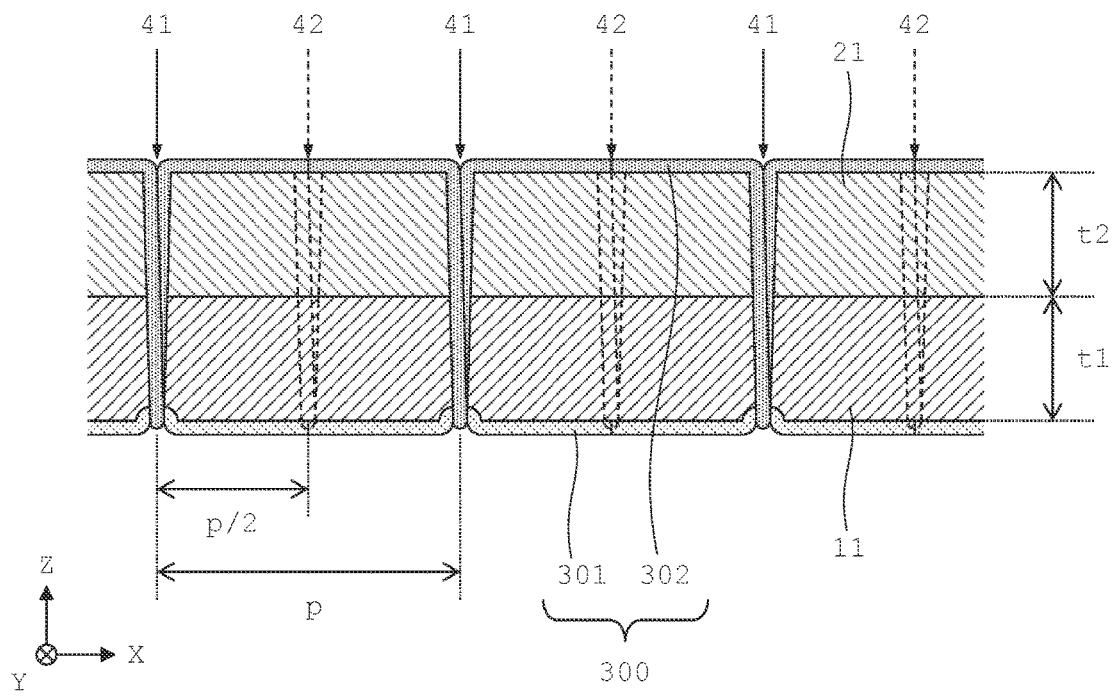

FIG. 30A  COMPARATIVE EXAMPLE 3
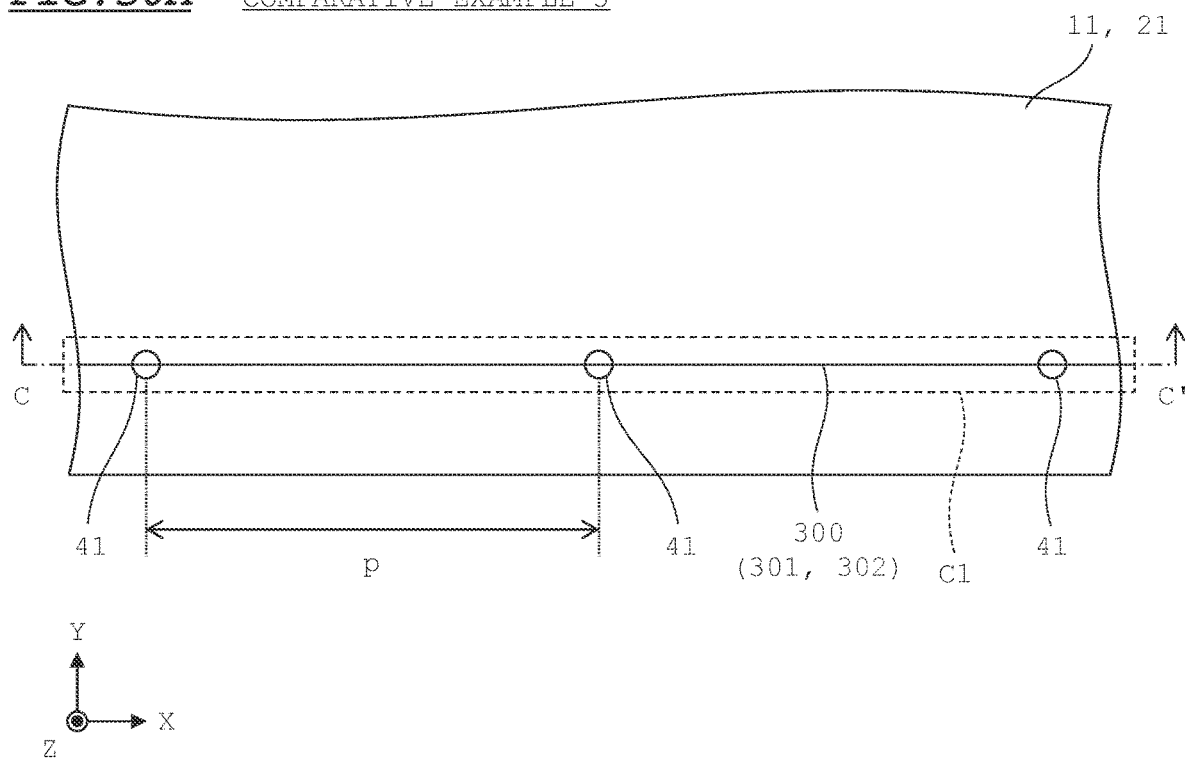
FIG. 30B  C-C' CROSS-SECTIONAL VIEW
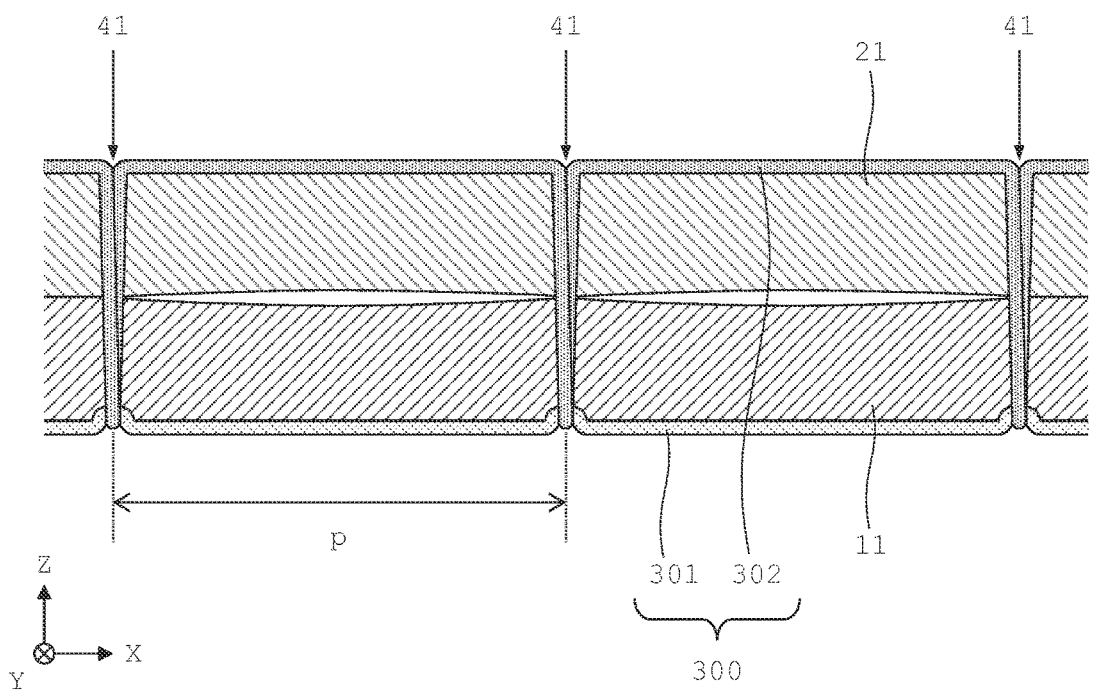

FIG. 31A  MODIFICATION 1
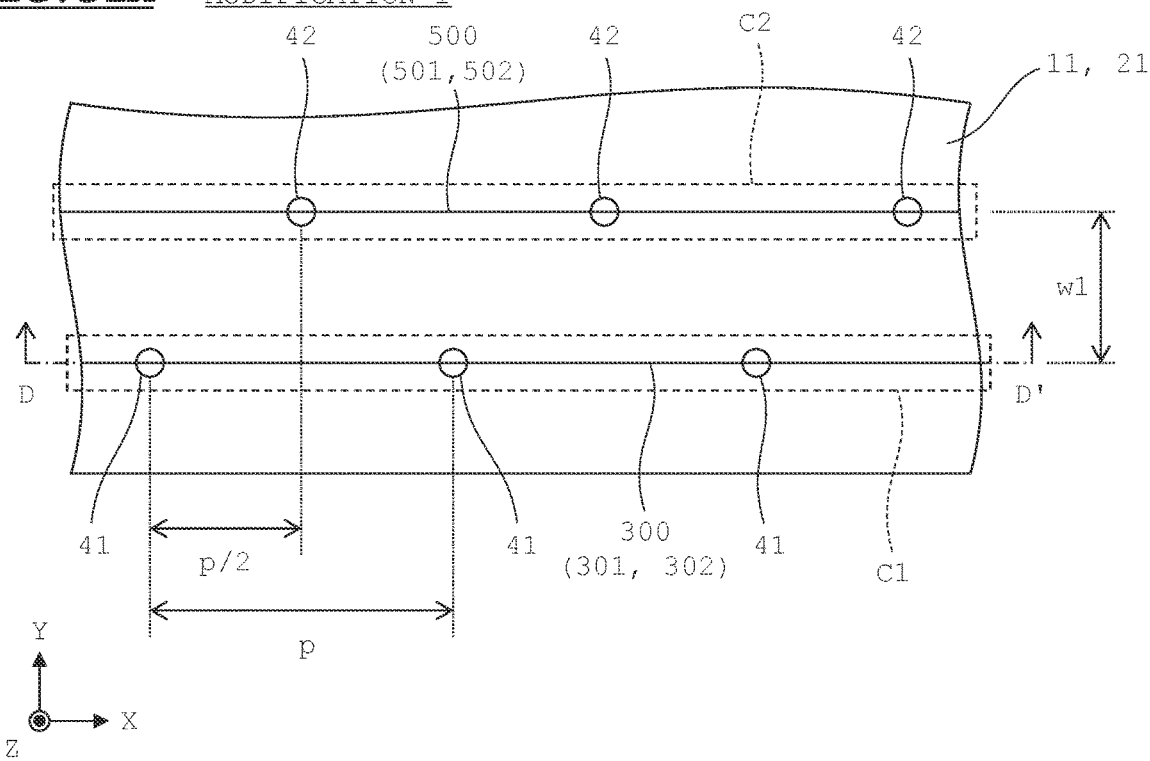
FIG. 31B  D-D' CROSS-SECTIONAL VIEW
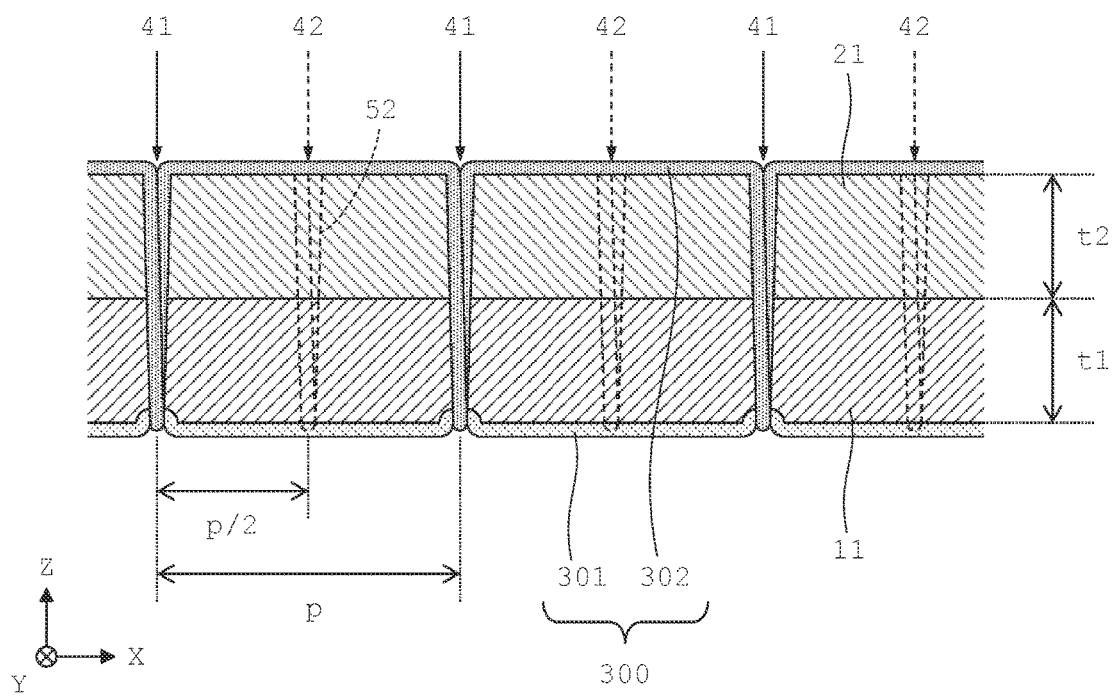

FIG. 32A  MODIFICATION 2
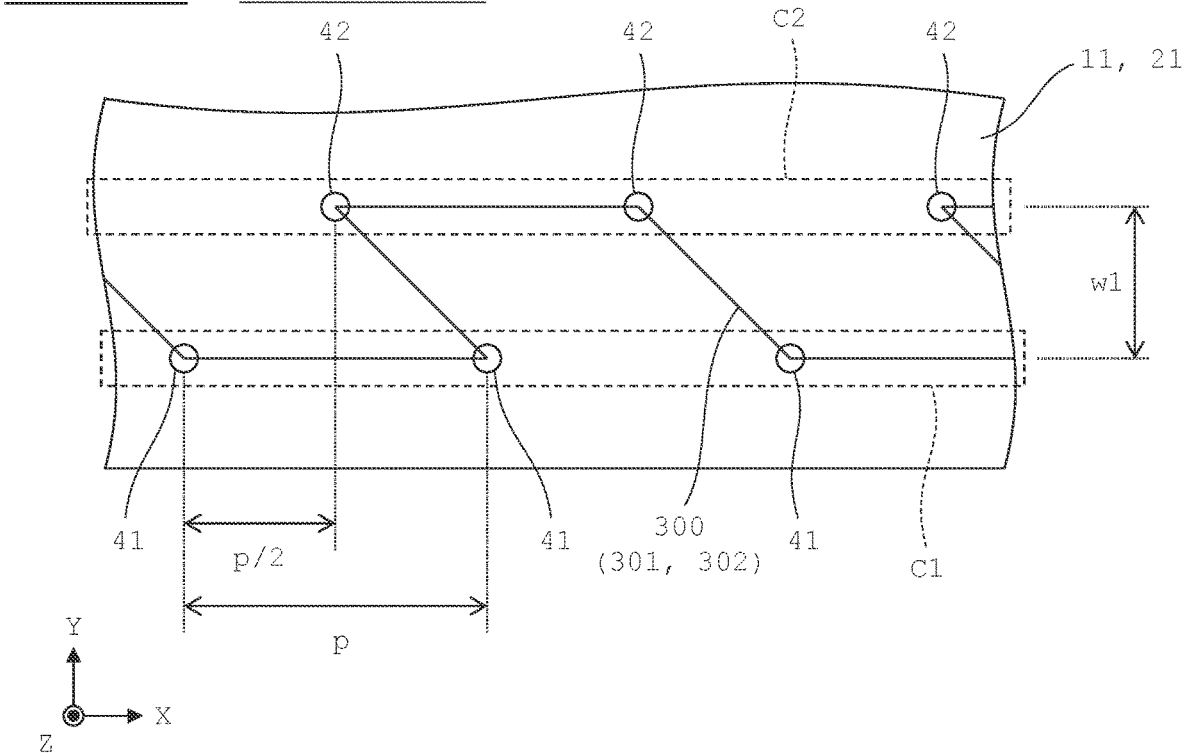
FIG. 32B  MODIFICATION 3
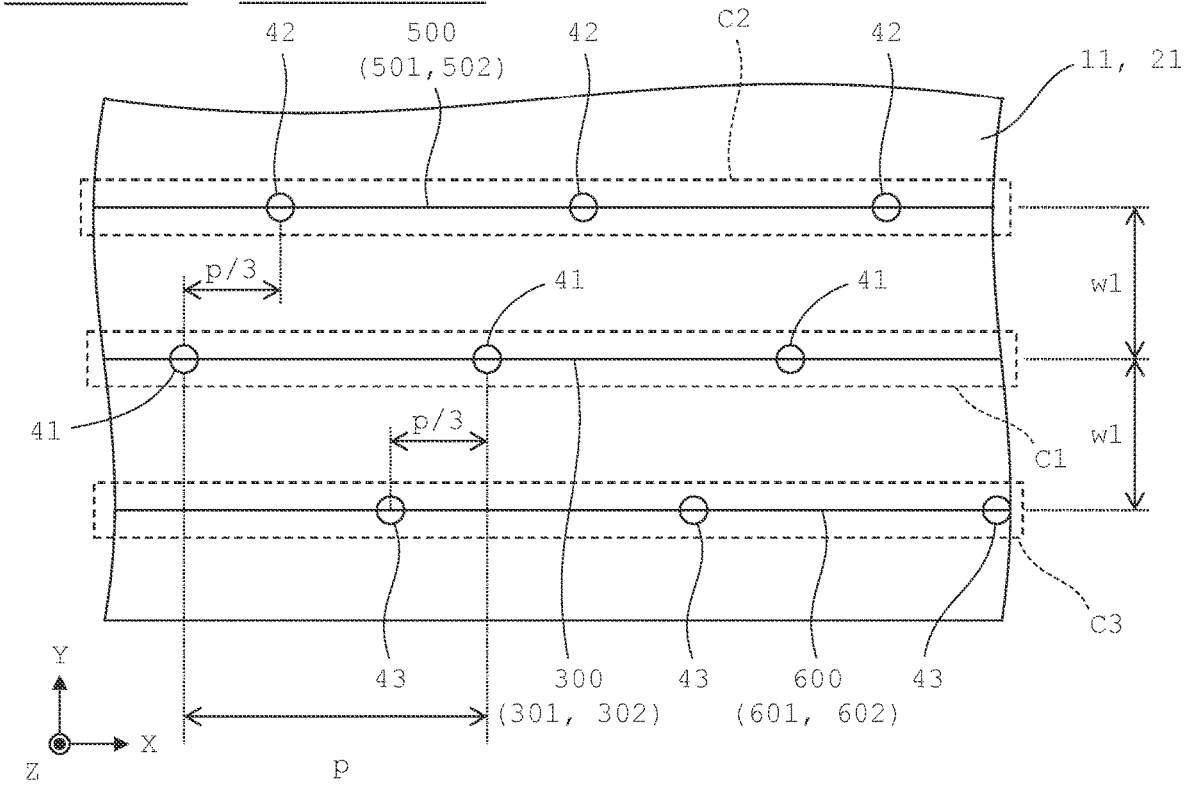

CAPACITANCE-BASED LOAD SENSOR FOR DETECTING EXTERNALLY APPLIED FORCES

CROSS REFERENCE TO RELATED APPLICATION

This application is a continuation of International Application No. PCT/JP2020/047064 filed on Dec. 16, 2020, entitled "LOAD SENSOR", which claims priority under 35 U.S.C. Section 119 of Japanese Patent Application No. 2020-011204 filed on Jan. 27, 2020, entitled "LOAD SENSOR", Japanese Patent Application No. 2020-020491 filed on Feb. 10, 2020, entitled "LOAD SENSOR", and Japanese Patent Application No. 2020-099701 filed on Jun. 8, 2020, entitled "LOAD SENSOR". The disclosure of the above applications is incorporated herein by reference.

BACKGROUND OF THE INVENTION

1. Field of the Invention

The present invention relates to a load sensor that detects a load applied from outside, on the basis of change in capacitance.

2. Disclosure of Related Art

Load sensors are widely used in the fields of industrial apparatuses, robots, vehicles, and the like. In recent years, in accordance with advancement of control technologies by computers and improvement of design, development of electronic apparatuses that use a variety of free-form surfaces such as those in human-form robots and interior equipment of automobiles is in progress. In association therewith, it is required to mount a high performance load sensor to each free-form surface.

International Publication No. 2018/096901 describes a pressure-sensitive element that includes: a sensor part to which a pressing force is applied; and a detector that detects the pressing force. In this pressure-sensitive element, the sensor part includes: a first electrically-conductive member; a second electrically-conductive member sandwiched between the first electrically-conductive member and a base member; and a dielectric body. The first electrically-conductive member has elasticity. The second electrically-conductive member is formed in a linear shape, and disposed in a wave shape along a certain main direction. The dielectric body is disposed between the first electrically-conductive member and the second electrically-conductive member, and at least partially covers a surface of the first electrically-conductive member or a surface of the second electrically-conductive member. The detector detects a pressing force on the basis of change in capacitance between the first electrically-conductive member and the second electrically-conductive member.

In the above configuration, when the second electrically-conductive member is implemented by a twisted wire in which a plurality of linear members are twisted, the bending strength of the second electrically-conductive member can be increased. However, in this case, when a load is repeatedly applied to the sensor part and the twisted state is canceled, the relationship between the load and the capacitance between the first electrically-conductive member and the second electrically-conductive member changes. This causes a problem that the load cannot be appropriately detected.

SUMMARY OF THE INVENTION

A first mode of the present invention relates to a load sensor. The load sensor according to the present mode includes: a first base member and a second base member disposed so as to face each other; an electrically-conductive elastic body disposed on an opposing face of the first base member; and a conductor wire disposed between the second base member and the electrically-conductive elastic body, and configured as a plurality of element wires being twisted. Each element wire is configured as an electrically-conductive member which has a linear shape and of which a surface is covered by a dielectric body, and a twist pitch of the plurality of element wires satisfies a conditional expression below.

$p \leq 12nd$ where parameters in the expression are each defined as follows p: the twist pitch of the plurality of element wires, n: the number of the element wires included in the conductor wire, and d: an outer diameter of each element wire.

According to the load sensor of the present mode, the twist pitch of the plurality of element wires is configured so as to satisfy the above expression. Accordingly, untwisting of element wires is suppressed, and thus, characteristic change in capacitance between the electrically-conductive elastic body and the electrically-conductive member is suppressed. Therefore, loads can be appropriately detected while using the conductor wire (twisted wire) configured as a plurality of element wires being twisted.

BRIEF DESCRIPTION OF THE DRAWINGS

FIG. 1A is a perspective view schematically showing a base member on the lower side and electrically-conductive elastic bodies set on an opposing face of the base member on the lower side, according to Embodiment 1;

FIG. 1B is a perspective view schematically showing pairs of conductor wires and threads, according to Embodiment 1;

FIG. 6A is a cross-sectional view schematically showing a periphery of a conductor wire, viewed in the X-axis negative direction, according to Comparative Example 1;

FIG. 6B is a diagram schematically showing change in capacitance, according to Comparative Example 1;

FIG. 7B is a diagram schematically showing change in capacitance, according to Embodiment 1;

FIG. 8 is a diagram for describing the interval between conductor wires and the width of a sensor part, according to Embodiment 2;

FIG. 10A is a plan view schematically showing the inside of a load sensor, viewed in the Z-axis negative direction, according to Embodiment 2;

FIG. 10B is a plan view schematically showing the inside of a load sensor, viewed in the Z-axis negative direction, according to Comparative Example 2;

FIG. 14 is a plan view schematically showing a production method of a load sensor, according to Comparative Example 3;

FIG. 18A is a perspective view schematically showing a base member and electrically-conductive elastic bodies on the lower side, according to Reference Example 1;

FIG. 18B is a perspective view schematically showing covered copper wires and threads, according to Reference Example 1;

FIGS. 23A, 23B are each a cross-sectional view at a position of a covered copper wire along a plane parallel to an X-Z plane, viewed in the Y-axis positive direction, according to Comparative Example 1;

FIGS. 24A, 24B are each a cross-sectional view at a position of a covered copper wire along a plane parallel to an X-Z plane, viewed in the Y-axis positive direction, according to Comparative Example 2.

FIGS. 25A, 25B are each a cross-sectional view at a position of a covered copper wire along a plane parallel to an X-Z plane, viewed in the Y-axis positive direction, according to Reference Example 1;

FIG. 26 is a plan view schematically showing a specific configuration a load sensor, according to Reference Example 2;

FIG. 27A is an A-A' cross-sectional view obtained when the load sensor is cut at an X-Z plane passing through a seam positioned on the Y-axis negative side, according to Reference Example 2.

FIG. 28 is a plan view schematically showing a specific configuration of a load sensor, according to Reference Example 3;

FIG. 29A is a plan view of a vicinity of the outer periphery on the Y-axis negative side of base members, viewed in the Z-axis negative direction, according to Reference Example 3;

FIG. 29B is a B-B' cross-sectional view obtained when the load sensor is cut at an X-Z plane passing through needle holes, according to Reference Example 3;

FIG. 30A is a plan view of a vicinity of the outer periphery on the Y-axis negative side of base members, viewed in the Z-axis negative direction, according to Comparative Example 3.

FIG. 30B is a C-C' cross-sectional view obtained when a load sensor is cut at an X-Z plane passing through needle holes, according to Comparative Example 3;

FIG. 31A is a plan view of a vicinity of the outer periphery on the Y-axis negative side of base members, viewed in the Z-axis negative direction, according to Modification 1;

FIG. 31B is a D-D' cross-sectional view obtained when a load sensor is cut at an X-Z plane passing through needle holes, according to Modification 1;

FIG. 32A is a plan view of a vicinity of the outer periphery on the Y-axis negative side of base members, viewed in the Z-axis negative direction, according to Modification 2; and FIG. 32B is a plan view of a vicinity of the outer periphery on the Y-axis negative side of base members, viewed in the Z-axis negative direction, according to Modification 3.

Figure 2A:
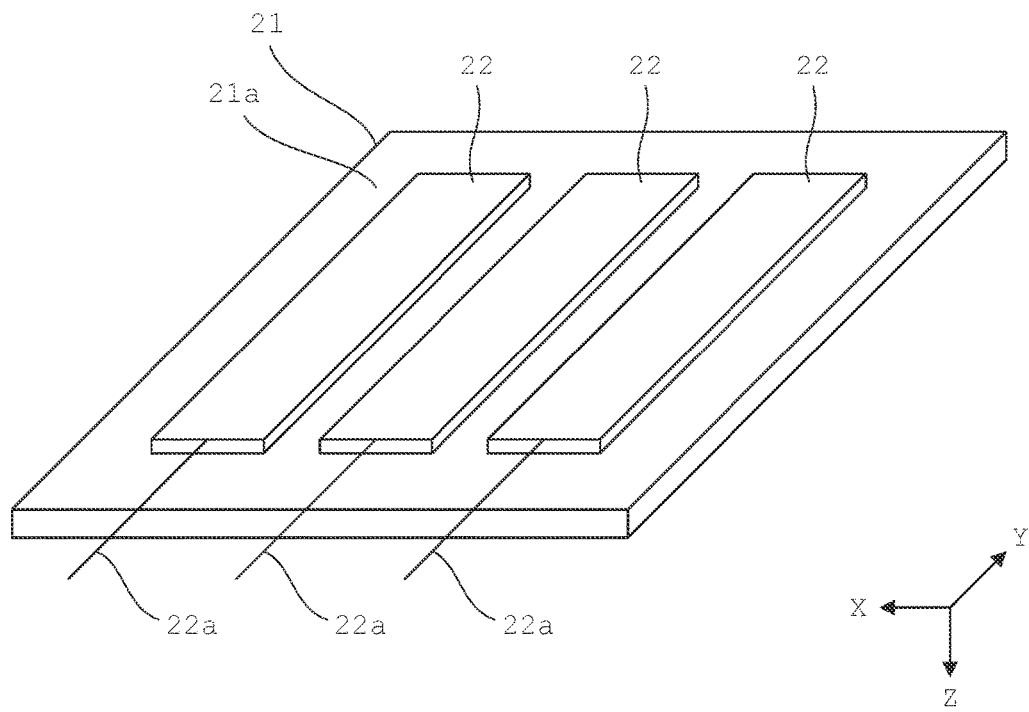
FIG. 2A is a perspective view schematically showing a base member on the upper side and electrically-conductive elastic bodies set on an opposing face of the base member on the upper side, according to Embodiment 1.

It is noted that the drawings are solely for description and do not limit the scope of the present invention in any way.

DESCRIPTION OF PREFERRED EMBODIMENTS

The load sensor according to the present invention is applicable to a load sensor of a management system or an electronic apparatus that performs processing in accordance with an applied load.

Examples of the management system include a stock management system, a driver monitoring system, a coaching management system, a security management system, and a caregiving/nursing management system.

In the stock management system, for example, by a load sensor provided to a stock shelf, the load of a placed stock is detected, and the kinds of commodities and the number of commodities present on the stock shelf are detected. Accordingly, in a store, a factory, a warehouse, and the like, the stock can be efficiently managed, and manpower saving can be realized. In addition, by a load sensor provided in a refrigerator, the load of food in the refrigerator is detected, and the kinds of the food and the quantity and amount of the food in the refrigerator are detected. Accordingly, a menu that uses food in a refrigerator can be automatically proposed.

In the driver monitoring system, by a load sensor provided to a steering device, the distribution of a load (e.g., gripping force, grip position, tread force) applied on the steering device by a driver is monitored, for example. In addition, by a load sensor provided to a vehicle-mounted seat, the distribution of a load (e.g., the position of the center of gravity) applied on the vehicle-mounted seat by the driver in a seated state is monitored. Accordingly, the driving state (sleepiness, mental state, and the like) of the driver can be fed back.

In the coaching management system, for example, by a load sensor provided to the bottom of a shoe, the load distribution at a sole is monitored. Accordingly, correction or leading to an appropriate walking state or running state can be realized.

In the security management system, for example, by a load sensor provided to a floor, the load distribution is detected when a person passes, and the body weight, stride, passing speed, shoe sole pattern, and the like are detected. Accordingly, the person who has passed can be identified by checking these pieces of detection information against data.

In the caregiving/nursing management system, for example, by load sensors provided to bedclothes and a toilet seat, the distributions of loads applied by a human body onto the bedclothes and the toilet seat are monitored. Accordingly, at the positions of the bedclothes and the toilet seat, what action the person is going to take is estimated, whereby tumbling or falling can be prevented.

Examples of the electronic apparatus include a vehicle-mounted apparatus (car navigation system, audio apparatus, etc.), a household electrical appliance (electric pot, IH cooking heater, etc.), a smartphone, an electronic paper, an electronic book reader, a PC keyboard, a game controller, a smartwatch, a wireless earphone, a touch panel, an electronic pen, a penlight, lighting clothes, and a musical instrument. In an electronic apparatus, a load sensor is provided to an input part that receives an input from a user.

The load sensors in the embodiments below are each a capacitance-type load sensor that is typically provided in a load sensor of a management system or an electronic apparatus as described above. Such a load sensor may be referred to as a "capacitance-type pressure-sensitive sensor element", a "capacitive pressure detection sensor element", a "pressure-sensitive switch element", or the like. The load sensor in the embodiments below is connected to a detection circuit, and the load sensor and the detection circuit form a load detection device. The embodiments below are examples of embodiments of the present invention, and the present invention is not limited to the embodiments below in any way.

Hereinafter, embodiments of the present invention will be described with reference to the drawings. For convenience, X-, Y-, and Z-axes orthogonal to each other are indicated in the drawings. The Z-axis direction is the height direction of a load sensor 1.

Embodiment 1

A configuration of the load sensor 1 will be described with reference to FIG. 1A to FIG. 5.

FIG. 1A is a perspective view schematically showing a base member 11, and three electrically-conductive elastic bodies 12 set on an opposing face 11a (the face on the Z-axis positive side) of the base member 11.

The base member 11 is an insulative member having elasticity, and has a flat plate shape parallel to an X-Y plane. The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are formed on the opposing face 11a (the face on the Z-axis positive side) of the base member 11. In FIG. 1A, three electrically-conductive elastic bodies 12 are formed on the opposing face 11a of the base member 11. Each electrically-conductive elastic body 12 is an electrically-conductive member having elasticity. The electrically-conductive elastic bodies 12 each have a band-like shape that is long in the Y-axis direction, and are formed so as to be arranged with a predetermined interval therebetween in the X-axis direction. At an end portion on the Y-axis negative side of each electrically-conductive elastic body 12, a cable 12a electrically connected to the electrically-conductive elastic body 12 is set.

Each electrically-conductive elastic body 12 is formed on the opposing face 11a of the base member 11 by a printing method such as screen printing, gravure printing, flexographic printing, offset printing, or gravure offset printing. With these printing methods, the electrically-conductive elastic body 12 can be formed so as to have a thickness of about 0.001 mm to 0.5 mm on the opposing face 11a of the base member 11.

Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

FIG. 1B is a perspective view schematically showing three pairs of conductor wires 13 and twelve threads 14 which are placed on the structure shown in FIG. 1A.

Each pair of conductor wires 13 is composed of two conductor wires 13a, 13b, which are disposed so as to be arranged with a predetermined interval therebetween and which are connected to each other at an end portion on the X-axis positive side. The pair of conductor wires 13 is disposed so as to be superposed on the upper faces of the three electrically-conductive elastic bodies 12 shown in FIG. 1A. Here, three pairs of conductor wires 13 are disposed so as to be superposed on the upper faces of the three electrically-conductive elastic bodies 12. The three pairs of conductor wires 13 are disposed so as to cross the electrically-conductive elastic bodies 12, and are disposed so as to be arranged with a predetermined interval therebetween, along the longitudinal direction (the Y-axis direction) of the electrically-conductive elastic bodies 12. Each pair of conductor wires 13 is disposed, extending in the X-axis direction, so as to extend across the three electrically-conductive elastic bodies 12. Each conductor wire 13a, 13b includes an electrically-conductive member having a linear shape and a dielectric body covering the surface of the electrically-conductive member. The configuration of the conductor wire 13a, 13b will be described later with reference to FIGS. 3A, 3B.

After the three pairs of conductor wires 13 have been disposed as in FIG. 1B, each pair of conductor wires 13 is set on the base member 11 by threads 14 so as to be movable in the direction (the X-axis direction) in which the pair of conductor wires 13 extends. In the example shown in FIG. 1B, twelve threads 14 connect the pairs of conductor wires 13 to the base member 11 at positions other than the positions where the electrically-conductive elastic bodies 12 and the pairs of conductor wires 13 overlap each other. Each thread 14 is implemented by a chemical fiber, a natural fiber, or a mixed fiber of the chemical fiber and the natural fiber.

FIG. 2A is a perspective view schematically showing a base member 21 disposed so as to be superposed on the upper side of the base member 11, and three electrically-conductive elastic bodies 22 set on an opposing face 21a (the face on the Z-axis negative side) of the base member 21.

The base member 21 has the same size and shape as those of the base member 11, and is formed from the same material as that of the base member 11. The electrically-conductive elastic bodies 22 are formed, on the opposing face 21a (the face on the Z-axis negative side) of the base member 21, at positions opposing the electrically-conductive elastic bodies 12, and are formed so as to be arranged with a predetermined interval therebetween in the X-axis direction. Each electrically-conductive elastic body 22 has the same size and shape as those of the electrically-conductive elastic body 12, and is formed from the same material as that of the electrically-conductive elastic body 12. Similar to the electrically-conductive elastic body 12, the electrically-conductive elastic body 22 is formed on the face on the Z-axis negative side of the base member 21 by a predetermined printing method. At an end portion on the Y-axis negative side of each electrically-conductive elastic body 22, a cable 22a electrically connected to the electrically-conductive elastic body 22 is set.

Figure 2B:
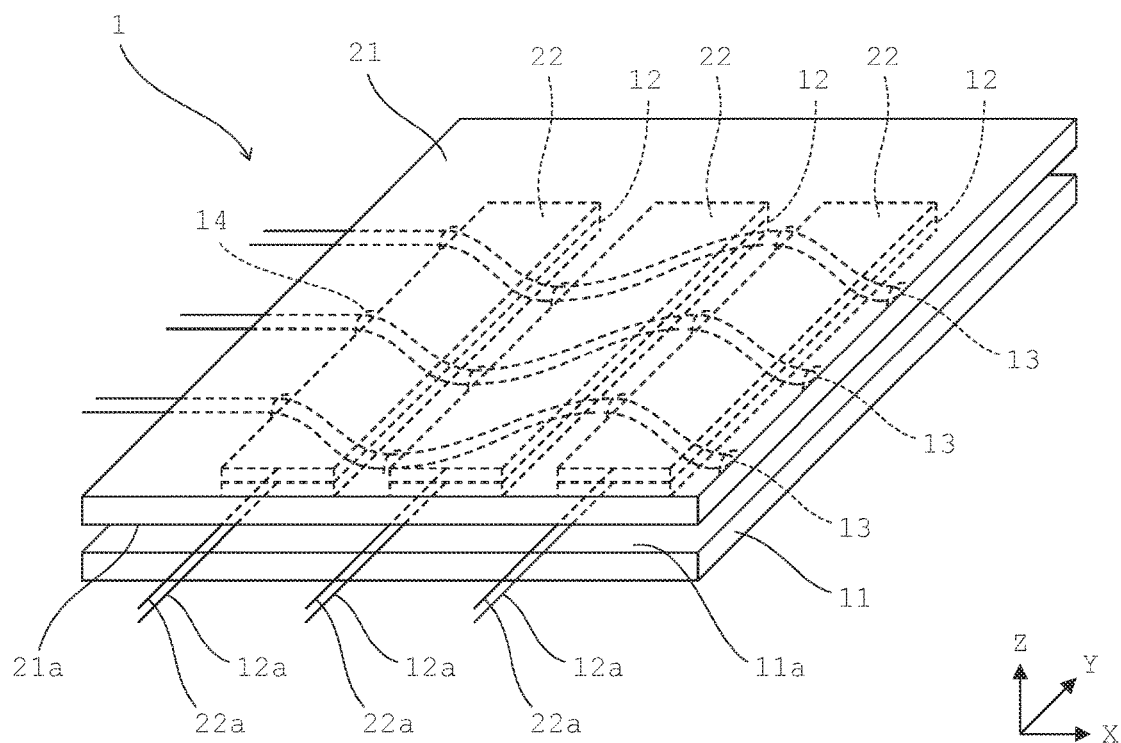
FIG. 2B is a perspective view schematically showing a load sensor of which assembly has been completed, according to Embodiment 1.

FIG. 2B is a perspective view schematically showing a state where the structure in FIG. 2A is set on the structure in FIG. 1B.

The structure shown in FIG. 2A is disposed from above (the Z-axis positive side) of the structure shown in FIG. 1B. At this time, the base member 11 and the base member 21 are disposed such that: the opposing face 11a and the opposing face 21a face each other; and the electrically-conductive elastic bodies 12 and the electrically-conductive elastic bodies 22 are superposed with each other. Then, outer peripheral four sides of the base member 21 are connected to the outer peripheral four sides of the base member 11 with a silicone rubber-based adhesive, a thread, or the like, whereby the base member 11 and the base member 21 are fixed to each other. Accordingly, the three pairs of conductor wires 13 are sandwiched by the three electrically-conductive elastic bodies 12 and the three electrically-conductive elastic bodies 22. Thus, as shown in FIG. 2B, the load sensor 1 is completed.

Figure 3A:
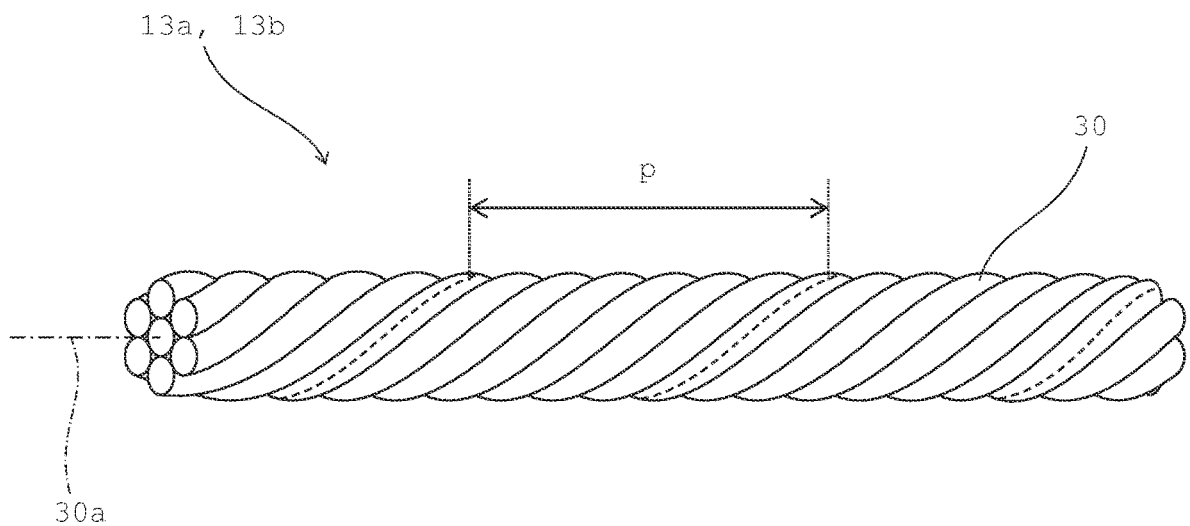
FIG. 3A is a perspective view schematically showing a configuration of a conductor wire, according to Embodiment 1.

FIG. 3A is a perspective view schematically showing a configuration of the conductor wire 13a, 13b. The conductor wire 13a and the conductor wire 13b have the same configuration.

The conductor wire 13a, 13b is configured as a plurality of element wires 30 being twisted. That is, the conductor wire 13a, 13b is a twisted wire formed by a plurality of element wires 30 being rotated, when the extending direction of the conductor wire 13a, 13b is defined as a central axis 30a of rotation, around the central axis 30a. In FIG. 3A, seven element wires 30 are twisted. When a plurality of element wires 30 are twisted, the plurality of element wires 30 are bound to each other. As indicated by a broken line, the distance in the direction of the central axis 30a from where an element wire 30 is started to be rotated around the central axis 30a to where element wire 30 is returned to the same rotation position again is a twist pitch p. A set value of the twist pitch p will be described later with reference to FIG. 7A.

Figure 3B:
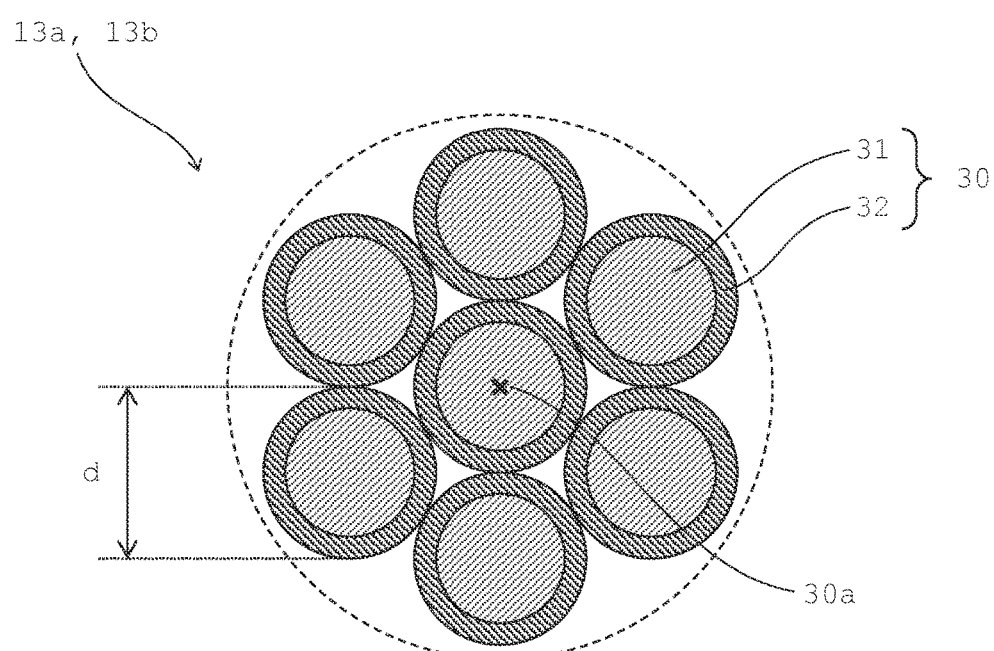
FIG. 3B is a schematic diagram of a cross-section of a conductor wire cut along a plane perpendicular to the rotation axis thereof and viewed in the rotation axis direction, according to Embodiment 1.

FIG. 3B is a schematic diagram of a cross-section of the conductor wire 13a, 13b in FIG. 3A cut along a plane perpendicular to the central axis 30a and viewed in the direction of the central axis 30a.

When the plurality of element wires 30 are appropriately twisted, the plurality of element wires 30 are disposed in a substantially symmetric manner, around the central axis 30a serving as the center, as shown in FIG. 3B. Each element wire 30 is composed of an electrically-conductive member 31 having a linear shape and a dielectric body 32 covering the surface of the electrically-conductive member 31. The outer diameter (diameter) of the element wire 30 is d. A set value of the outer diameter d will be described later with reference to FIG. 7A.

The electrically-conductive member 31 is formed from an electrically-conductive metal material, for example. Other than this, the electrically-conductive member 31 may be composed of a core wire made of glass, and an electrically-conductive layer formed on the surface of the core wire. Alternatively, the electrically-conductive member 31 may be composed of a core wire made of resin, and an electrically-conductive layer formed on the surface of the core wire, for example. In Embodiment 1, the electrically-conductive member 31 is formed from copper.

The dielectric body 32 has an electric insulation property, and is formed from a resin material, a ceramic material, a metal oxide material, or the like, for example. The dielectric body 32 may be a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like, or may be a metal oxide material of at least one type selected from the group consisting of $Al_2O_3$, $Ta_2O_5$, and the like.

Figure 4A:
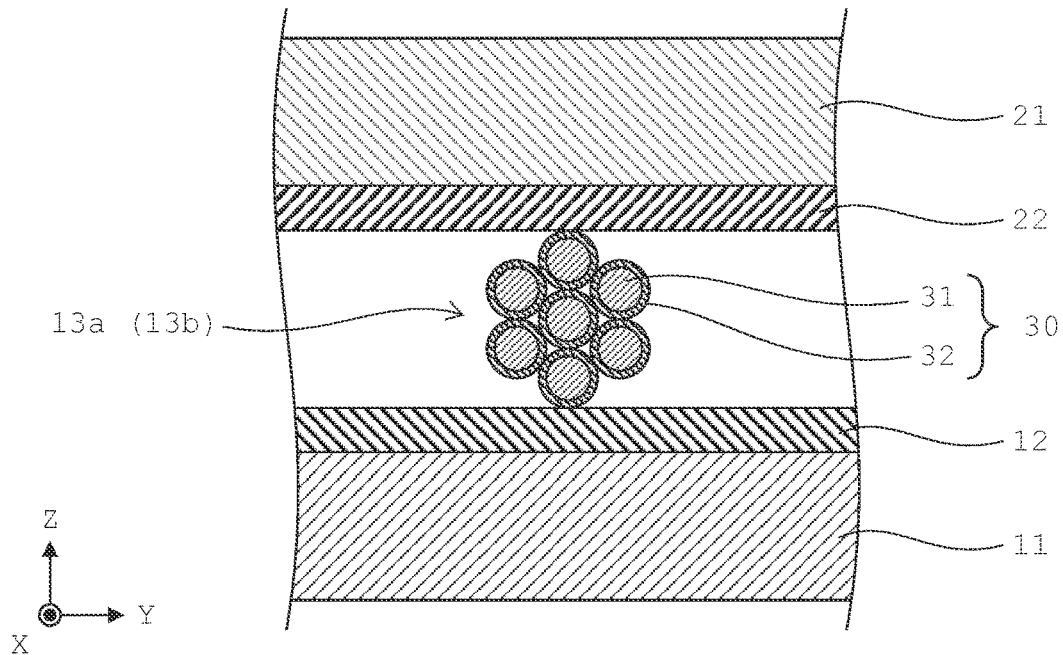
FIGS. 4A, 4B are each a cross-sectional view schematically showing a periphery of a conductor wire, viewed in the X-axis negative direction, according to Embodiment 1.
Figure 4B:
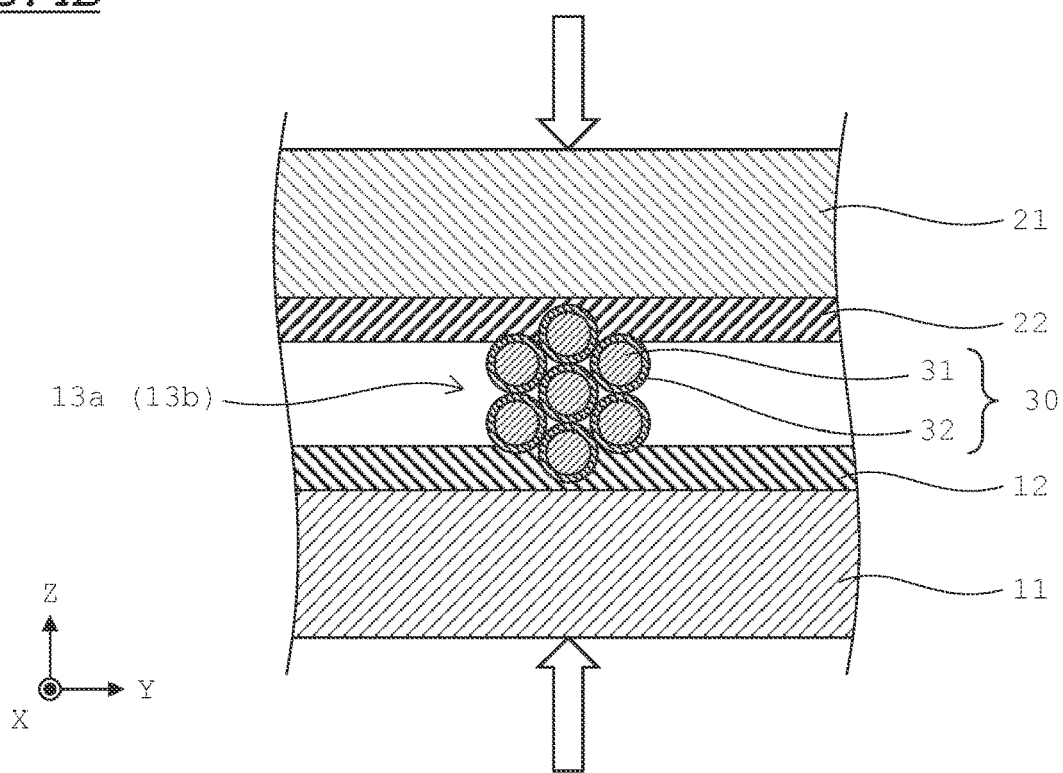

FIGS. 4A, 4B are each a cross-sectional view schematically showing a periphery of the conductor wire 13a, 13b, viewed in the X-axis negative direction. FIG. 4A shows a state where no load is applied, and FIG. 4B shows a state where loads are applied. In the following, for convenience, a case where loads are applied to the conductor wire 13a will be described.

When no load is applied to the region shown in FIG. 4A, the force applied between the electrically-conductive elastic body 12 and the conductor wire 13a, and the force applied between the electrically-conductive elastic body 22 and the conductor wire 13a are substantially zero. From this state, when a load is applied in the upward direction to the lower face of the base member 11 and a load is applied in the downward direction to the upper face of the base member 21 as shown in FIG. 4B, the electrically-conductive elastic bodies 12, 22 are deformed by the conductor wire 13a. It should be noted that even when the lower face of the base member 11 or the upper face of the base member 21 is placed on a stationary object and a load is applied only to the other base member as well, a load will be similarly received from the stationary object side due to reaction.

As shown in FIG. 4B, when the loads are applied, the conductor wire 13a is brought close to the electrically-conductive elastic bodies 12, 22 so as to be wrapped by the electrically-conductive elastic bodies 12, 22, and the contact area between the conductor wire 13a and the electrically-conductive elastic body 12, 22 increases. Similarly, the conductor wire 13b is brought close to the electrically-conductive elastic bodies 12, 22 so as to be wrapped by the electrically-conductive elastic bodies 12, 22, and the contact area between the conductor wire 13b and the electrically-conductive elastic body 12, 22 increases.

Figure 5:
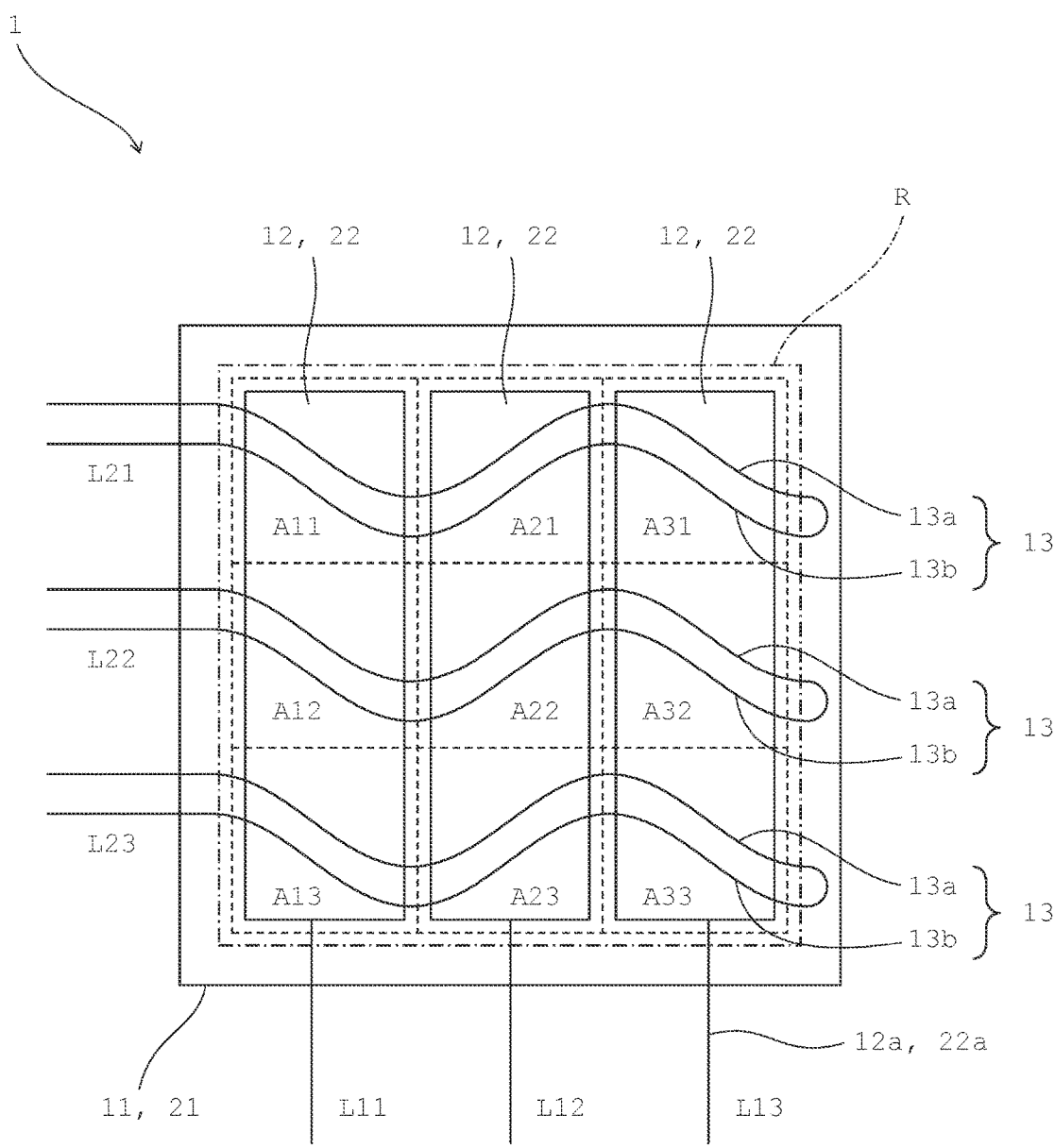
FIG. 5 is a plan view schematically showing the inside of the load sensor, viewed in the Z-axis negative direction, according to Embodiment 1.

Accordingly, the capacitance between the electrically-conductive member 31 and the electrically-conductive elastic body 12 and the capacitance between the electrically-conductive member 31 and the electrically-conductive elastic body 22 change. Then, the capacitance in the region of the conductor wire 13a, 13b is detected, whereby the load applied to this region is calculated. FIG. 5 is a plan view schematically showing the inside of the load sensor 1, viewed in the Z-axis negative direction. In FIG. 5, threads 14 are not shown, for convenience.

In a measurement region R of the load sensor 1, nine sensor parts arranged in the X-axis direction and the Y-axis direction are set. Specifically, nine regions obtained by dividing the measurement region R into three in the X-axis direction and dividing the measurement region R into three in the Y-axis direction are assigned as the nine sensor parts. The boundary of each sensor part is in contact with the boundary of a sensor part adjacent thereto. The nine sensor parts correspond to nine positions where the electrically-conductive elastic bodies 12, 22 and the pairs of conductor wires 13 cross each other. At the nine positions, nine sensor parts A11, A12, A13, A21, A22, A23, A31, A32, A33 in each of which capacitance changes in accordance with a load are formed.

Each sensor part includes electrically-conductive elastic bodies 12, 22 and a pair of conductor wires 13, and the pair of conductor wires 13 forms one pole (e.g., positive pole) for capacitance, and the electrically-conductive elastic bodies 12, 22 form the other pole (e.g., example negative pole) for capacitance. That is, the electrically-conductive member 31 in the pair of conductor wires 13 forms one electrode of the load sensor 1 (capacitance-type load sensor), the electrically-conductive elastic bodies 12, 22 form the other electrode of the load sensor 1 (capacitance-type load sensor), and the dielectric body 32 in the pair of conductor wires 13 corresponds to a dielectric body that defines capacitance in the load sensor 1 (capacitance-type load sensor).

When a load is applied in the Z-axis direction to each sensor part, the pair of conductor wires 13 is wrapped by the electrically-conductive elastic body 12, 22 due to the load. Accordingly, the contact area between the pair of conductor wires 13 and the electrically-conductive elastic body 12, 22 changes, and the capacitance between the pair of conductor wires 13 and the electrically-conductive elastic body 12, 22 changes.

An end portion on the X-axis negative side of each pair of conductor wires 13, an end portion on the Y-axis negative side of each cable 12a, and an end portion on the Y-axis negative side of each cable 22a are connected to a detection circuit provided for the load sensor 1.

As shown in FIG. 5, the cables 12a, 22a drawn from the three sets of electrically-conductive elastic bodies 12, 22 will be referred to as lines L11, L12, L13, and the electrically-conductive members 31 in the three pairs of conductor wires 13 will be referred to as lines L21, L22, L23. The positions at which the electrically-conductive elastic bodies 12, 22 connected to the line L11 cross the lines L21, L22, L23 are the sensor parts A11, A12, A13, respectively. The positions at which the electrically-conductive elastic bodies 12, 22 connected to the line L12 cross the lines L21, L22, L23 are the sensor parts A21, A22, A23, respectively. The positions at which the electrically-conductive elastic bodies 12, 22 connected to the line L13 cross the lines L21, L22, L23 are the sensor parts A31, A32, A33, respectively.

When a load is applied to the sensor part A11, the contact area between the pair of conductor wires 13 and the electrically-conductive elastic body 12, 22 increases in the sensor part A11. Therefore, when the capacitance between the line L11 and the line L21 is detected, the load applied to the sensor part A11 can be calculated. Similarly, in another sensor part as well, when the capacitance between two lines crossing each other in the other sensor part is detected, the load applied to the other sensor part can be calculated.

Here, in a case where a conductor wire 13a, 13b implemented by a twisted wire is used as an electrode forming a sensor part as described above, when untwisting has occurred in the conductor wire 13a, 13b as in Comparative Example 1 below, the relationship between the load and the capacitance is unintentionally changed.

FIG. 6A is a cross-sectional view schematically showing a periphery of a conductor wire 13a, 13b, viewed in the X-axis negative direction in Comparative Example 1.

In Comparative Example 1, untwisting has occurred in the conductor wire 13a, 13b, and the state in which a plurality of element wires 30 are bound together as shown in FIGS. 3A, 3B has been canceled. Such untwisting can occur when, for example, a load has been applied a large number of times to the conductor wire 13a, 13b. When such untwisting has occurred, the plurality of element wires 30 are loosened to be spread in the Y-axis direction at the time of application of a load, as shown in FIG. 6A. In this case, when compared with a case where the twisted state of the conductor wire 13a, 13b is appropriate, even though the same load is applied, the contact area between the conductor wire 13a and the electrically-conductive elastic body 12, 22 increases and the capacitance increases.

FIG. 6B is a diagram schematically showing change in capacitance in Comparative Example 1.

The graph on the left side in FIG. 6B is a graph indicating the relationship between the load applied to one sensor part and the capacitance in this sensor part, in a case where no untwisting has occurred in the conductor wire 13a, 13b of a pair of conductor wires 13. In a case where no untwisting has occurred in the conductor wire 13a, 13b, in the example shown in the graph on the left side in FIG. 6B, when the value of the load is 0, the value of the capacitance is also substantially 0.

The graph on the right side in FIG. 6B is a graph showing the relationship between the load applied to one sensor part and the capacitance in this sensor part in a case where untwisting has occurred in the conductor wire 13a, 13b of a pair of conductor wires 13. The curve indicated by a broken line in the graph on the right side in FIG. 6B is the same as the curve in the graph on the left side in FIG. 6B.

In this case, since untwisting has occurred in the conductor wire 13a, 13b as shown in FIG. 6A, the contact area between the conductor wire 13a, 13b and the electrically-conductive elastic body 12, 22 increases when compared with a case where no untwisting has occurred. Therefore, on the graph on the right side in FIG. 6B, the capacitance is shifted in the upward direction, when compared with the graph on the left side in FIG. 6B. In this case, when the load is detected on the basis of the detected capacitance, the applied load is detected as having a value greater than the true value.

Therefore, the inventors examined the twist pitch p, of the conductor wire 13a, 13b, at which untwisting in the conductor wire 13a, 13b is less likely to occur.

The condition of the examination is as follows. The outer diameter d (see FIG. 3B) of each element wire 30 in a pair of conductor wires 13 was set to any one of 0.055 mm, 0.073 mm, and 0.105 mm. A number n of element wires 30 included in one conductor wire 13a, 13b was set to any one of 7, 11, and 15. The twist pitch p (see FIG. 3A) of the conductor wire 13a, 13b was set to any one of 3 mm, 5 mm 10 mm, 15 mm, and 20 mm. Through combinations of the outer diameter d and the number n, and the twist pitch p, 15 kinds of pairs of conductor wires 13 were created.

Each of the created pairs of conductor wires 13 was set to the load sensor 1, and the capacitance when a load of 0.3 MPa was applied was measured as pre-measurement. Then, a load of 0.5 MPa was applied 10,000 times to the load sensor 1. Then, the capacitance when a load of 0.3 MPa was applied again was measured as post-measurement.

Figure 7A:
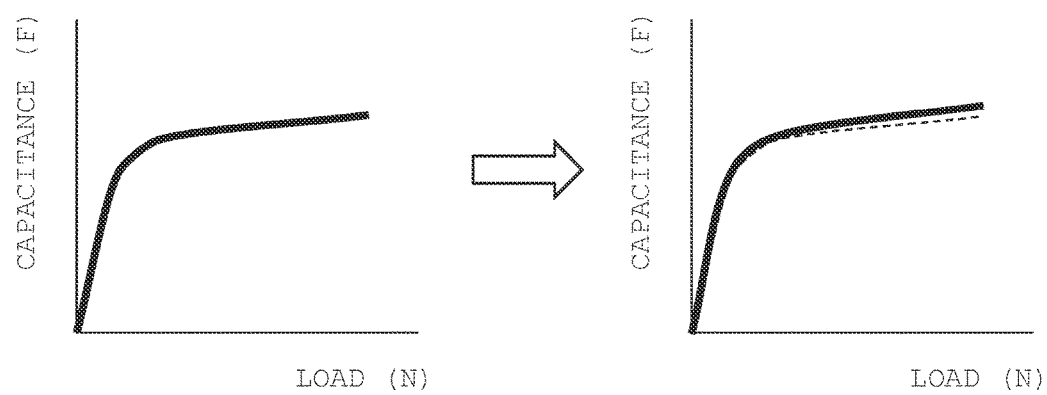
FIG. 7A is a table showing a result of examination regarding a twist pitch, according to Embodiment 1.

FIG. 7A is a table showing the result of examination of the twist pitch p performed by the inventors.

"o" indicates that the increase rate was less than 10% in the pre-measurement and the post-measurement. "x" indicates that the increase rate of the capacitance was not less than 10% in the pre-measurement and the post-measurement. When the increase rate is not less than 10%, it is possible to determine that untwisting has occurred in the conductor wire 13a, 13b. "–" indicates that since the twist pitch was less than the minimum twist pitch, examination was not possible.

According to a result of this examination, in a case where d=0.055 and n=7, when the twist pitch p was not less than 5 mm, the increase rate of the capacitance was not less than 10%. In a case where d=0.073 and n=11, when the twist pitch p was not less than 10 mm, the increase rate of the capacitance was not less than 10%. In a case where d=0.105 and n=15, when the twist pitch p was 20 mm, the increase rate of the capacitance was not less than 10%.

Here, the inventors focused on the value of 12nd obtained by multiplying the outer diameter d of an element wire 30 by the number n of element wires 30, then by 12. When 12nd was calculated in three combinations of the outer diameter d and the number n, 4.6, 9.6, and 18.9 were obtained as shown in the table in FIG. 7A. The inventors compared these values of 12nd with the twist pitch p, and found that the increase rate of the capacitance was suppressed to be less than 10% when the twist pitch p was not greater than the value of 12nd.

That is, in a case where d=0.055 and n=7, the value of 12nd is 4.6. Therefore, it is estimated that, when the twist pitch p is not greater than 4.6, the increase rate of the capacitance is suppressed to be less than 10%. This estimation matches the above examination result. Similarly, in a case where d=0.073 and n=11, the value of 12nd is 9.6. Therefore, it is estimated that, when the twist pitch p is not greater than 9.6, the increase rate of the capacitance is suppressed to be less than 10%. This estimation also matches the above examination result. Similarly, in a case where d=0.105 and n=15, the value of 12nd is 18.9. Therefore, it is estimated that, when the twist pitch p is not greater than 18.9, the increase rate of the capacitance is suppressed to be less than 10%. This estimation also matches the above examination result.

Therefore, it was found that when the twist pitch p of the plurality of element wires 30 satisfies conditional expression (1) below, the increase rate of the capacitance can be suppressed to be less than 10%. The conductor wire 13a, 13b of Embodiment 1 is configured so as to satisfy conditional expression (1) below.

$$p \leq 12nd \quad (1)$$

p: the twist pitch of the plurality of element wires, n: the number of the element wires included in the conductor wire, and d: the outer diameter of each element wire.

FIG. 7B is a diagram schematically showing change in capacitance in Embodiment 1.

The graph on the left side in FIG. 7B is the same as the graph on the left side in FIG. 6B. The graph on the right side in FIG. 7B is a graph showing the relationship between the load and the capacitance after a load has been applied a large number of times (e.g., 10,000 times) to the load sensor 1 of Embodiment 1. The curve indicated by a broken line in the graph on the right side in FIG. 7B is the same as the curve in the graph on the left side in FIG. 7B.

According to the load sensor 1 of Embodiment 1, the twist pitch p is set so as to satisfy the above expression (1). Therefore, after a load has been applied a large number of times as well, untwisting does not substantially occur in the conductor wire 13a, 13b. Therefore, the contact area between the conductor wire 13a, 13b and the electrically-conductive elastic body 12, 22 does not substantially increase when compared with a case where untwisting has not occurred (the graph on the left side in FIG. 7B). Therefore, in the graph on the right side in FIG. 7B, the gap between the curve (the curve indicated by the broken line) when untwisting has not occurred and the curve (the curve indicated by a solid line) after a load has been applied a large number of times is significantly suppressed in Embodiment 1.

Effects of Embodiment 1

According to Embodiment 1, the following effects are exhibited.

The conductor wire 13a, 13b of a pair of conductor wires 13 is disposed between the base member 21 and the electrically-conductive elastic bodes 12, and is configured as a plurality of element wires 30 being twisted. The conductor wire 13a, 13b is configured as an electrically-conductive member 31 which has a linear shape and of which the surface is covered by a dielectric body 32. The twist pitch p of the plurality of element wires 30 is configured so as to satisfy the above expression (1). Accordingly, untwisting of the element wires 30 is suppressed. Therefore, as shown in the graph on the right side in FIG. 7B, characteristic change in capacitance between the electrically-conductive elastic body 12, 22 and the electrically-conductive member 31 is suppressed. Therefore, a load can be appropriately detected while using the conductor wire 13a, 13b (twisted wire) configured as a plurality of element wires 30 being twisted.

Each of the plurality of electrically-conductive elastic bodies 12, 22 has a band-like shape that is long in the Y-axis direction perpendicular to the direction (the X-axis direction) in which the conductor wire 13a, 13b extends, and a plurality of pairs of conductor wires 13 are disposed in the Y-axis direction. Accordingly, regions (sensor parts) for detecting a load can be disposed in a matrix shape.

The electrically-conductive elastic bodes 12 are formed on the opposing face 11a of the base member 11, and the electrically-conductive elastic bodies 22 are disposed so as to oppose the electrically-conductive elastic bodies 12, 22 on the opposing face 21a of the base member 21. Each pair of conductor wires 13 (the conductor wires 13a, 13b) is disposed between the electrically-conductive elastic bodies 12 and the electrically-conductive elastic bodies 22. Accordingly, the capacitance between the electrically-conductive elastic body 12, 22 and the pair of conductor wires 13 (the conductor wires 13a, 13b) can be set to be large, and thus, sensitivity of the load sensor 1 can be increased.

Each pair of conductor wires 13 (the conductor wires 13a, 13b) is disposed in a wave shape in a plane (in the X-Y plane) parallel to the base members 11, 21. Accordingly, even when the base members 11, 21 expand and contract in a plane parallel to the base members 11, 21, the bent state of the pair of conductor wires 13 (the conductor wires 13a, 13b) changes, and thus, breakage of the pair of conductor wires 13 (the conductor wires 13a, 13b) can be avoided. When compared with a case where the pair of conductor wires 13 (the conductor wires 13a, 13b) is linearly disposed, the density of the conductor wires per unit area is increased. Therefore, detection sensitivity of the load sensor 1 can be increased.

Embodiment 2

The inventors investigated ways to further increase the sensitivity and to widen the dynamic range of the load sensor 1 of Embodiment 1 above. As a result, the inventors found that when the interval between the conductor wire 13a and the conductor wire 13b is reduced relative to the width of a sensor part such that the inclination angle of the wave shape of the pair of conductor wires 13 becomes large, sensitivity is increased and the dynamic range is widened in the load sensor 1. In Embodiment 2, as shown below, the width between the conductor wires 13a, 13b when the sensitivity and the dynamic range become favorable was investigated, and a load sensor 1 in which the width between the conductor wires 13a, 13b is set on the basis of the investigation result is used. The other configurations of Embodiment 2 are the same as those of Embodiment 1.

FIG. 8 is a diagram for describing the width of the sensor part and the interval between the conductor wires 13a, 13b in Embodiment 2. FIG. 8 is a plan view schematically showing the inside of the load sensor 1, viewed in the Z-axis negative direction. Similar to FIG. 5, in FIG. 8, nine sensor parts A are arranged in a matrix shape.

In FIG. 8, the width, of one sensor part A, in the directions (the X-axis direction and the Y-axis direction) in which the sensor parts A are arranged is d1. The interval (the interval between a conductor wire 13a and a conductor wire 13b) between a pair of conductor wires 13 in the direction (the Y-axis direction) in which the electrically-conductive elastic bodies 12, 22 extend is d2. The inclination angle between the wave shape of the pair of conductor wires 13 (the conductor wires 13a, 13b) and the direction (the X-axis direction) in which the pair of conductor wires 13 extend is e. The inclination angle θ is an angle at the time when the angle between the wave shape and the X-axis direction becomes largest.

The inventors fixed, in the load sensor 1 as shown in FIG. 8, the width d1 of the sensor part A to 12 mm, and set the interval d2 between the conductor wires 13a, 13b to any one of 3 mm, 4 mm, 5 mm, 6 mm, and 7 mm, thereby creating five kinds of load sensors 1 in accordance with the five kinds of the interval d2. At this time, each load sensor 1 was created such that each pair of conductor wires 13 was confined in the range of the width d1 of each of the sensor parts A arranged in the X-axis direction and the wave shape of the pair of conductor wires 13 had the greatest amplitude in the Y-axis direction. Then, while the load was changed, the value of the capacitance was measured.

Figure 9:
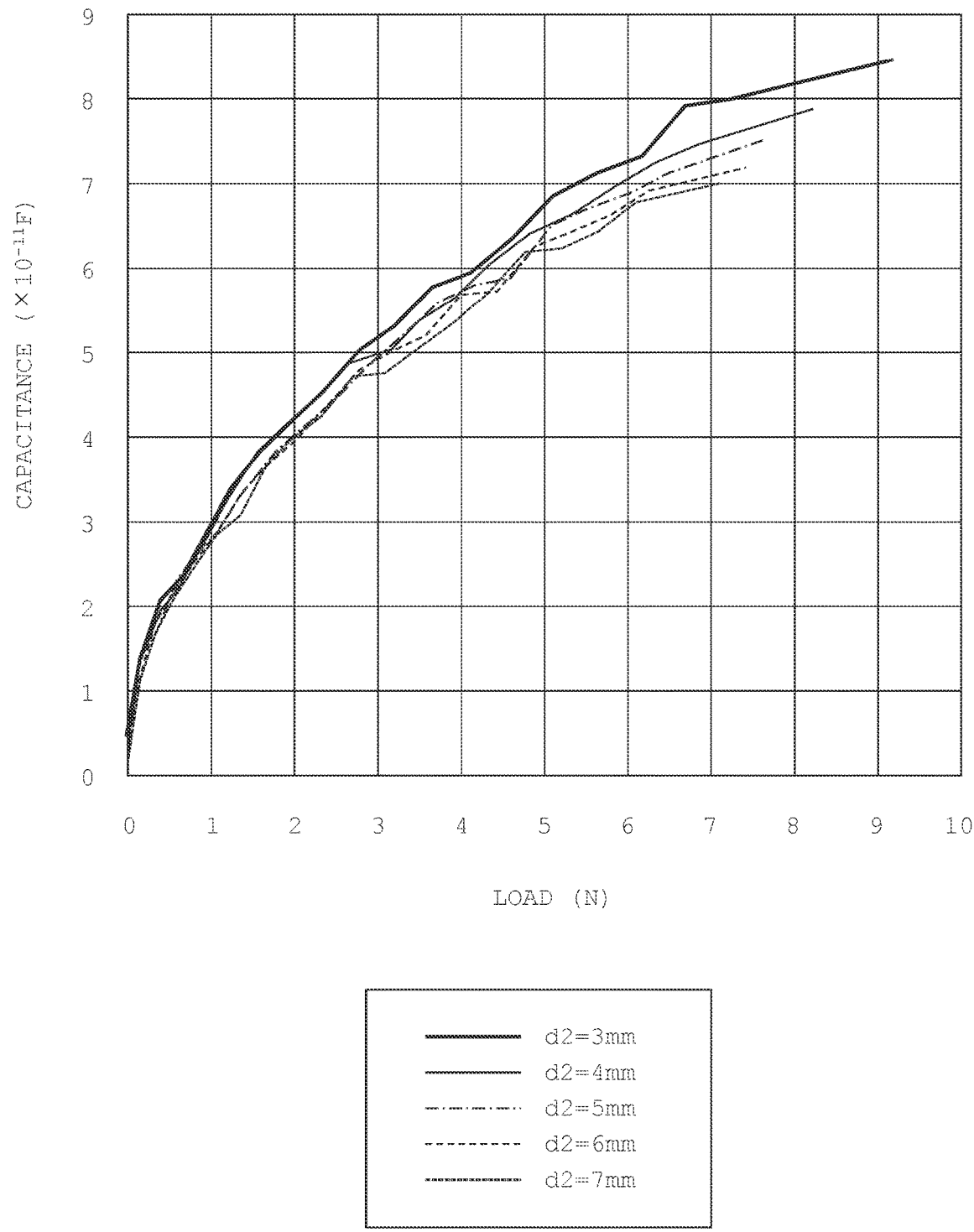
FIG. 9 is a graph showing a result of examination regarding the interval between conductor wires, according to Embodiment 2.

FIG. 9 is a graph showing a result of examination regarding the interval d2 between the conductor wires 13a, 13b performed by the inventors.

FIG. 9 shows the relationship between the load and the capacitance in a range up to saturation of change in capacitance caused by start of contact between the electrically-conductive elastic body 12 and the electrically-conductive elastic body 22. That is, in a range in which linearity of change in capacitance is ensured, the load can be smoothly and appropriately measured. This range is the dynamic range of load measurement. FIG. 9 shows the range in which linearity of change in capacitance is ensured. Therefore, the maximum load in this range is the maximum load (the maximum load in the dynamic range) at which appropriate load detection can be performed.

As shown in FIG. 9, it was found that, in accordance with decrease in the interval d2, the value of the capacitance increasing in accordance with the load becomes large, and the sensitivity of the load sensor 1 is increased. In addition, it was found that, in accordance with decrease in the interval d2, the maximum load at which appropriate load detection can be performed becomes large, and the dynamic range of the load sensor 1 is increased. When the interval d2 was 3 mm to 5 mm, the capacitance increasing in accordance with the load was relatively large and the detectable maximum load was relatively large, when compared with cases where the interval d2 was 6 mm to 7 mm.

From the result above, the inventors determined that it is preferable that, when the width d1 of the sensor part A is 12 mm, the interval d2 between the conductor wires 13a, 13b is 3 mm to 5 mm. Then, on the basis of this result, the inventors derived expression (2) below as a conditional expression of the width d1 and the interval d2.

$$d2 \leq d1/2 \tag{2}$$

That is, when the width d1 and the interval d2 are set so as to satisfy the above expression (2), the sensitivity of the load sensor 1 is increased and the dynamic range of the load sensor 1 is widened.

FIGS. 10A, 10B are plan views schematically showing the insides of the load sensors 1 of Embodiment 2 and Comparative Example 2, respectively, viewed in the Z-axis negative direction. In FIGS. 10A, 10B, only some of the sensor parts A are shown, for convenience.

As shown in FIG. 10A, in Embodiment 2, the width d1 of each sensor part A and the interval d2 between the corresponding conductor wires 13a, 13b are set so as to satisfy the above expression (2) (so as to realize d2≤d1/2). On the other hand, as shown in FIG. 10B, in Comparative Example 2, the width d1 and the interval d2 are set so as not to satisfy the above expression (2) (so as to realize d2>d1/2). When the width d1 and the interval d2 are set as shown in Embodiment 2 in FIG. 10A, the inclination angle θ can be made large, when compared with that of Comparative Example 2 in FIG. 10B. Accordingly, change in capacitance in the sensor part A can be made large. Since the conductor wire 13a, 13b receives a load in a large contact area, the conductor wire 13a, 13b sinks into the electrically-conductive elastic body 12, 22, and the load (the maximum load in the dynamic range) at the time when the electrically-conductive elastic body 12 and the electrically-conductive elastic body 22 come into contact with each other and the load is started to be supported also between the electrically-conductive elastic body 12 and the electrically-conductive elastic body 22, can be made large.

Effects of Embodiment 2

According to Embodiment 2, the following effects are exhibited.

In a case where each sensor part A is configured by causing the electrically-conductive elastic bodies 12, 22 to cross a pair of conductor wires 13 as described above, it has been desired to increase the sensitivity of the load sensor 1 and to widen the dynamic range of the load sensor 1.

Thus, the load sensor 1 of Embodiment 2 is configured as follows.

The load sensor 1, in which a plurality of sensor parts A arranged at least in a first direction (the X-axis direction) are set in a measurement region, includes:

a first base member 11 and a second base member 21 disposed so as to face each other;

a plurality of electrically-conductive elastic bodies 12 disposed at positions respectively corresponding to the plurality of sensor parts A on an opposing face of the first base member 11; and a pair of conductor wires 13 having a dielectric body 32 therearound and disposed so as to extend along the plurality of sensor parts A between the second base member 21 and the electrically-conductive elastic bodies 12, the pair of conductor wires 13 is disposed in a wave shape having an amplitude direction extending in a second direction (the Y-axis direction) perpendicular to the first direction (the X-axis direction), in a plane parallel to the first base member 11 and the second base member 21, and crosses the plurality of electrically-conductive elastic bodies 12 at positions of the plurality of sensor parts A, and an interval between two conductor wires 13a, 13b forming the pair of conductor wires 13 is not greater than ½ of a width in the second direction of each sensor part A.

As shown in FIG. 8, in the load sensor 1, a plurality of sensor parts A are set in the X-axis direction (the first direction) in the measurement region R. The electrically-conductive elastic bodies 12 are disposed at positions respectively corresponding to the plurality of sensor parts A arranged in the X-axis direction, on the opposing face 11a (see FIGS. 1A, 1B) of the base member 11. The pair of conductor wires 13 is disposed so as to extend along the plurality of sensor parts A arranged in the X-axis direction, between the base member 21 and the electrically-conductive elastic bodies 12. The pair of conductor wires 13 is disposed in a wave shape having an amplitude direction extending in the Y-axis direction (the second direction) perpendicular to the X-axis direction (the first direction), in a plane parallel to the base members 11, 21, and crosses the plurality of electrically-conductive elastic bodies 12 at positions of the plurality of sensor parts A arranged in the X-axis direction. The interval d2 between two conductor wires 13a, 13b is set to be not greater than ½ of the width d1 of each sensor part A.

When the interval d2 between two conductor wires 13a, 13b forming a pair of conductor wires 13 is set in this manner, the inclination angle θ of the wave shape of the pair of conductor wires 13 can be made large while the pair of conductor wires 13 is confined in the range of the width d1 of the sensor part A. When the inclination angle θ of the wave shape becomes large, the contact length between the pair of conductor wires 13 and the electrically-conductive elastic bodies 12, 22 is increased as a result of the pair of conductor wires 13 diagonally crossing the electrically-conductive elastic bodies 12, 22 at the position of the sensor part A as shown in FIG. 10A.

Accordingly, change in capacitance when a load has been applied can be made large, and thus, the sensitivity of the load sensor 1 can be increased. Since the contact area between the conductor wire 13a, 13b and the electrically-conductive elastic body 12, 22 becomes large, the pressure applied to the electrically-conductive elastic body 12, 22 being in contact with the conductor wire 13a, 13b due to the load, is suppressed. That is, since the conductor wire 13a, 13b is less likely to be embedded in the electrically-conductive elastic body 12, 22 as shown in FIG. 4B, the range of the load up to saturation of characteristics caused by one electrically-conductive elastic body coming into contact with the other electrically-conductive elastic body is widened. Therefore, the dynamic range in which the load can be detected can be widened.

The plurality of electrically-conductive elastic bodies 12, 22 each have a band-like shape that is long in the Y-axis direction (the second direction), and a plurality of pairs of conductor wires 13 are disposed in the Y-axis direction. Accordingly, regions (the sensor parts A) for detecting loads can be disposed in a matrix shape.

The load sensor 1 includes other electrically-conductive elastic bodies 22 disposed so as to oppose the electrically-conductive elastic bodies 12, on the opposing face of the second base member 21, and the pair of conductor wires 13 is disposed between the electrically-conductive elastic bodies 12 and the other electrically-conductive elastic bodies 22.

That is, the electrically-conductive elastic bodies 12 are disposed on the opposing face 11a of the base member 11, and the other electrically-conductive elastic bodies 22 are disposed on the opposing face 21a of the base member 21 so as to oppose the electrically-conductive elastic bodies 12. The pair of conductor wires 13 is disposed between the electrically-conductive elastic bodies 12 and the other electrically-conductive elastic bodies 22. Accordingly, when compared with a case where either one of the electrically-conductive elastic bodies 12, 22 are disposed, setting can be performed such that capacitance between the electrically-conductive elastic body 12, 22 and the pair of conductor wires 13 becomes large, whereby the sensitivity of the load sensor 1 can be increased.

As described with reference to FIG. 3A, each conductor wire 13a, 13b is configured as a plurality of element wires 30 being twisted, and each element wire 30 is configured as an electrically-conductive member 31 which has a linear shape and of which the surface is covered by the dielectric body 32. Thus, when the conductor wire 13a, 13b is a twisted wire configured as a plurality of element wires 30 being twisted, bending resistance of the conductor wire 13a, 13b can be increased. Therefore, even when the pair of conductor wires 13 is disposed in a wave shape as shown in FIG. 10A, the pair of conductor wires 13 can be prevented from being broken.

<Modifications>

The configuration of the load sensor 1 can be modified in various ways other than the configuration shown in the above embodiment.

For example, in Embodiments 1 and 2 above, as the number n of element wires 30 included in the conductor wire 13a or the conductor wire 13b, 7, 11, and 15 are exemplified as shown in the table in FIG. 7A, but the number n of element wires 30 is not limited thereto.

In Embodiment 1 above, the load sensor 1 includes three pairs of conductor wires 13. However, the load sensor 1 only needs to include at least one pair of conductor wires 13. For example, the number of pairs of conductor wires 13 included in the load sensor 1 may be one.

In Embodiments 1 and 2 above, the load sensor 1 includes three sets of electrically-conductive elastic bodies 12, 22 that oppose each other in the up-down direction. However, the load sensor 1 only needs to include at least one set of electrically-conductive elastic bodies 12, 22. For example, the number of sets of electrically-conductive elastic bodies 12, 22 included in the load sensor 1 may be one.

In Embodiments 1 and 2 above, the electrically-conductive elastic bodies 22 on the base member 21 side may be omitted. In this case, the pair of conductor wires 13 is sandwiched by the electrically-conductive elastic bodies 12 on the base member 11 side and the opposing face 21a of the base member 21, the pair of conductor wires 13 sinks into the electrically-conductive elastic bodies 12 in accordance with the load, whereby capacitance in each sensor part changes.

In Embodiment 1 above, one pair of conductor wires 13 has a shape in which the conductor wires 13a, 13b arranged in the Y-axis direction are connected to each other at an end portion in the X-axis direction. However, instead of one pair of conductor wires 13, one conductor wire may be disposed, or three or more conductor wires may be disposed. In Embodiment 1 above, the shape of one pair of conductor wires 13 need not necessarily be a wave shape, and may be a linear shape. When one conductor wire is disposed instead of one pair of conductor wires 13 as well, the shape of this conductor wire may have a linear shape.

In Embodiment 2 above, each conductor wire 13a, 13b of one pair of conductor wires 13 need not necessarily be implemented by a twisted wire, and may be implemented by one element wire 30.

In Embodiments 1 and 2 above, the electrically-conductive elastic bodies 12, 22 are formed on the respective opposing faces 11a, 21a by a predetermined printing method. However, not limited thereto, the electrically-conductive elastic bodies 12, 22 may be set to the respective opposing faces 11a, 21a with an adhesive or the like.

In Embodiments 1 and 2 above, the conductor wire 13a, 13b is configured as element wires 30 being twisted, each element wire 30 being composed of an electrically-conductive member 31 and a dielectric body 32. However, not limited thereto, the conductor wire 13a, 13b may be configured as a twisted wire which is composed of twisted electrically-conductive members 31 and of which the surface is covered by a dielectric body.

In Embodiments 1 and 2 above, the shape of the load sensor 1 is a rectangular shape, but not limited thereto, may be another shape. For example, the shape of the load sensor 1 may be a circle, an ellipse, or a fan shape, or may be a shape in which a center portion of a fan shape has been cut off in a circular shape. The shape of the load sensor 1 can be freely set.

In the following, with reference to FIG. 11 to FIG. 13B, a production procedure of a load sensor 1 that has a shape in which a center portion of a fan shape has been cut off in a circular shape will be described.

Figure 11:
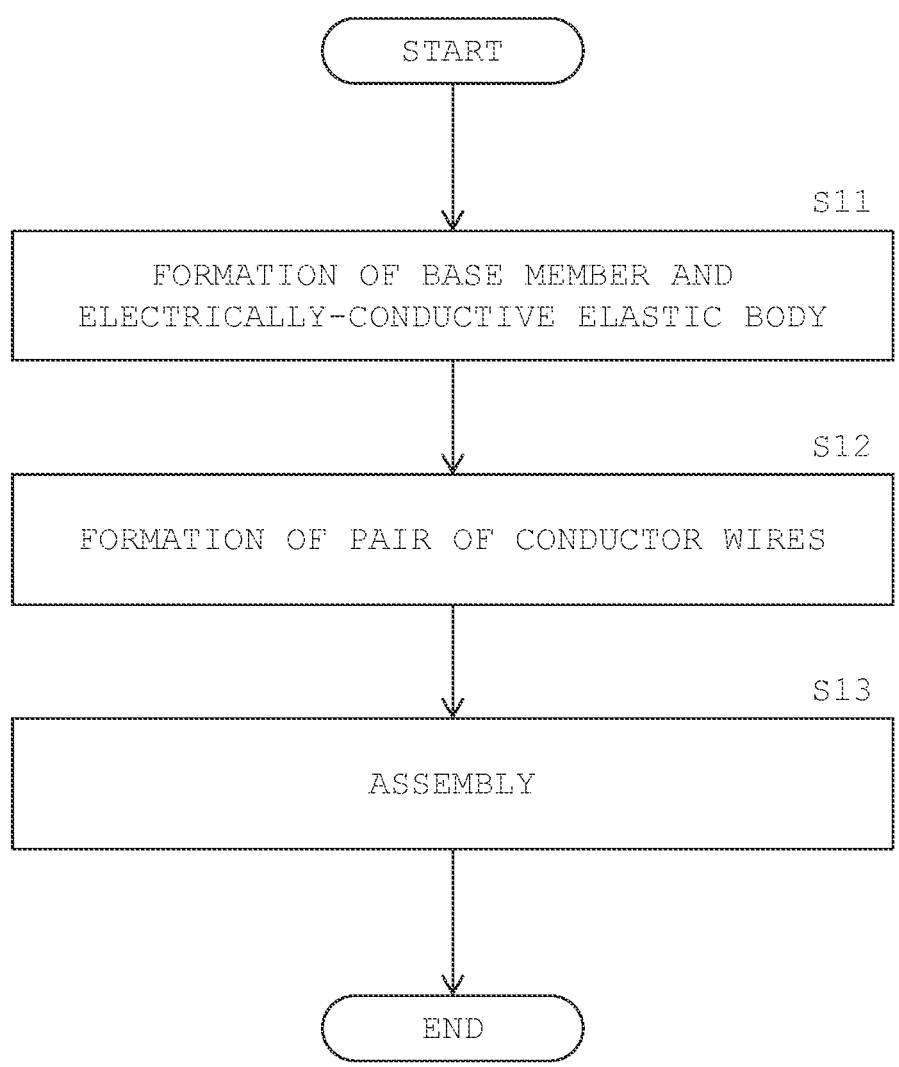
FIG. 11 is a flowchart showing a procedure of a production method of a load sensor, according to a modification.

FIG. 11 is a flowchart showing a procedure of a production method of the load sensor 1. FIG. 12A to FIG. 13B are each a schematic diagram showing a production process of the load sensor 1. Base members 11, 21, electrically-conductive elastic bodies 12, 22, and pairs of conductor wires 13 shown in FIG. 12A to FIG. 13B are the same as those in the above embodiments.

Figure 12A:
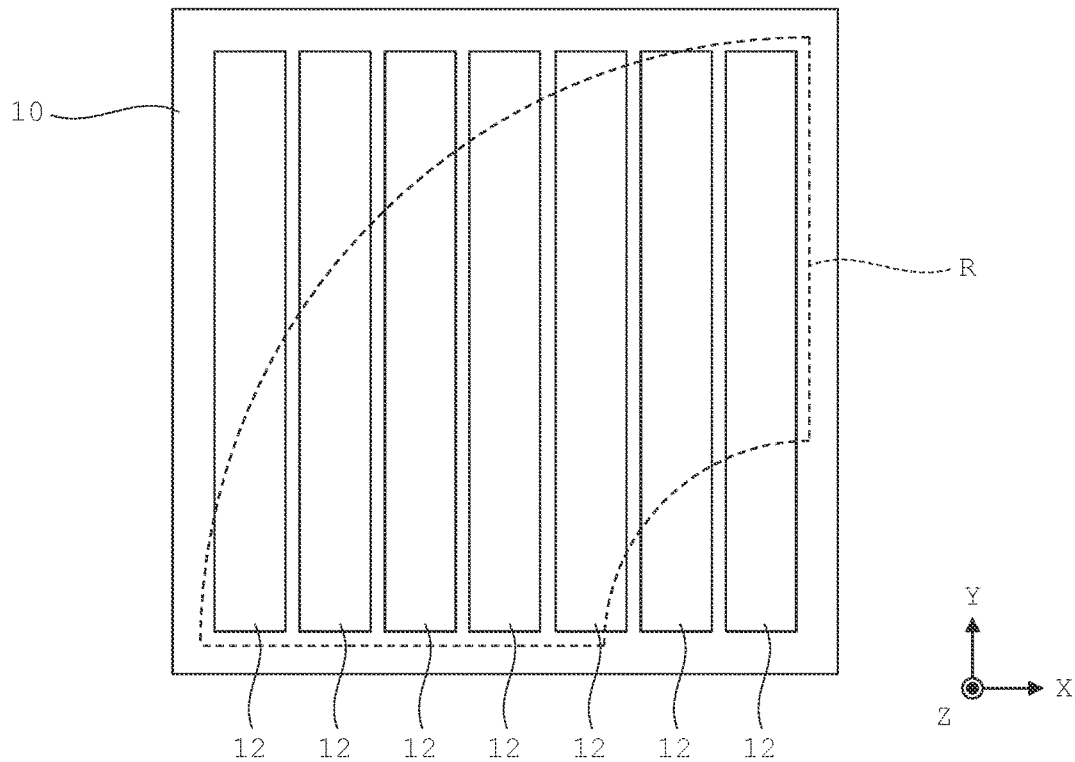
FIGS. 12A, 12B are each a schematic diagram showing a production process of a load sensor, according to a modification.

In the production steps below, as shown in FIG. 12A, a mother base member 10 in which a plurality of electrically-conductive elastic bodies 12 are disposed so as to be arranged is prepared in advance. A region having a shape that suits the shape of the load sensor 1 is cut out from this mother base member 10, and the cut out region is used as a base member of the load sensor 1. In a case where the base members 11, 21 on the upper side and the lower side are to be used in the load sensor 1, both base members 11, 21 are each cut out from the mother base member 10 such that the shape in a plan view when the base members 11, 21 are superposed with each other in the up-down direction is the shape of the load sensor 1. Further, as shown in FIG. 13B, a plurality of pairs of conductor wires 13 are formed so as to suit the shape of the cut out base member 11, 21. Then, the formed plurality of pairs of conductor wires 13 are disposed between the upper and lower base members 11, 21, whereby the load sensor 1 is formed.

More specifically, in step S11 in FIG. 11, the base member 11 and the electrically-conductive elastic bodies 12 on the lower face side are cut out from the mother base member 10 so as to suit a measurement region R (the region of the final shape of the load sensor 1), and the base member 21 and the electrically-conductive elastic bodies 22 on the upper face side are cut out from the mother base member 10 so as to suit the measurement region R.

Specifically, as shown in FIG. 12A, the mother base member 10 has a square shape, and on the face in the Z-axis positive side of the mother base member 10, a plurality of electrically-conductive elastic bodies 12 extending in the Y-axis direction have been formed so as to be arranged in the X-axis direction.

From the mother base member 10 shown in FIG. 12A, a region corresponding to the measurement region R is cut out. Accordingly, as show in FIG. 12B, a base member 11 and electrically-conductive elastic bodies 12 that correspond to the shape of the measurement region R are formed. For convenience, in FIG. 12B, each electrically-conductive elastic body 12 has a rectangular shape in a plan view. However, in actuality, end portions on the Y-axis positive and negative sides of each electrically-conductive elastic body 12 extend in the Y-axis direction up to the boundaries of the base member 11.

In the above step, a plurality of electrically-conductive elastic bodies 12 have been disposed on the mother base member 10 in advance. However, the electrically-conductive elastic bodies 12 need not have necessarily been disposed on the mother base member 10. In this case, after a region corresponding to the measurement region R has been cut out from the mother base member 10 and the base member 11 has been formed, a plurality of electrically-conductive elastic bodies 12 each having a rectangular shape may be disposed on the upper face of the base member 11, as in FIG. 12B.

Figure 12B:
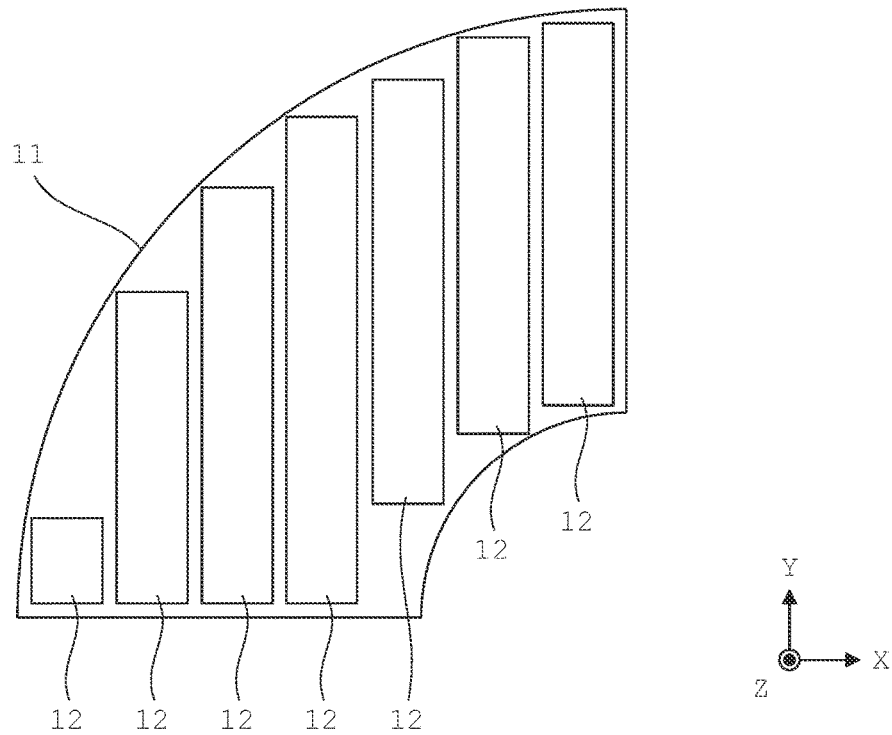

Then, as shown in FIG. 12B, the base member 11 and the electrically-conductive elastic bodies 12 are formed so as to correspond to the measurement region R. Similarly, the base member 21 and the electrically-conductive elastic bodies 22 are formed so as to correspond to the measurement region R.

Figure 13A:
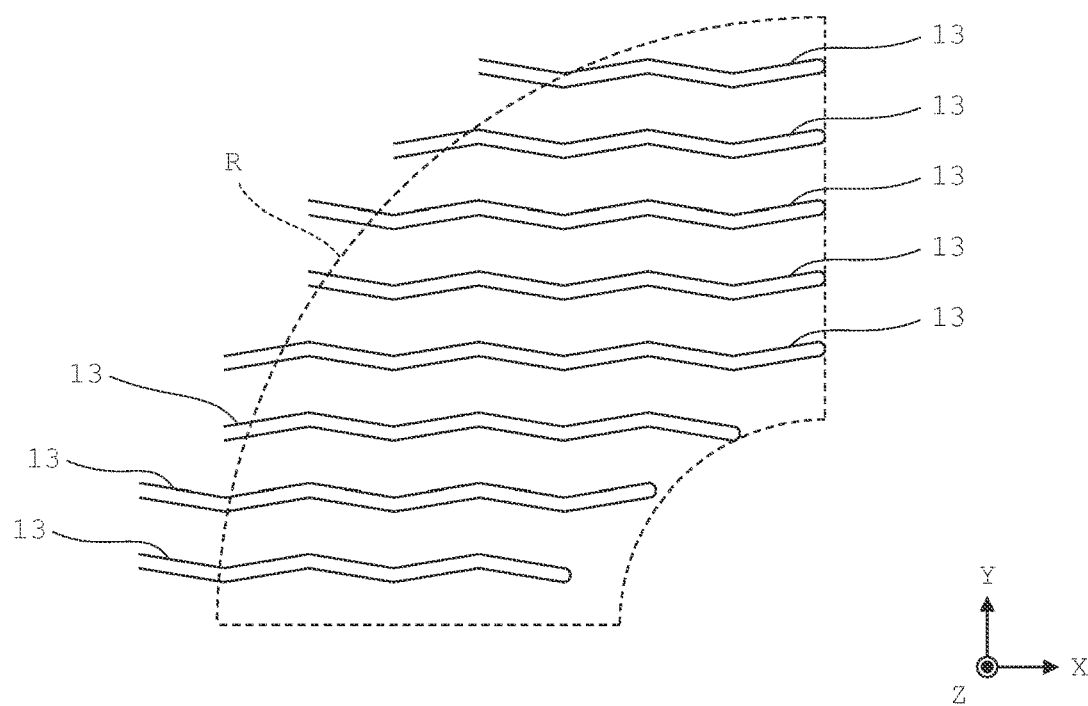
FIGS. 13A, 13B are each a schematic diagram showing a production process of a load sensor, according to a modification.
Figure 13B:
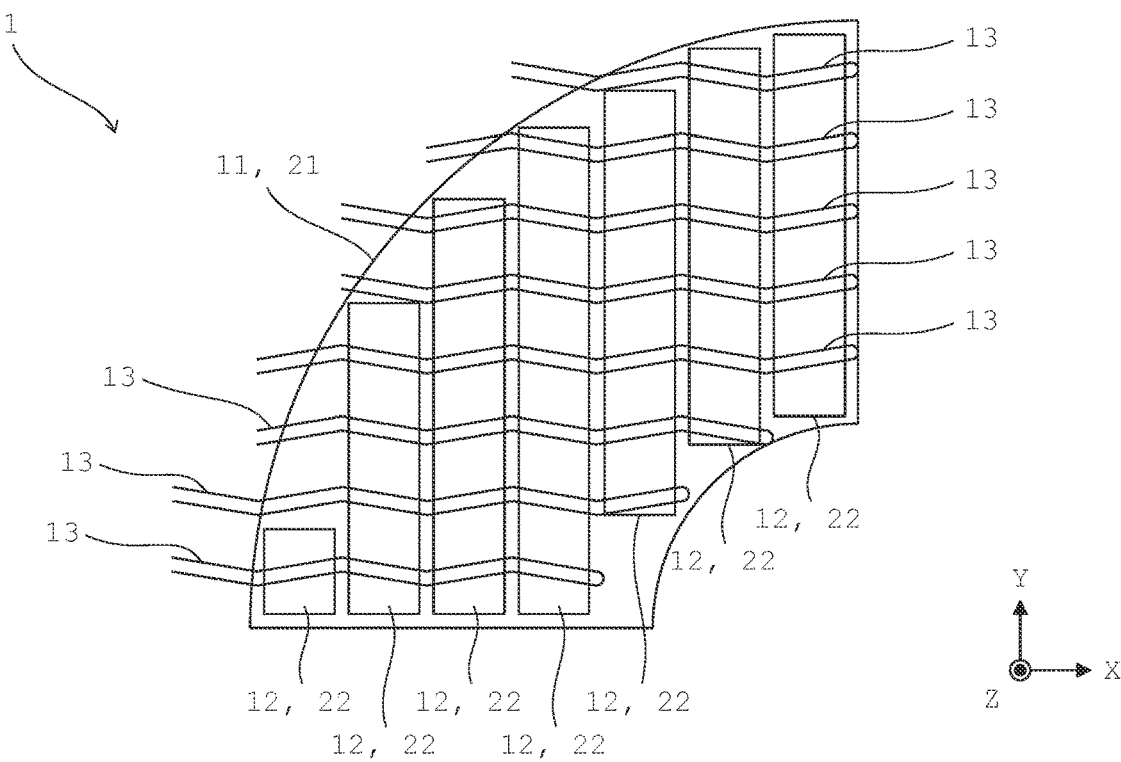

Next, in step S12, as shown in FIG. 13A, pairs of conductor wires 13 are formed so as to suit the measurement region R. Specifically, a plurality of pairs of conductor wires 13 extending in the X-axis direction are each disposed such that the turning-back portion thereof on the X-axis positive side is positioned inside the measurement region R. In FIG. 13A, the turning-back portions of three pairs of conductor wires 13 on the Y-axis negative side are set so as to be positioned on the X-axis negative side relative to those of the other pairs of conductor wires 13 such that the turning-back portions of the three pairs of conductor wires 13 suit the circular hole on the inner side of the measurement region R.

Next, in step S13, as shown in FIG. 13B, the base member 11 on which the electrically-conductive elastic bodies 12 are disposed, the base member 21 on which the electrically-conductive elastic bodies 22 are disposed, and the pairs of conductor wires 13 are assembled. FIG. 13B is a plan view schematically showing the inside of the load sensor 1, viewed in the Z-axis negative direction. Two base members 11, 21 are superposed with each other, whereby two electrically-conductive elastic bodies 12, 22 are superposed in a state of opposing each other, and the pairs of conductor wires 13 are sandwiched between the two electrically-conductive elastic bodies 12, 22. Then, assembly of the load sensor 1 is completed.

In the above production step, a region that suits the measurement region R (the region of the final shape of the load sensor 1) is cut out from the mother base member 10, and the base members 11, 21 and the electrically-conductive elastic bodies 12, 22 are formed at one time. Therefore, the number of assembly steps of the load sensor 1 can be reduced, and the load sensor 1 can be produced in a simple manner. This effect will be described with reference to Comparative Example 3 shown in FIG. 14.

FIG. 14 is a plan view schematically showing a production method of a load sensor 100 according to Comparative Example 3.

In Comparative Example 3, sensor units 110, 120 each having a rectangular shape are disposed on a base member 130 forming the outer shape of the load sensor 100. Each sensor unit 110 includes a base member 111, three electrically-conductive elastic bodes 112 extending in the Y-axis direction, and two pairs of conductor wires 113 extending in the X-axis direction. The sensor unit 120 includes a base member 121, an electrically-conductive elastic body 122, and a pair of conductor wires 123 extending in the X-axis direction.

Similar to the base member 11 in FIG. 12B, the base member 130 has a shape in which a center portion of a fan shape has been cut off in a circular shape. Three sensor units 110 and one sensor unit 120 are set on the base member 130. On the upper face of the base member 130, another base member that has base members and electrically-conductive elastic bodies that oppose the base members 111, 121 and the electrically-conductive elastic bodies 112, 122 is superposed. Then, the load sensor 100 of Comparative Example 3 is completed.

In the case of Comparative Example 3, it is necessary that a plurality of sensor units 110, 120 are individually produced so as to be efficiently laid out with respect to the base member 130, and then, these sensor units 110, 120 are disposed on the base member 130. Therefore, the number of assembly steps is increased. In addition, the load sensor 100 in FIG. 14 is configured such that the sensor units 110, 120 each having a rectangular shape are disposed on the base member 130. Therefore, in the region (measurement region) of the base member 130, a region (dead zone) where no sensor unit 110, 120 is disposed becomes large.

In contrast to this, according to the load sensor 1 shown in FIG. 12A to FIG. 13B, during production of the load sensor 1, the region that suits the measurement region R (the region of the final shape of the load sensor 1) is cut out from the mother base member 10, and the base members 11, 21 and the electrically-conductive elastic bodies 12, 22 are formed at one time. Therefore, when compared with Comparative Example 3, the number of assembly steps can be significantly reduced. In addition, since there is no need to dispose the sensor units 110, 120 on the base member 130 in a predetermined layout as in Comparative Example 3, the production steps of the load sensor 1 can be easily automated.

The length and the turning-back position of each pair of conductor wires 13 can be freely set in accordance with the shape of the base member 11, 21 by using a jig 200 shown below.

Figure 15:
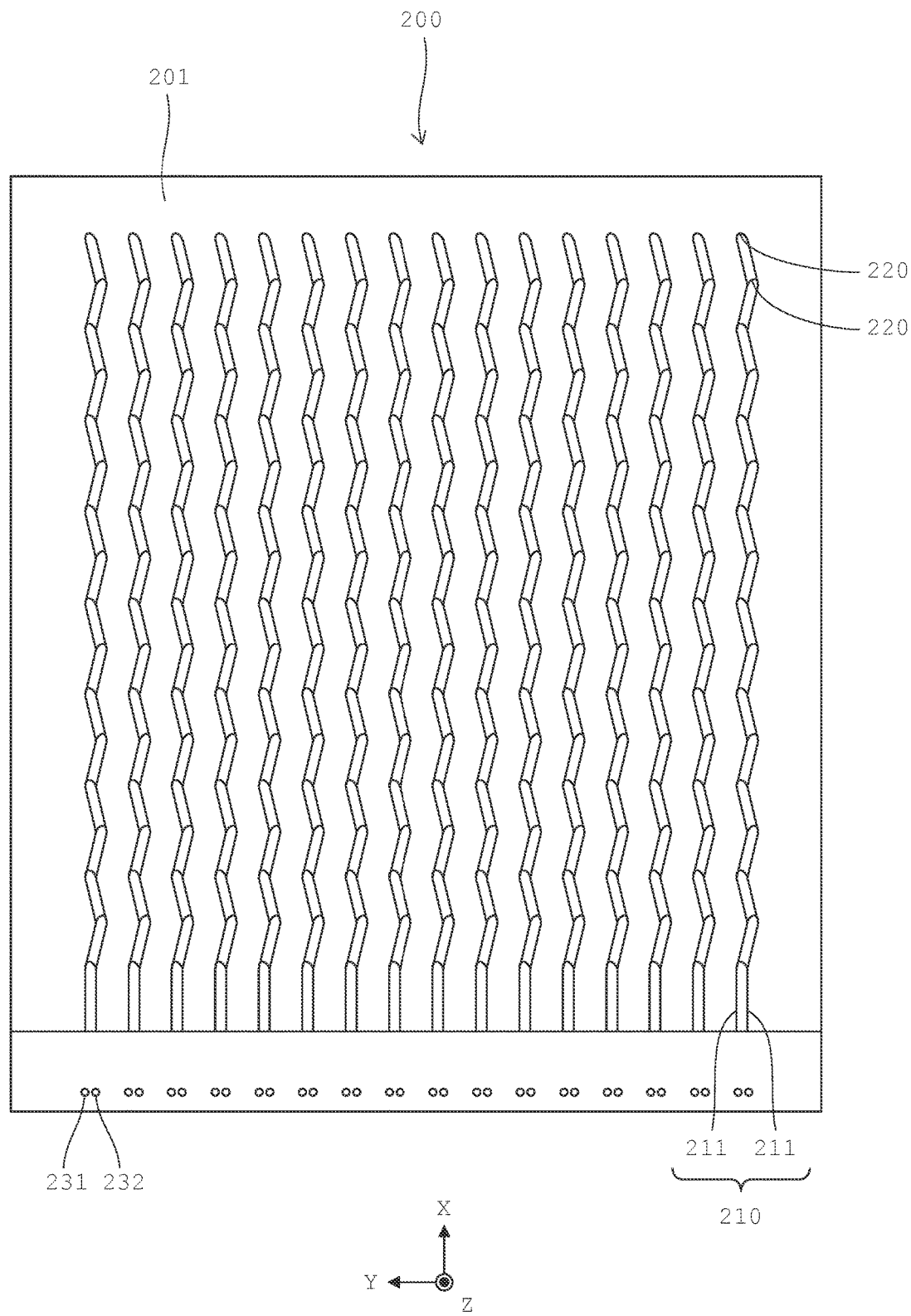
FIG. 15 is a plan view showing a configuration of a jig for forming a pair of conductor wires, according to a modification.

FIG. 15 is a plan view showing a configuration of the jig 200 for forming a pair of conductor wires 13. For convenience, in FIG. 15, as in FIGS. 13A and 13B, X-, Y-, and Z-axes are indicated, with the direction in which a pair of conductor wires 13 extend defined as the X-axis direction.

The jig 200 has formed therein a plurality of pairs of grooves 210 arranged in the Y-axis direction and extending in the X-axis direction while meandering in the Y-axis direction. In FIG. 15, 16 pairs of grooves 210 are arranged in the Y-axis direction. Each pair of grooves 210 is composed of two grooves 211 extending in the X-axis direction in the same meandering cycle. Two grooves 211 forming a pair are connected to each other by a turning-back groove 220 at an end portion on the X-axis positive side. In addition, two grooves 211 forming a pair are connected to each other by a plurality of turning-back grooves 220 at a predetermined interval, from the end on the X-axis negative side to the end on the X-axis positive side. Each groove 211 and each turning-back groove 220 are a recess that is lower than an upper face 201 (the face on the Z-axis positive side) of the jig 200. The jig 200 has formed therein pins 231, 232, on the X-axis negative side of each pair of grooves 210, so as to respectively correspond to the two grooves 211. The pins 231, 232 are used when a pair of conductor wires 13 is formed.

FIGS. 16A to 16D are each a plan view for describing a procedure of forming a pair of conductor wires 13 by using the jig 200.

Figure 16A:
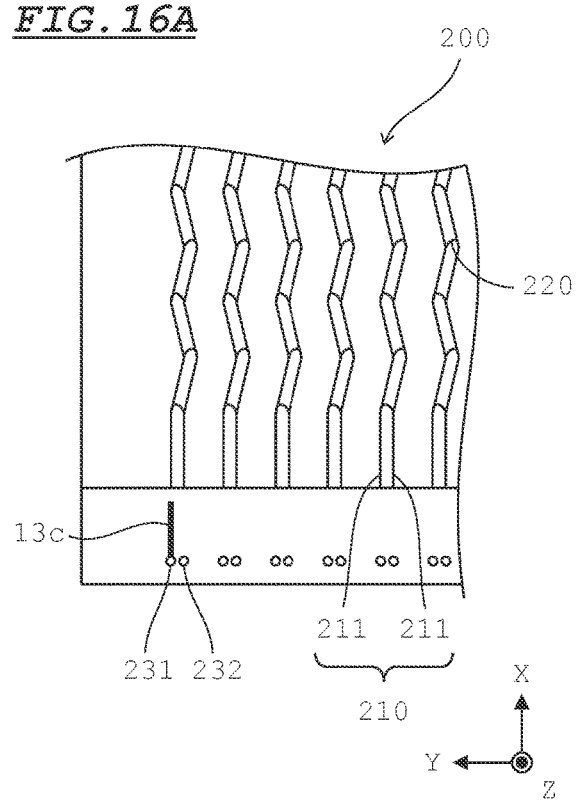
FIGS. 16A to 16D are each a plan view for describing a procedure of forming a pair of conductor wires by using a jig, according to a modification.
Figure 16B:
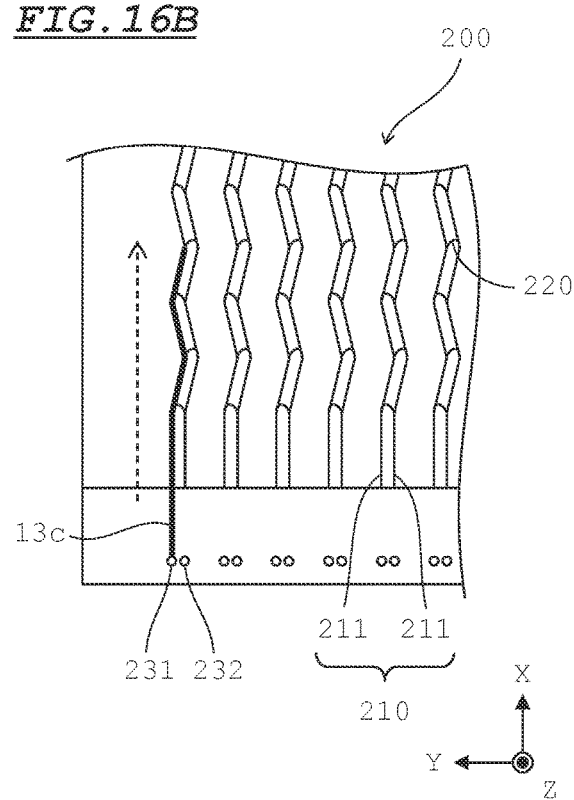

When a pair of conductor wires 13 is to be formed by using the jig 200, a conductor wire 13c drawn from a reel is passed through a nozzle. Then, as shown in FIG. 16A, an end portion of the conductor wire 13c drawn from the tip of the nozzle is hooked over and fixed at a pin 231 disposed on the outer side of the groove 211. In this state, as shown in FIG. 16B, the tip of the nozzle is moved in the X-axis positive direction along the groove 211 from the end on the X-axis negative side of the groove 211, while being pressed to the position of the groove 211. Accordingly, while being drawn from the nozzle, the conductor wire 13c is disposed in the groove 211.

Figure 16C:
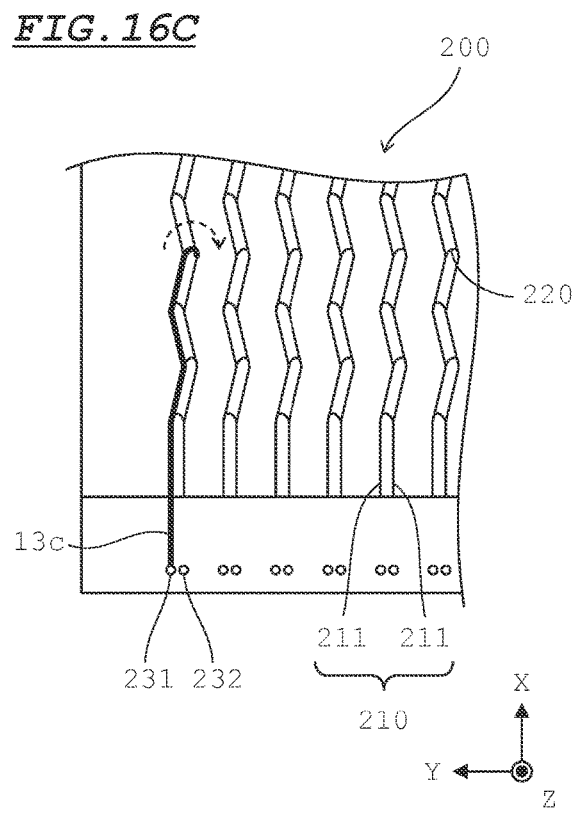

Then, when the nozzle has been moved up to the turning-back groove 220 serving as the turning-back position for the conductor wire 13c, the tip of the nozzle is passed through this turning-back groove 220, to be moved to the adjacent groove 211, as shown in FIG. 16C. Accordingly, the turning-back portion of the pair of conductor wires 13 is formed. The position of turning back is determined in accordance with the shape or the measurement region R of the load sensor 1.

Figure 16D:
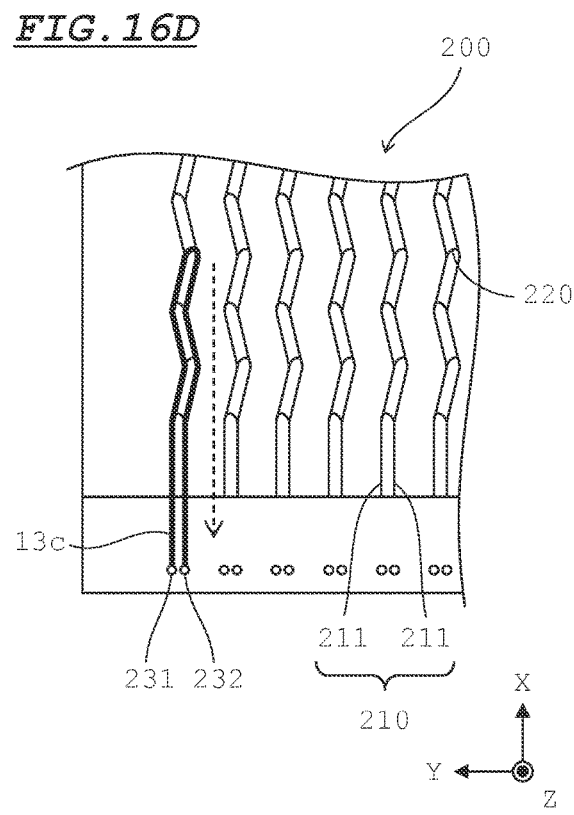

Subsequently, as shown in FIG. 16D, the tip of the nozzle is moved in the X-axis negative direction along the adjacent groove 211, whereby the conductor wire 13c is disposed along the adjacent groove 211. The nozzle is further moved up to a position at a predetermined distance in the X-axis negative direction from the end on the X-axis negative side of the adjacent groove 211, and then, the conductor wire 13c near the tip of the nozzle is hooked over and fixed at a pin 232 disposed on the outer side of the groove 211. Then, end portions on the X-axis negative side of the turned-back conductor wire 13c are cut at the same position in the X-axis direction, whereby one pair of conductor wires 13 is completed.

This work is sequentially repeated for each pair of grooves 210, whereby formation of a plurality of pairs of conductor wires 13 in one load sensor 1 is completed. At this time, the turning-back position of the conductor wire 13c is set to a position that corresponds to the length of each conductor wire 13c. Then, a plurality of pairs of conductor wires 13 having different lengths and different turning-back positions, as shown in FIGS. 13A, 13B, are formed.

As described above, with use of the jig 200, the tip of the nozzle is moved along a pair of grooves 210 and a turning-back groove 220 in the jig 200, whereby pairs of conductor wires 13 having various lengths can be formed in a simple manner. Therefore, when a movement mechanism of the nozzle is controlled by a movement pattern according to the length of each pair of conductor wires 13, pairs of conductor wires 13 having various lengths can be automatically formed.

Each pair of conductor wires 13c used in the above production step may be a conductor wire having a twisted wire structure as in Embodiment 1 above, or may be a conductor wire implemented by a single wire. The number of pairs of grooves 210 disposed in the jig 200 is not limited to that shown in FIG. 15, and may be another number. Further, the shape of the base member 11, 21 is not limited to the shape shown in FIGS. 12A, 12B, and can be freely changed in accordance with the shape of an apparatus to which the load sensor 1 is to be set.

Figure 17:
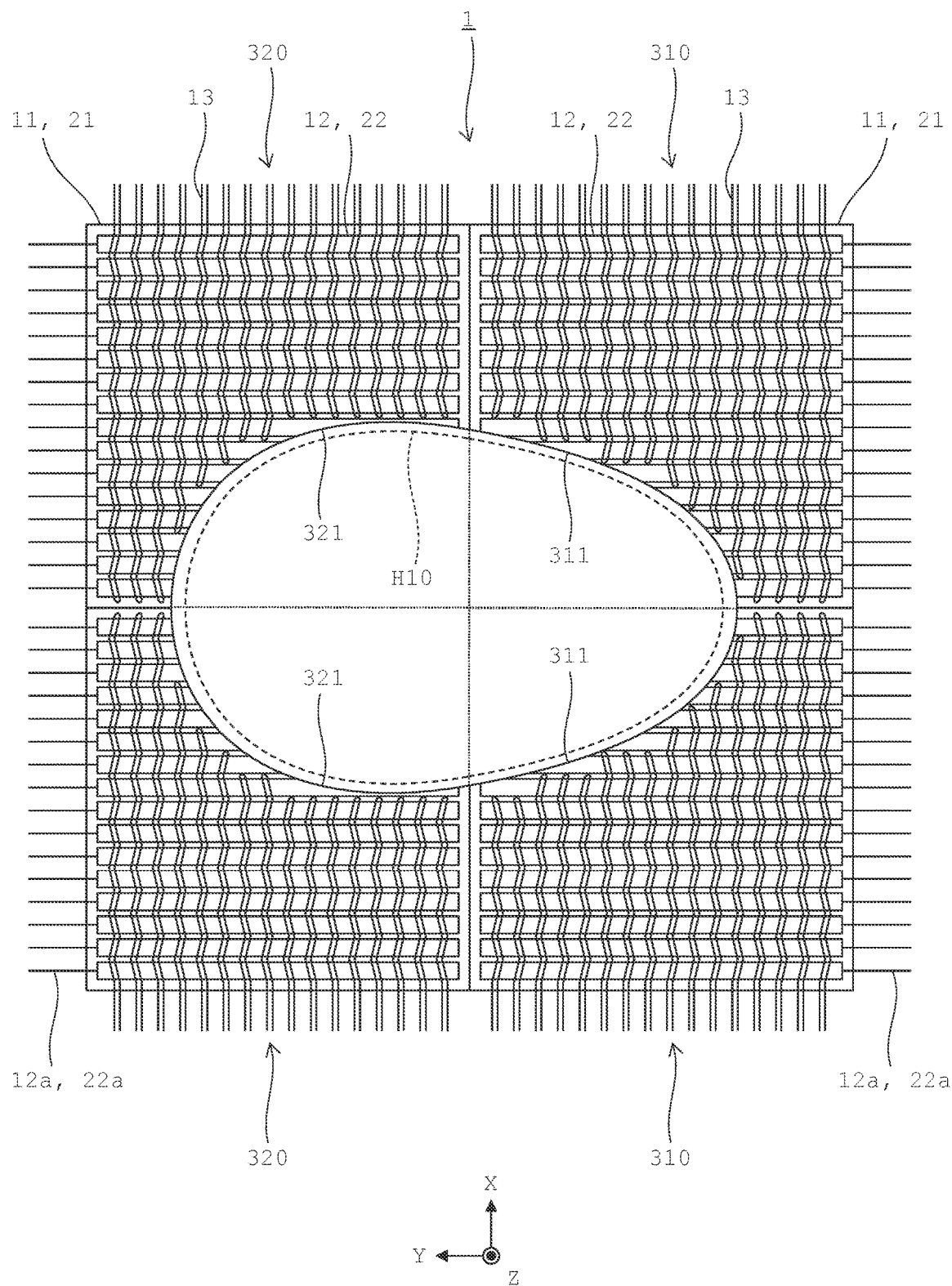
FIG. 17 is a schematic diagram showing an internal configuration of a load sensor in a case where the load sensor is disposed on a toilet seat, according to a modification.

FIG. 17 is a schematic diagram showing an internal configuration of the load sensor 1 when the load sensor 1 is disposed on a toilet seat. FIG. 17 shows a state where an inner-side portion of the load sensor 1 having a rectangular shape is cut off so as to suit the shape of an opening H10 of the toilet seat, and for convenience, the outer shape of the load sensor 1 is left, as is, in a rectangular shape. However, in actuality, along the outer shape of the seating face of the toilet seat, an outer-side portion of the load sensor 1 is cut off in a substantially elliptical shape (a shape obtained by expanding the shape according to cut-offs 311, 321 into a substantially similar shape).

The load sensor 1 shown in FIG. 17 includes two sensor units 310 and two sensor units 320. The two sensor units 310 are arranged in the X-axis direction on the Y-axis negative side, and the two sensor units 320 are arranged in the X-axis direction on the Y-axis positive side. The two sensor units 310 have the same shape and structure with each other, and are disposed in an upside-down manner with respect to each other. The two sensor units 320 have the same shape and structure with each other, and are disposed in an upside-down manner with respect to each other.

The center of the arranged four sensor units 310, 320 is positioned in the opening H10 of the toilet seat. On the center side of each sensor unit 310, a cut-off 311 has been formed at a position corresponding to the opening H10 of the toilet seat. On the center side of each sensor unit 320, a cut-off 321 has been formed at a position corresponding to the opening H10 of the toilet seat.

A plurality of electrically-conductive elastic bodies 12, 22 extending in the Y-axis direction are disposed on the respective base members 11, 21 of each sensor unit 310, and the base members 11, 21 and the electrically-conductive elastic bodies 12, 22 on the center side have been cut as a result of formation of the cut-off 311. A plurality of pairs of conductor wires 13 of the sensor unit 310 are disposed such that the turning-back portions are positioned on the outer side of the cut-off 311.

Similarly, a plurality of electrically-conductive elastic bodies 12, 22 extending in the Y-axis direction are disposed on the respective base members 11, 21 of each sensor unit 320, and the base members 11, 21 and the electrically-conductive elastic bodies 12, 22 on the center side have been cut as a result of formation of the cut-off 321. A plurality of pairs of conductor wires 13 of the sensor unit 320 are disposed such that the turning-back portions are positioned on the outer side of the cut-off 321.

According to the configuration in FIG. 17, the cut-off 311, 321 is formed in the base member 11, 21 having a square shape and having the electrically-conductive elastic bodies 12, 22 disposed thereon, and pairs of conductor wires 13 are formed by using the above-described jig 200 in accordance with the shape of the cut-off 311, 321. Accordingly, the load sensor 1 (the sensor units 310, 320) can be formed simply by assembling the base members 11, 21, the electrically-conductive elastic bodies 12, 22, and the pairs of conductor wires 13. Therefore, the number of assembly steps of the load sensor 1 can be reduced and assembly of the load sensor 1 can be easily automated. Since the cut-off 311, 321 is formed in accordance with the shape of the opening H10 of the toilet seat and the turning-back position can be adjusted for each pair of conductor wires 13, the region (dead zone) where no sensor part is disposed can be made small. Therefore, the distribution of the load of a person sitting on the toilet seat can be finely measured.

As described above, the production method of the load sensor according to the present modification includes: a step of cutting out a region corresponding to the shape of the load sensor, from a mother base member having electrically-conductive elastic bodies formed on a surface thereof, to form a base member and electrically-conductive elastic bodies to be used in the load sensor; and a step of disposing conductor wires each covered by a dielectric body, on the electrically-conductive elastic bodies on the cut-out base member. According to this production method, as described above, with respect to a load sensor having a desired shape, the number of assembly steps can be reduced and the load sensor can be produced in a simple manner. In addition, according to this production method, the region (dead zone) where no electrically-conductive elastic body and no conductor wire are disposed can be reduced, and detection accuracy of the load sensor can be increased.

The production method of the load sensor according to the present modification may be adjusted such that, as described above, a base member and electrically-conductive elastic bodies on the upper side and a base member and electrically-conductive elastic bodies on the lower side are each cut out from the mother base member, and conductor wires each covered by a dielectric body are disposed between the cut-out electrically-conductive elastic bodies. Accordingly, detection sensitivity of the load sensor can be increased.

Reference Example 1

In the configuration of Embodiment 1 above, as shown in FIG. 2B, the electrically-conductive elastic bodies 12, 22 are disposed so as to face each other. However, in such a configuration, displacement may occur at a position where an electrically-conductive elastic body 12 is to be formed on the base member 11, or a position where an electrically-conductive elastic body 12 is to be disposed with respect to an electrically-conductive elastic body 22. Therefore, adjacent electrically-conductive elastic bodies 12 are disposed with an interval therebetween so as to prevent conduction between the adjacent electrically-conductive elastic bodies 12 even when positional displacement of an electrically-conductive elastic body 12 has occurred.

However, when an interval is provided between electrically-conductive elastic bodies 12, there is a problem that a region, i.e., a dead zone, where a pressure-sensitive element cannot detect a load becomes large.

Therefore, in Reference Example 1, the load sensor 1 is configured such that the dead zone can be suppressed while unintended conduction is avoided.

With reference to FIG. 18A to FIG. 21, the outline of a configuration of the load sensor 1 according to Reference Example 1 will be described.

FIG. 18A is a perspective view schematically showing a base member 11 and three electrically-conductive elastic bodies 12 set on an opposing face 11a (the face on the Z-axis positive side) of the base member 11.

The base member 11 is an insulative member having elasticity, and has a flat plate shape parallel to an X-Y plane. The base member 11 is formed from a non-electrically-conductive resin material or a non-electrically-conductive rubber material. The resin material used in the base member 11 is a resin material of at least one type selected from the group consisting of a styrene-based resin, a silicone-based resin (e.g., polydimethylpolysiloxane (PDMS)), an acrylic resin, a rotaxane-based resin, a urethane-based resin, and the like, for example. The rubber material used in the base member 11 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive elastic bodies 12 are formed on the opposing face 11a (the face on the Z-axis positive side) of the base member 11. In FIG. 18A, three electrically-conductive elastic bodies 12 are formed on the opposing face 11a of the base member 11. Each electrically-conductive elastic body 12 is an electrically-conductive member having elasticity. The electrically-conductive elastic bodies 12 each have a band-like shape that is long in the Y-axis direction, and are formed so as to be arranged with a predetermined interval therebetween in the X-axis direction. At an end portion on the Y-axis negative side of each electrically-conductive elastic body 12, a cable 12a electrically connected to the electrically-conductive elastic body 12 is set.

Each electrically-conductive elastic body 12 is formed on the opposing face 11a of the base member 11 by a printing method such as screen printing, gravure printing, flexographic printing, offset printing, or gravure offset printing. With these printing methods, the electrically-conductive elastic body 12 can be formed so as to have a thickness of about 0.001 mm to 0.5 mm on the opposing face 11a of the base member 11.

Each electrically-conductive elastic body 12 is formed from a resin material and an electrically-conductive filler dispersed therein, or from a rubber material and an electrically-conductive filler dispersed therein.

Similar to the resin material used in the base member 11 described above, the resin material used in the electrically-conductive elastic body 12 is a resin material of at least one type selected from the group consisting of a styrene-based resin, a silicone-based resin (polydimethylpolysiloxane (e.g., PDMS)), an acrylic resin, a rotaxane-based resin, a urethane-based resin, and the like, for example. Similar to the rubber material used in the base member 11 described above, the rubber material used in the electrically-conductive elastic body 12 is a rubber material of at least one type selected from the group consisting of silicone rubber, isoprene rubber, butadiene rubber, styrene-butadiene rubber, chloroprene rubber, nitrile rubber, polyisobutylene, ethylene-propylene rubber, chlorosulfonated polyethylene, acrylic rubber, fluororubber, epichlorohydrin rubber, urethane rubber, natural rubber, and the like, for example.

The electrically-conductive filler used in the electrically-conductive elastic body 12 is a material of at least one type selected from the group consisting of: metal materials such as Au (gold), Ag (silver), Cu (copper), C (carbon), ZnO (zinc oxide), $In_2O_3$ (indium oxide (III)), and $SnO_2$ (tin oxide (IV)); electrically-conductive macromolecule materials such as PEDOT:PSS (i.e., a complex composed of poly(3,4-ethylenedioxythiophene) (PEDOT) and polystyrene sulfonate (PSS)); electrically-conductive fibers such as a metal-coated organic matter fiber and a metal wire (fiber state); and the like, for example.

FIG. 18B is a perspective view schematically showing three covered copper wires 15 and twelve threads 14 which are placed on the structure in FIG. 18A.

Each covered copper wire 15 is bent at an end portion on the X-axis positive side. That is, the covered copper wire 15 has a shape in which a pair of covered copper wires are connected to each other at an end portion on the X-axis positive side. The covered copper wire 15 is disposed so as to be superposed on the upper faces of the three electrically-conductive elastic bodies 12 shown in FIG. 18A. Here, three covered copper wires 15 are disposed so as to be superposed on the upper faces of the three electrically-conductive elastic bodies 12.

Each covered copper wire 15 is composed of a wire member that is electrically conductive and a dielectric body covering the surface of the wire member. The three covered copper wires 15 are disposed so as to cross the electrically-conductive elastic bodies 12, and are disposed so as to be arranged with a predetermined interval therebetween, along the longitudinal direction (the Y-axis direction) of the electrically-conductive elastic bodies 12. Each covered copper wire 15 is disposed, extending in the X-axis direction, so as to extend across the three electrically-conductive elastic bodies 12. The configuration of the covered copper wire 15 will be described later, with reference to FIGS. 20A, 20B.

After the three covered copper wires 15 have been disposed as in FIG. 18B, each covered copper wire 15 is set on the base member 11 by threads 14 so as to be movable in the longitudinal direction (the X-axis direction) of the covered copper wire 15. In the example shown in FIG. 18B, twelve threads 14 connect the covered copper wires 15 to the base member 11 at positions other than the positions where the electrically-conductive elastic bodies 12 and the covered copper wires 15 overlap each other. Each thread 14 is implemented by a chemical fiber, a natural fiber, or a mixed fiber of the chemical fiber and the natural fiber.

Figure 19A:
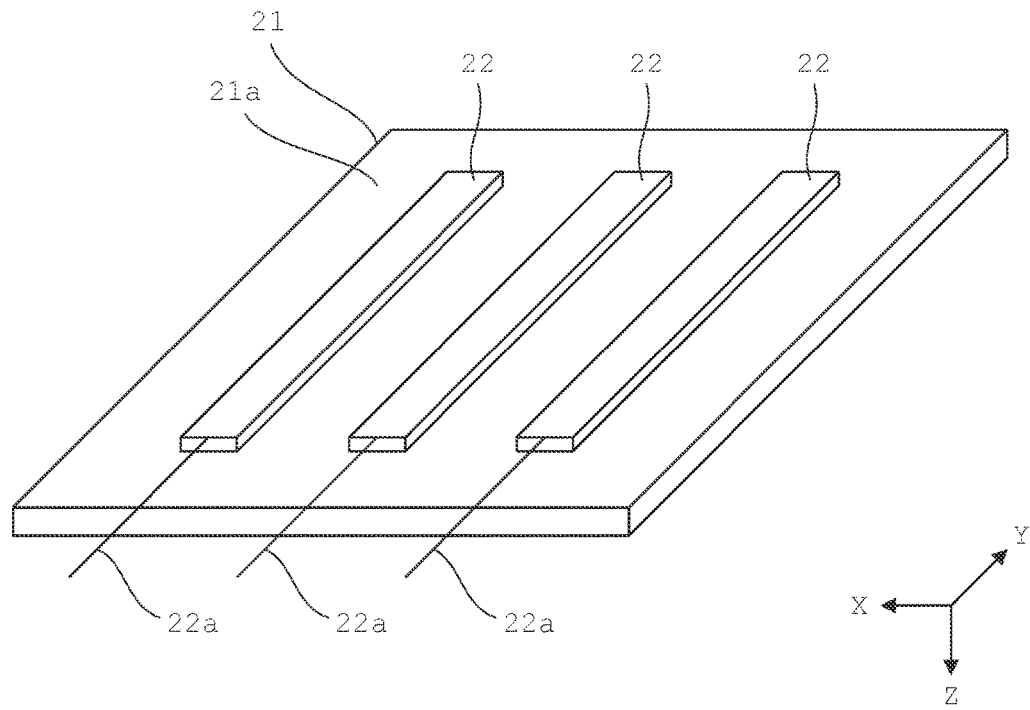
FIG. 19A is a perspective view schematically showing a base member and electrically-conductive elastic bodies on the upper side, according to Reference Example 1.

FIG. 19A is a perspective view schematically showing a base member 21 disposed so as to be superposed on the upper side of the base member 11, and three electrically-conductive elastic bodies 22 set on an opposing face 21a (the face on the Z-axis negative side) of the base member 21.

The base member 21 has the same size and shape as those of the base member 11, and is formed from the same material as that of the base member 11. The electrically-conductive elastic bodies 22 are formed, on the opposing face 21a (the face on the Z-axis negative side) of the base member 21, at positions opposing the electrically-conductive elastic bodies 12, and are formed from the same material as that of the electrically-conductive elastic bodies 12. Similar to the electrically-conductive elastic bodies 12, the electrically-conductive elastic bodies 22 each have a band-like shape that is long in the Y-axis direction, and are formed so as to be arranged with a predetermined interval therebetween in the X-axis direction. Similar to the electrically-conductive elastic body 12, each electrically-conductive elastic body 22 is formed on the face on the Z-axis negative side of the base member 21 by a predetermined printing method. At an end portion on the Y-axis negative side of each electrically-conductive elastic body 22, a cable 22a electrically connected to the electrically-conductive elastic body 22 is set.

The length (the width in the longitudinal direction) in the Y-axis direction of the electrically-conductive elastic body 22 is the same as the length (the width in the longitudinal direction) in the Y-axis direction of the electrically-conductive elastic body 12. Meanwhile, the length (the width in the short direction) in the X-axis direction of the electrically-conductive elastic body 22 is smaller than the length (the width in the short direction) in the X-axis direction of the electrically-conductive elastic body 12. Effects caused by the fact that the width in the short direction of the electrically-conductive elastic body 22 and the width in the short direction of the electrically-conductive elastic body 12 are different from each other will be described later with reference to FIG. 23A to FIG. 25B.

Figure 19B:
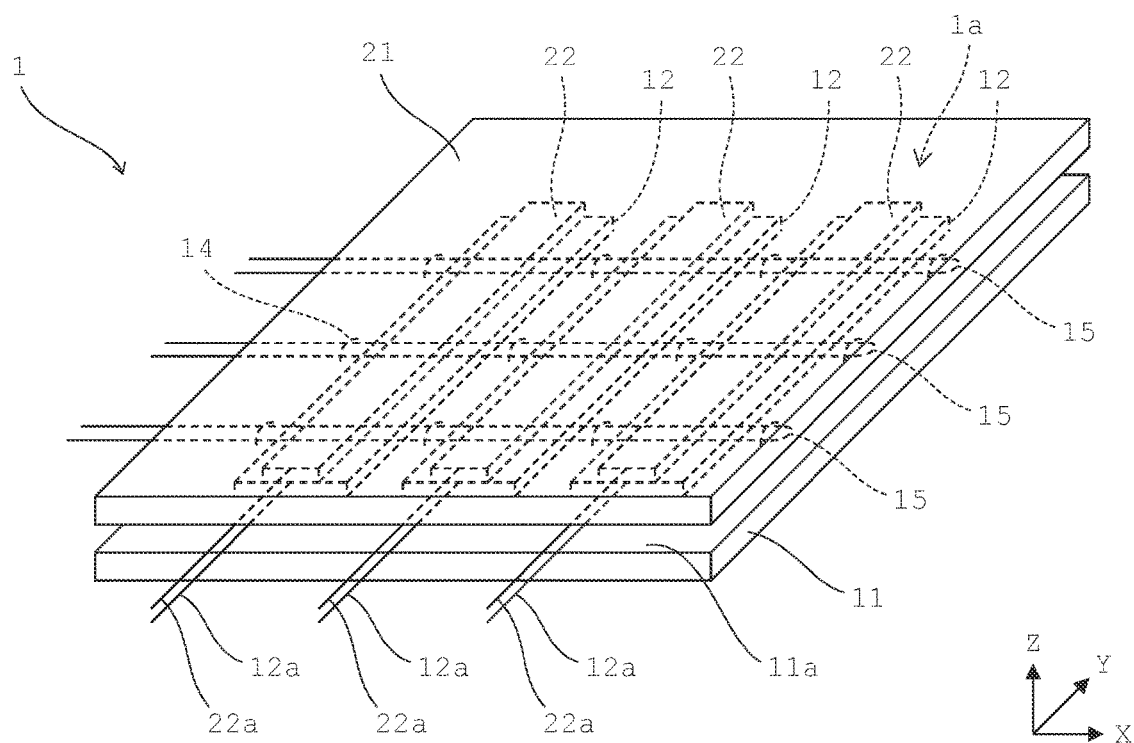
FIG. 19B is a perspective view schematically showing a load sensor of which assembly has been completed, according to Reference Example 1.

FIG. 19B is a perspective view schematically showing a state where the structure in FIG. 19A is set to the structure in FIG. 18B.

The structure shown in FIG. 19A is disposed from above (the Z-axis positive side) of the structure shown in FIG. 18B. At this time, the base member 11 and the base member 21 are disposed such that: the opposing face 11a and the opposing face 21a face each other; the center position in the X-axis direction of each electrically-conductive elastic body 12 and the center position in the X-axis direction of a corresponding electrically-conductive elastic body 22 are aligned with each other; and ends in the Y-axis direction of the electrically-conductive elastic body 12 and ends in the Y-axis direction of the electrically-conductive elastic body 22 are aligned with each other. Then, the outer peripheral four sides of the base member 21 are connected to the outer peripheral four sides of the base member 11 with a silicone rubber-based adhesive, whereby the base member 11 and the base member 21 are fixed to each other. Accordingly, the three covered copper wires 15 are sandwiched by the three electrically-conductive elastic bodies 12 and the three electrically-conductive elastic bodies 22.

In FIG. 19B, a load detection part 1a disposed while being sandwiched by the base members 11, 21 is indicated by a broken line, for convenience. The load detection part 1a includes the plurality of electrically-conductive elastic bodies 12, the plurality of electrically-conductive elastic bodies 22, and the plurality of covered copper wires 15. Then, the load sensor 1 is completed as shown in FIG. 19B.

Figure 20A:
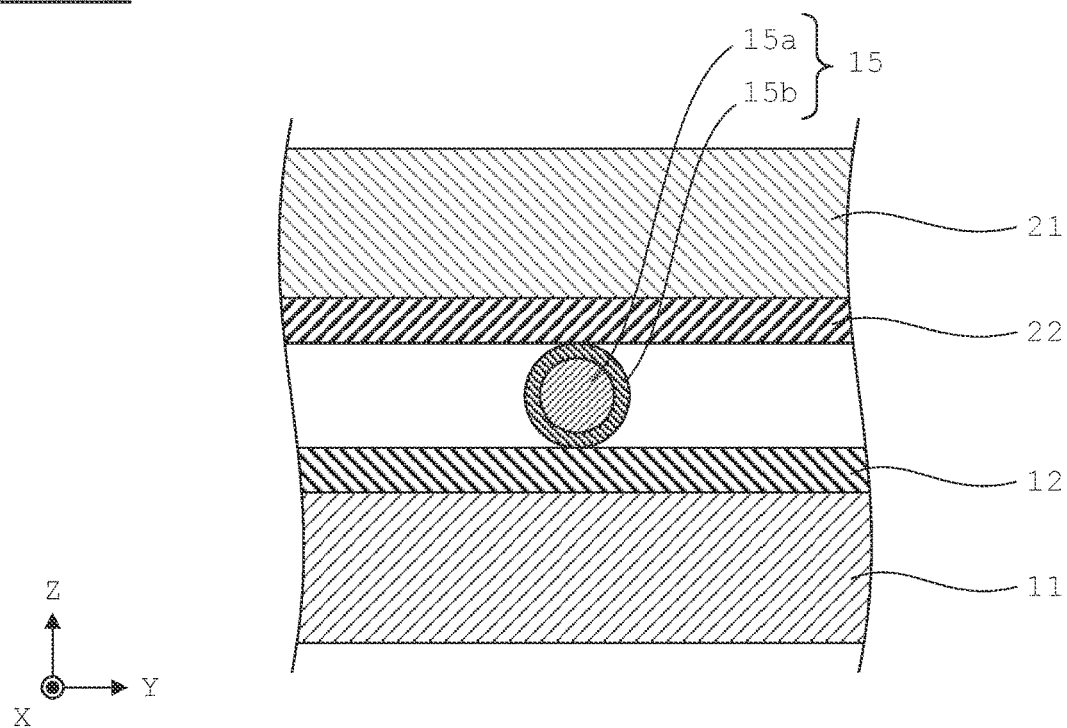
FIGS. 20A, 20B are each a cross-sectional view schematically showing a periphery of a covered copper wire, viewed in the X-axis negative direction, according to Reference Example 1.
Figure 20B:
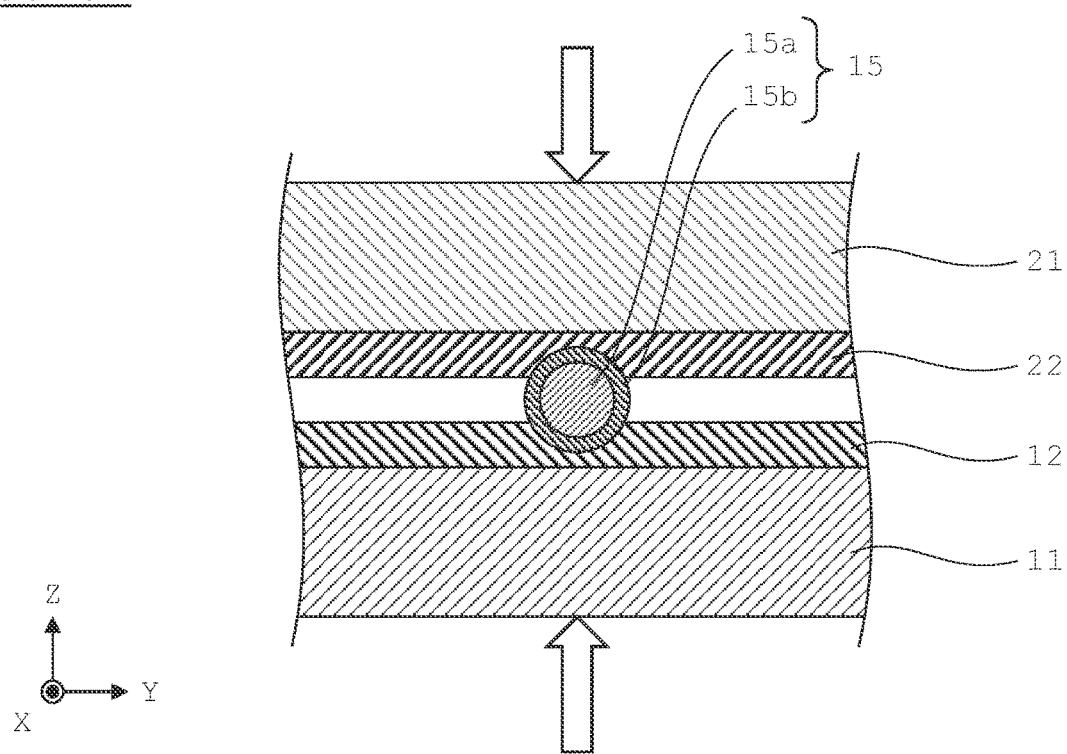

FIGS. 20A, 20B are each a cross-sectional view schematically showing a periphery of a covered copper wire 15, viewed in the X-axis negative direction. FIG. 20A shows a state where no load is applied, and FIG. 20B shows a state where loads are applied.

As shown in FIG. 20A, the covered copper wire 15 is composed of a copper wire 15a and a dielectric body 15b covering the copper wire 15a. The copper wire 15a is formed from copper, and the diameter of the copper wire 15a is about 60 μm, for example. The dielectric body 15b is disposed between the electrically-conductive elastic body 12 and the copper wire 15a, and between the electrically-conductive elastic body 22 and the copper wire 15a.

The dielectric body 15b has an electric insulation property, and is formed from a resin material, a ceramic material, a metal oxide material, or the like, for example. The dielectric body 15b may be a resin material of at least one type selected from the group consisting of a polypropylene resin, a polyester resin (e.g., polyethylene terephthalate resin), a polyimide resin, a polyphenylene sulfide resin, a polyvinyl formal resin, a polyurethane resin, a polyamide imide resin, a polyamide resin, and the like, or may be a metal oxide material of at least one type selected from the group consisting of $Al_2O_3$, $Ta_2O_5$, and the like.

When no load is applied to the region shown in FIG. 20A, the force applied between the electrically-conductive elastic body 12 and the covered copper wire 15, and the force applied between the electrically-conductive elastic body 22 and the covered copper wire 15 are substantially zero. From this state, when a load is applied in the upward direction to the lower face of the base member 11 and a load is applied in the downward direction to the upper face of the base member 21 as shown in FIG. 20B, the electrically-conductive elastic bodies 12, 22 are deformed by the covered copper wire 15. It should be noted that even when the lower face of the base member 11 or the upper face of the base member 21 is placed on a stationary object and a load is applied only to the other base member as well, a load will be similarly received from the stationary object side due to reaction.

As shown in FIG. 20B, when the loads are applied, the covered copper wire 15 is brought close to the electrically-conductive elastic bodies 12, 22 so as to be wrapped by the electrically-conductive elastic bodies 12, 22, and the contact area between the covered copper wire 15 and the electrically-conductive elastic body 12, 22 increases. Accordingly, the capacitance between the copper wire 15a and the electrically-conductive elastic body 12, and the capacitance between the copper wire 15a and the electrically-conductive elastic body 22 change. Then, the capacitance in this region is detected, whereby the load applied to this region is calculated.

Figure 21:
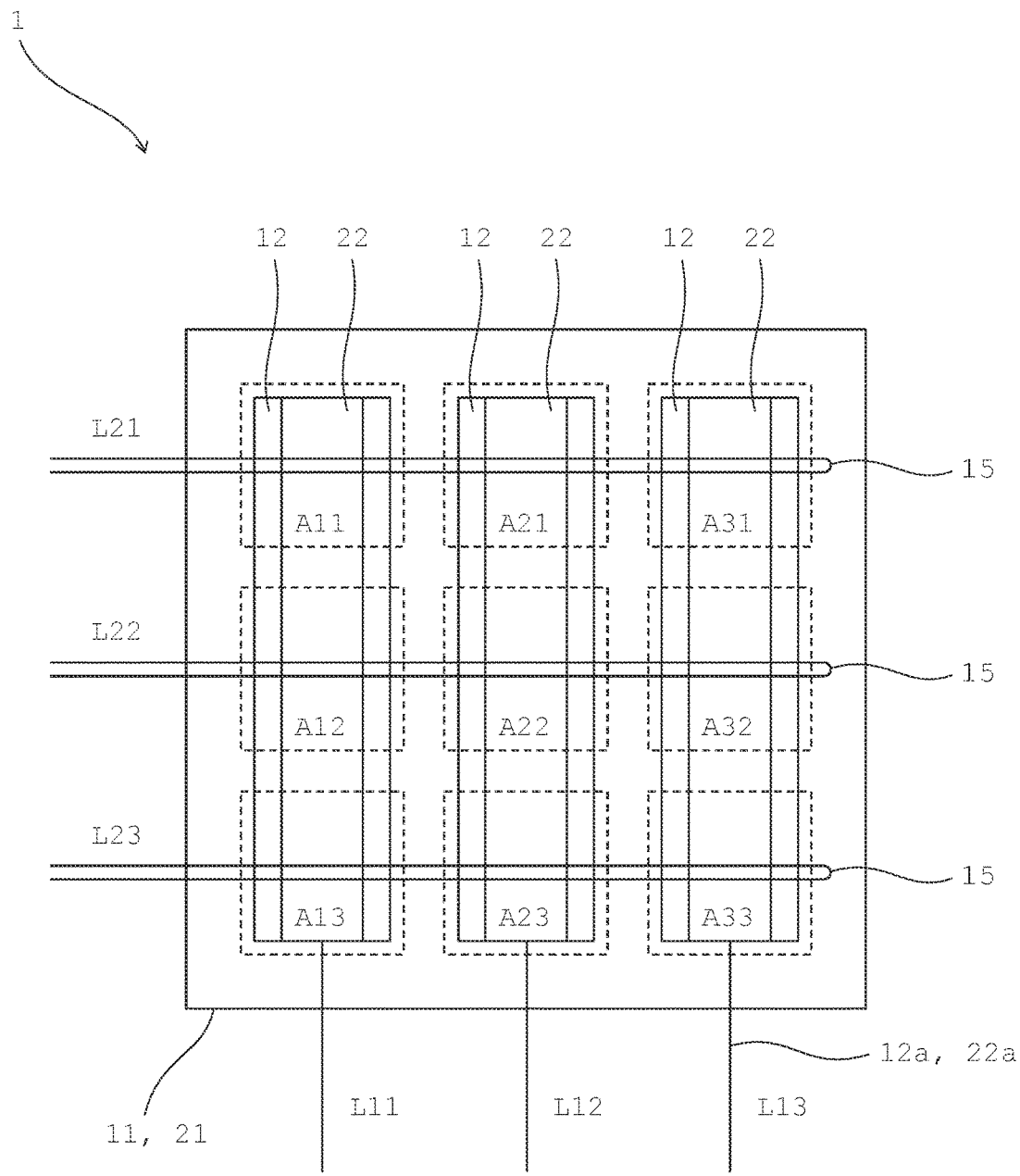
FIG. 21 is a plan view schematically showing the inside of the load sensor, viewed in the Z-axis negative direction, according to Reference Example 1.

FIG. 21 is a plan view schematically showing the inside of the load sensor 1, viewed in the Z-axis negative direction. In FIG. 21, threads 14 are not shown, for convenience.

As shown in FIG. 21, sensor parts A11, A12, A13, A21, A22, A23, A31, A32, A33 in each of which capacitance changes in accordance with a load are formed at positions where the electrically-conductive elastic bodies 12, 22 and the covered copper wires 15 cross each other. Each sensor part includes electrically-conductive elastic bodies 12, 22 and a covered copper wire 15, and the covered copper wire 15 forms one pole (e.g., positive pole) for capacitance, and the electrically-conductive elastic bodies 12, 22 form the other pole (e.g., negative pole) for capacitance.

That is, the copper wire 15a of the covered copper wire 15 forms one electrode of the load sensor 1 (capacitance-type load sensor), the electrically-conductive elastic bodies 12, 22 form the other electrode of the load sensor 1 (capacitance-type load sensor), and the dielectric body 15b of the covered copper wire 15 corresponds to a dielectric body that defines capacitance in the load sensor 1 (capacitance-type load sensor).

When a load is applied in the Z-axis direction to each sensor part, the covered copper wire 15 is wrapped by the electrically-conductive elastic body 12, 22 due to the load. Accordingly, the contact area between the covered copper wire 15 and the electrically-conductive elastic body 12, 22 changes, and the capacitance between the covered copper wire 15 and the electrically-conductive elastic body 12, 22 changes.

An end portion on the X-axis negative side of each covered copper wire 15, an end portion on the Y-axis negative side of each cable 12a, and an end portion on the Y-axis negative side of each cable 22a are connected to a detection circuit provided for the load sensor 1.

As shown in FIG. 21, the cables 12a, 22a drawn from the three sets of electrically-conductive elastic bodies 12, 22 will be referred to as lines L11, L12, L13, and the copper wires 15a in the three covered copper wires 15 will be referred to as lines L21, L22, L23. The positions at which the electrically-conductive elastic bodies 12, 22 connected to the line L11 cross the lines L21, L22, L23 are the sensor parts A11, A12, A13, respectively. The positions at which the electrically-conductive elastic bodies 12, 22 connected to the line L12 cross the lines L21, L22, L23 are the sensor parts A21, A22, A23, respectively. The positions at which the electrically-conductive elastic bodies 12, 22 connected to the line L13 cross the lines L21, L22, L23 are the sensor parts A31, A32, A33, respectively.

When a load is applied to the sensor part A11, the contact area between the covered copper wire 15 and the electrically-conductive elastic body 12, 22 increases in the sensor part A11. Therefore, when the capacitance between the line L11 and the line L21 is detected, the load applied to the sensor part A11 can be calculated. Similarly, in another sensor part as well, when the capacitance between two lines crossing each other in the other sensor part is detected, the load applied to the other sensor part can be calculated.

Figure 22:
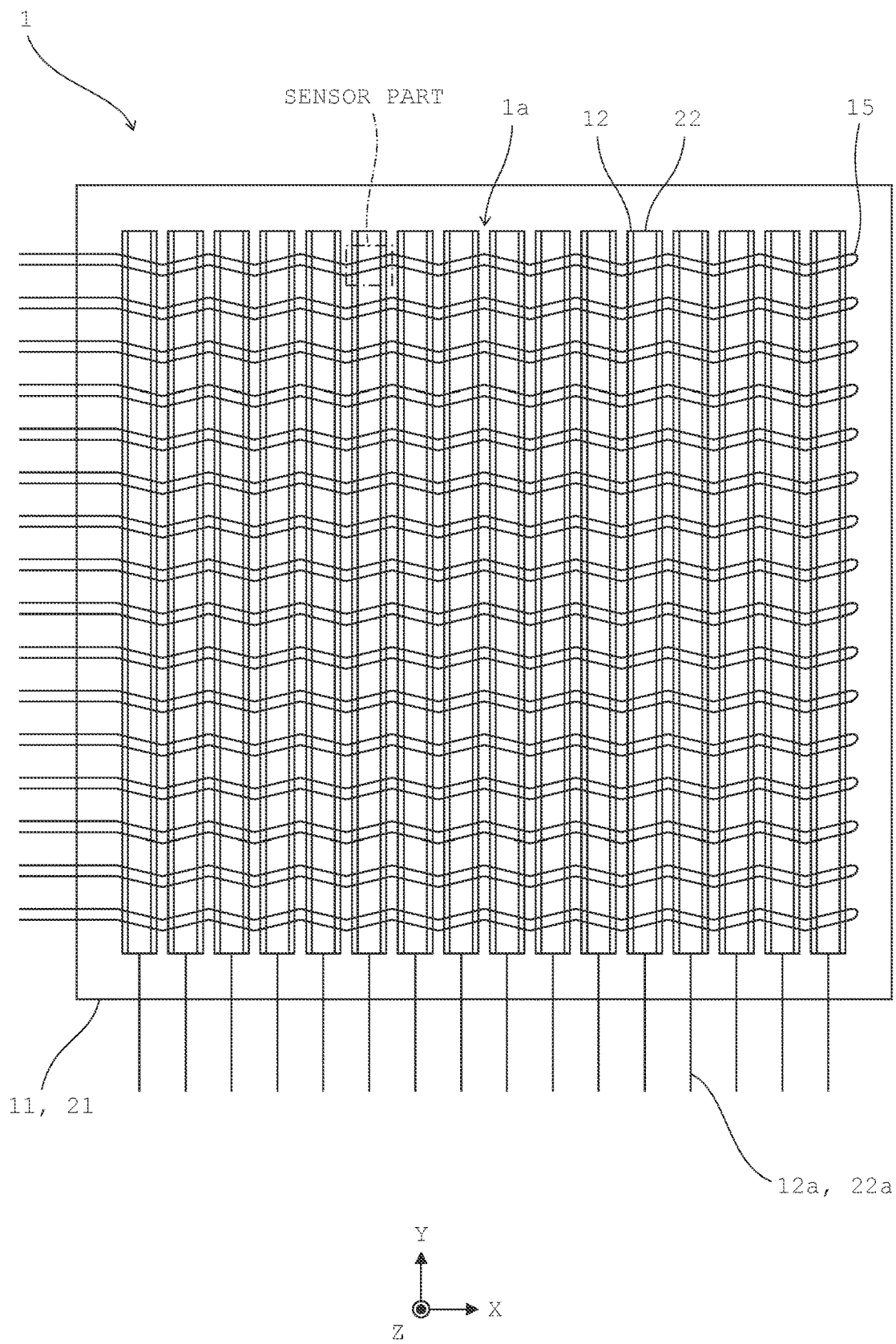
FIG. 22 is a plan view schematically showing a specific configuration of the load sensor, according to Reference Example 1.

FIG. 22 is a plan view schematically showing a specific configuration of the load sensor 1. In FIG. 22, the load detection part 1a positioned inside the load sensor 1 is also indicated by a solid line, for convenience.

The load sensor 1 shown in FIG. 22 includes 16 electrically-conductive elastic bodies 12, 16 electrically-conductive elastic bodies 22, and 16 covered copper wires 15, when compared with the load sensor 1 shown in FIG. 18A to FIG. 21. In this case as well, the 16 electrically-conductive elastic bodies 12 are formed so as to be arranged on the base member 11, and the 16 electrically-conductive elastic bodies 22 are formed so as to be arranged on the base member 21. Then, the base member 11 and the base member 21 are connected to each other such that the electrically-conductive elastic bodies 12, 22 face each other.

In the load sensor 1 shown in FIG. 22, each covered copper wire 15 is cyclically bent. In FIG. 22, each covered copper wire 15 cyclically bent in this manner is disposed on the upper side of the electrically-conductive elastic bodies 12, and is connected to the base member 11 by threads 14, as in the case of FIG. 18B. In a case where the covered copper wire 15 is cyclically bent to be disposed, even when the base members 11, 21 expand and contract, the bent state of the covered copper wire 15 changes, and thus, breakage of the covered copper wire 15 can be avoided. In addition, when compared with a case where the covered copper wire 15 is linearly disposed, the density of the copper wire 15a per unit area is increased. Therefore, detection sensitivity of the load sensor 1 can be increased.

Next, effects caused by the fact that the width in the short direction (the X-axis direction) of the electrically-conductive elastic body 12 and the width in the short direction (the X-axis direction) of the electrically-conductive elastic body 22 are different from each other will be described.

FIGS. 23A, 23B are each a schematic diagram showing a configuration of Comparative Example 1 in which the width in the short direction of the electrically-conductive elastic body 12 and the width in the short direction of the electrically-conductive elastic body 22 are equal to each other. FIGS. 23A, 23B are each a cross-sectional view at the position of a covered copper wire 15 along a plane parallel to an X-Z plane, viewed in the Y-axis positive direction. In FIGS. 23A, 23B, the covered copper wire 15 is shown in a state of linearly extending in the X-axis direction, for convenience.

As shown in FIG. 23A, in Comparative Example 1, the width in the short direction (the X-axis direction) of each electrically-conductive elastic body 12 formed on the base member 11, and the width in the short direction (the X-axis direction) of each electrically-conductive elastic body 22 formed on the base member 21 are each set to d1. The interval between two electrically-conductive elastic bodies 12 and the interval between two electrically-conductive elastic bodies 22 are each set to dg1.

In Comparative Example 1, for example, as shown in FIG. 23B, when the base member 21 is set in a state of being displaced by the distance dg1 in the X-axis positive direction, each electrically-conductive elastic body 22 formed on the base member 21 is also moved by the distance dg1 in the X-axis positive direction. Accordingly, as indicated by a broken line in FIG. 23B, an end portion on the X-axis positive side of each electrically-conductive elastic body 22 and an end portion on the X-axis negative side of a corresponding electrically-conductive elastic body 12 overlap each other.

Thus, in Comparative Example 1, when positional displacement by the distance dg1 has occurred in the X-axis direction at the time of setting the base members 11, 21, there occurs a situation in which conduction occurs between the electrically-conductive elastic bodies 12, 22 of adjacent sensor parts. Similarly, when positional displacement by the distance dg1 has occurred in the X-axis direction at the time of formation of the electrically-conductive elastic bodies 12, 22 as well, there occurs a situation in which conduction occurs between the electrically-conductive elastic bodies 12, 22 of adjacent sensor parts. In such a case, capacitances based on the adjacent two sensor parts cannot be individually and appropriately detected.

FIGS. 24A, 24B are each a schematic diagram showing a configuration of Comparative Example 2 in which the widths in the short direction of the electrically-conductive elastic bodies 12, 22 are shortened relative to those in Comparative Example 1.

As shown in FIG. 24A, in Comparative Example 2, the widths in the short direction (the X-axis direction) of the electrically-conductive elastic bodies 12, 22 are each set to d2, which is shorter than d1. The interval between adjacent two electrically-conductive elastic bodies 12 and the interval of adjacent two electrically-conductive elastic bodies 22 are each set to dg2, which is longer than dg1.

In Comparative Example 2, for example, as shown in FIG. 24B, even when the base member 21 is set in a state of being displaced by the distance dg1 in the X-axis positive direction, whereby each electrically-conductive elastic body 22 is displaced by the distance dg1 in the X-axis positive direction, an end portion on the X-axis positive side of each electrically-conductive elastic body 22 and an end portion on the X-axis negative side of a corresponding electrically-conductive elastic body 12 do not overlap with each other, different from the case of FIG. 23B. Thus, in Comparative Example 2, even when positional displacement by the distance dg1 has occurred in the X-axis direction at the time of setting the base members 11, 21, conduction does not occur between electrically-conductive elastic bodies 12, 22 of adjacent sensor parts. Similarly, when positional displacement by the distance dg1 has occurred in the X-axis direction at the time of formation of the electrically-conductive elastic bodies 12, 22 as well, conduction does not occur between electrically-conductive elastic bodies 12, 22 of adjacent sensor parts.

However, in the case of Comparative Example 2, the interval between adjacent electrically-conductive elastic bodies 12, 22 is set to dg2, which is longer than dg1, and thus, the region, i.e., dead zone, where the load sensor 1 cannot detect a load is larger than that in Comparative Example 1.

Therefore, in order to suppress the dead zone while avoiding unintended conduction, the inventors made the width in the short direction of each electrically-conductive elastic body 12 formed on the base member 11 and the width in the short direction of each electrically-conductive elastic body 22 formed on the base member 21 different from each other, as in Reference Example 1.

FIGS. 25A, 25B are each a schematic diagram showing a configuration of Reference Example 1 in which the width in the short direction of the electrically-conductive elastic body 12 and the width in the short direction of the electrically-conductive elastic body 22 are different from each other.

As shown in FIG. 25A, in Reference Example 1, the width in the short direction (the X-axis direction) of each electrically-conductive elastic body 12 is set to d1, and the width in the short direction (the X-axis direction) of each electrically-conductive elastic body 22 formed on the base member 21 is set to d2, which is shorter than d1. The interval between two electrically-conductive elastic bodies 12 is set to dg1, and the interval between two electrically-conductive elastic bodies 22 is set to dg2, which is longer than dg1. d1 is about 10 mm, for example, and dg1 is about 2 mm, for example.

In Reference Example 1, for example, as shown in FIG. 25B, even when the base member 21 is set in a state of being displaced by the distance dg1 in the X-axis positive direction, whereby each electrically-conductive elastic body 22 is displaced in the X-axis positive direction by the distance dg1, an end portion on the X-axis positive side of each electrically-conductive elastic body 22 and an end portion on the X-axis negative side of a corresponding electrically-conductive elastic body 12 do not overlap each other. That is, occurrence of conduction between an electrically-conductive elastic body 22 forming one sensor part and an electrically-conductive elastic body 12 forming another sensor part adjacent to the one sensor part is avoided.

Thus, in Reference Example 1, even when positional displacement by the distance dg1 has occurred in the X-axis direction at the time of setting the base members 11, 21, conduction does not occur between the electrically-conductive elastic bodies 12, 22 of adjacent sensor parts. Similarly, when positional displacement by the distance dg1 has occurred in the X-axis direction at the time of formation of the electrically-conductive elastic bodies 12, 22 as well, conduction does not occur between the electrically-conductive elastic bodies 12, 22 of adjacent sensor parts. Therefore, capacitances based on adjacent sensor parts can be individually and appropriately detected.

Further, in Reference Example 1, as shown in FIG. 25A, although the interval between adjacent electrically-conductive elastic bodies 22 is dg2, the interval between adjacent electrically-conductive elastic bodies 12 is set to dg1, which is shorter than dg2. Accordingly, the region, i.e., dead zone, where the load sensor 1 cannot detect a load can be suppressed.

In FIGS. 25A, 25B, in the range where only either one of the electrically-conductive elastic bodies 12, 22 is in contact with the covered copper wire 15, change in capacitance according to a load is reduced when compared with that in the range where both of the electrically-conductive elastic bodies 12, 22 are in contact with the covered copper wire 15. However, in the range where only either one of the electrically-conductive elastic bodies 12, 22 is in contact with the covered copper wire 15 as well, change in capacitance according to a load occurs. Therefore, this range does not become a dead zone, and functions as a load detection range.

Effects of Reference Example 1

According to Reference Example 1, the following effects are exhibited.

The load sensor 1 according to Reference Example 1 includes:
 a first base member 11 and a second base member 21 disposed so as to face each other;
 a plurality of first electrically-conductive elastic bodies 12 each having a band-like shape and formed at a predetermined interval on an opposing face 11a of the first base member 11;
 a plurality of second electrically-conductive elastic bodies 22 each having a band-like shape and formed on an opposing face 21a of the second base member 21, so as to respectively oppose the plurality of first electrically-conductive elastic bodies 12;
 an electrically-conductive member (copper wire 15a) sandwiched by the plurality of first electrically-conductive elastic bodies 12 and the plurality of second electrically-conductive elastic bodies 22 and extending in a direction in which the electrically-conductive member crosses the first and second electrically-conductive elastic bodies; and a dielectric body 15b disposed between the electrically-conductive member (copper wire 15a), and each first electrically-conductive elastic body 12 and each second electrically-conductive elastic body 22, and the width in the short direction of each of the plurality of first electrically-conductive elastic bodies 12, and the width in the short direction of each of the plurality of second electrically-conductive elastic bodies 22 are different from each other.

In the load sensor 1, the positions where the electrically-conductive elastic bodies 12, 22 and the covered copper wire 15 cross each other serve as sensor parts, and a load can be detected on the basis of change in capacitance in each sensor part. In this case, since the width of each electrically-conductive elastic body 12 and the width of each electrically-conductive elastic body 22 are different from each other, even when positional displacement in the arrangement direction of the electrically-conductive elastic bodies 12 has occurred between the base members 11, 21 at the time of, for example, assembly of the load sensor 1, occurrence of conduction between electrically-conductive elastic bodies 12, 22 forming adjacent sensor parts can be avoided. Even when the interval dg1 between electrically-conductive elastic bodies 12 each having a greater width is reduced, occurrence of conduction between electrically-conductive elastic bodies 12, 22 due to positional displacement can be suppressed. Thus, the interval dg1 between the electrically-conductive elastic bodies 12 each having a greater width can be reduced. Therefore, the dead zone of the sensor parts provided in the load sensor 1 can be reduced. Thus, according to the load sensor 1 of Reference Example 1, the dead zone can be suppressed while unintended conduction is avoided.

The copper wire 15a (electrically-conductive member) of the covered copper wire 15 is a conductor wire having a linear shape, and the dielectric body 15b covers the copper wire 15a. In a case where the copper wire 15a is implemented by a conductor wire in a linear shape, the following situation is likely to occur. That is, in portions where the copper wire 15a is absent between electrically-conductive elastic bodies 12 and electrically-conductive elastic bodies 22 disposed in the up-down direction, an electrically-conductive elastic body 12 and an electrically-conductive elastic body 22 diagonally opposing each other in adjacent rows are likely to come into contact with each other due to positional displacement. However, in Reference Example 1, as shown in FIGS. 25A, 25B, the width in the short direction of each electrically-conductive elastic body 12 and the width in the short direction of each electrically-conductive elastic body 22 are different from each other, and thus, unintended conduction can be avoided.

Reference Example 2

In Reference Example 1 above, vertexes at four corners of the base member 11 and the vertexes at four corners of the base member 21 are connected with a silicone rubber-based adhesive, whereby the base member 11 and the base member 21 are bound together. In contrast to this, in Reference Example 2, peripheral portions of the base member 11 and the base member 21 are sewn by a thread member, whereby the base member 11 and the base member 21 are bound together.

FIG. 26 is a plan view schematically showing a specific configuration of the load sensor 1 of Reference Example 2. In FIG. 26, the load detection part 1a positioned inside the load sensor 1 is also indicated by a solid line, for convenience.

In the load sensor 1 shown in FIG. 26, as indicated by a broken line, the base members 11, 21 are bound to each other by vicinities of the outer peripheries thereof being sewn by a thread member 300, when compared with the load sensor 1 shown in FIG. 22. The seam of the thread member 300 is linearly formed along the outer shape of the base member 11, 21. The thread member 300 includes a bobbin thread 301 and a needle thread 302. The thread member (the bobbin thread 301 and the needle thread 302) is implemented by a chemical fiber, a natural fiber, or a mixed fiber of the chemical fiber and the natural fiber. The other configurations of Reference Example 2 are the same as those of Reference Example 1.

FIG. 27A is an A-A' cross-sectional view obtained when the load sensor 1 is cut at an X-Z plane passing through a seam positioned on the Y-axis negative side in FIG. 26.

Through sewing of the base members 11, 21, needle holes 41 each penetrating the base members 11, 21 in the up-down direction (the Z-axis direction) are formed so as to be arranged in one direction (in the case of FIG. 27A, the X-axis direction) and so as to be in parallel to the outer shape of the base members 11, 21. The needle thread 302 is passed through a needle hole 41 from the Z-axis positive side, and the needle thread 302 and the bobbin thread 301 are engaged with each other near the Z-axis negative side of the needle hole 41. The pitch between needle holes 41 formed so as to be arranged in one direction is set to p. The thickness of the base member 11 is set to t1, and the thickness of the base member 21 is set to t2. Through sewing by the thread member 300, the bobbin thread 301 presses the base member 11 in the Z-axis positive direction, and the needle thread 302 presses the base member 21 in the Z-axis negative direction. Accordingly, the base member 11 and the base member 21 are bound together.

Here, when the pitch p between the needle holes 41 is short, close contact between the base member 11 and the base member 21 is enhanced. However, when a tensile force is applied to the base members 11, 21 in a direction (e.g., the Y-axis direction perpendicular to the A-A' cross-section in FIG. 27A) of widening the base members 11, 21 in the X-Y plane, there occurs a problem that the base members 11, 21 are likely to tear along the seam of the thread member 300. Therefore, the inventors actually created a plurality of load sensors 1 that have the base members 11, 21 sewn at different pitches p, and examined a condition for preventing the base members 11, 21 from tearing along the seam, by applying a predetermined tensile force.

The condition of the examination is as follows. The thread member 300 (the bobbin thread 301 and the needle thread 302) was implemented by KING POLYESTER #60 manufactured by FUJIX Ltd. The base members 11, 21 were each implemented by a millable-type silicone rubber. The thickness t1 of the base member 11 and the thickness t2 of the base member 21 were set to be equal with each other, and the thickness t1, t2 was set to any one of 0.5 mm, 1.0 mm, and 1.5 mm. The pitch p between the needle holes 41 was set to any one of 0.5 mm, 1.0 mm, 1.5 mm, 2.0 mm, 2.5 mm, and 3.0 mm. 18 kinds of load sensors 1 were created through combinations of the thickness t1, t2 and the pitch p. A tensile force was applied to these 18 kinds of load sensors 1, by pulling a portion near the center of the side on the X-axis positive side of the base member 11, 21 and a portion near the center of the side on the X-axis negative side, into the X-axis positive direction and the X-axis negative direction, respectively, whereby whether or not the base members 11, 21 tore along the seam was examined. In the examination, the tensile force was gradually increased.

Figure 27B:
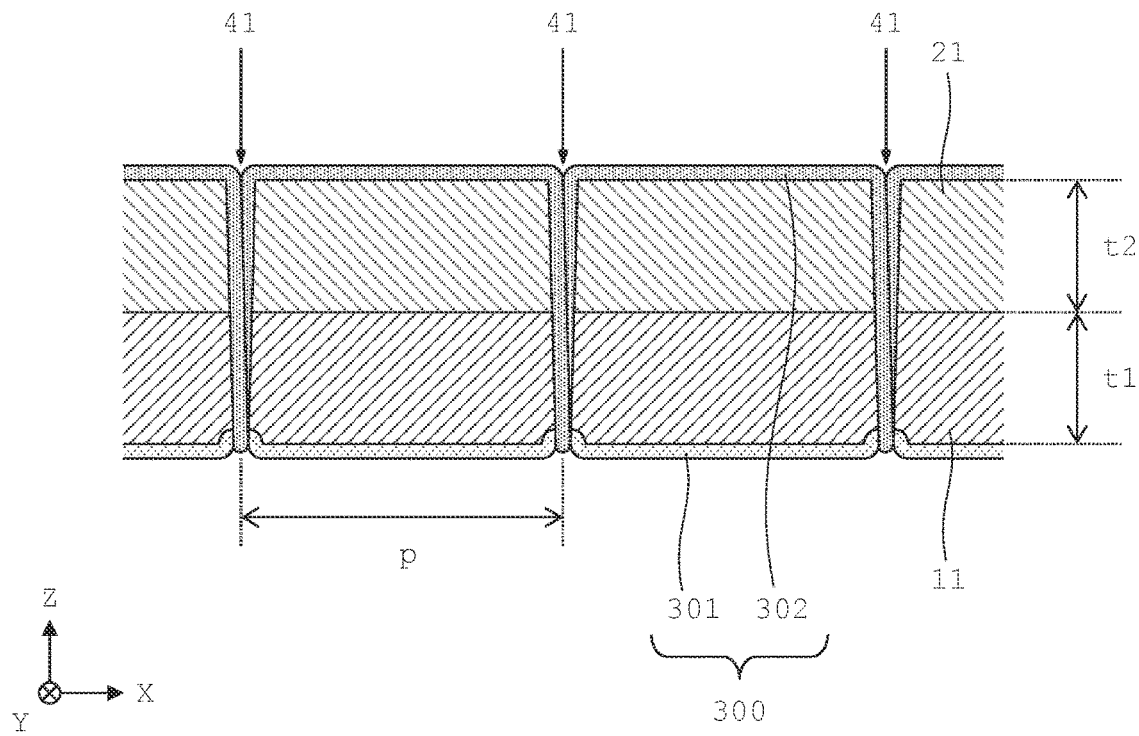
FIG. 27B is a table showing a result of examination performed by the inventors, according to Reference Example 2.

FIG. 27B is a table showing the result of examination performed by the inventors. "0" indicates that the base members 11, 21 did not tear along the seam, and "x" indicates that the base members 11, 21 tore along the seam. In the case of "0", although the base members 11, 21 did not tear along the seam, a portion near the portion to which the predetermined tensile force was applied locally tore off.

As a result of this examination, the following was found. That is, between the cases where the base members 11, 21 tore along the seam and the cases where the base members 11, 21 did not tear along the seam, the tensile force at the start of tearing was substantially the same, but tensile forces necessary for further causing a tear opening were different. That is, in a case where the base members 11, 21 tore along the seam, after the base members 11, 21 started to tear at a position in the seam, a tear opening was continuously caused along the seam by a weak tensile force. On the other hand, in a case where the base members 11, 21 did not tear along the seam, after the base members 11, 21 started to tear at a position in the seam, and then, when a rather strong tensile force was applied, a local tear opening was caused only in a portion near the portion to which the tensile force was applied. Therefore, it can be said that the strength of the base members 11, 21 is low when the base members 11, 21 tear along the seam, and the strength of the base members 11, 21 is high when the base members 11, 21 do not tear along the seam.

Further, in a case where the base members 11, 21 tore along the seam, when the tear opening was widened along the seam, the tear opening advanced, beyond the portion near the center of the side to which the tensile force was applied, up to portions near both ends of the side. On the other hand, in a case where the base members 11, 21 did not tear along the seam, the tear opening remained in the portion near the center of the side to which the tensile force was applied.

Therefore, from the viewpoint of strength of the base members 11, 21 and the viewpoint of the range in which a tear opening of the base members 11, 21 is widened, it can be said that it is preferable that the base members 11, 21 do not tear along the seam.

As shown in the table in FIG. 27B, in the case where the thickness t1, t2 of the base member 11, 21 was 0.5 mm, when the pitch p was not greater than 2.5 mm, the base members 11, 21 tore along the seam. In the case where the thickness t1, t2 of the base member 11, 21 was 1.0 mm, when the pitch p was not greater than 1.0 mm, the base members 11, 21 tore along the seam. In the case where the thickness t1, t2 of the base member 11, 21 was 1.5 mm, when the pitch p was 0.5 mm, the base members 11, 21 tore along the seam.

From the result above, the inventors considered that, in order to prevent the base members 11, 21 from tearing along the seam, both of expressions (1), (2) below need to be satisfied.

$$p \geq 1.5/t1 \quad (1)$$

$$p \geq 1.5/t2 \quad (2)$$

That is, the inventors found that, when both of the above expressions (1), (2) are satisfied, in other words, when, out of the base members 11, 21, the expression of the base member that has a smaller thickness is satisfied, the base members 11, 21 do not tear along the seam. Therefore, in the load sensor 1 of Reference Example 2, the pitch p is set so as to satisfy both of the above expressions (1), (2).

Effects of Reference Example 2

According to Reference Example 2, the following effects are exhibited.

The load sensor 1 according to Reference Example 2 includes:

two base members 11, 12 disposed so as to face each other; and a load detection part 1a disposed so as to be sandwiched between the two base members 11, 12, the two base members 11, 12 are bound to each other by vicinities of outer peripheries thereof being sewn by a thread member 300, and a pitch p between needle holes 41 formed so as to be arranged in one direction through sewing is not less than 1.5 times the reciprocal of the thickness of the base member 11.

Here, similar to Reference Example 1 shown in FIG. 18A to FIG. 22, the load detection part 1a includes:

a plurality of first electrically-conductive elastic bodies 12 each having a band-like shape and formed at a predetermined interval on an opposing face 11a of the base member 11 being one base member;

a plurality of second electrically-conductive elastic bodies 22 each having a band-like shape and formed so as to respectively oppose the plurality of first electrically-conductive elastic bodies 12 on an opposing face 21a of the base member 21 being the other base member;

an electrically-conductive member (copper wire 15a) sandwiched by the plurality of first electrically-conductive elastic bodies 12 and the plurality of second electrically-conductive elastic bodies 22 and extending in a direction in which the electrically-conductive member crosses the first electrically-conductive elastic bodies 12 and the second electrically-conductive elastic bodies 22; and a dielectric body 15b disposed between the electrically-conductive member (copper wire 15a), and each first electrically-conductive elastic body 12 and each second electrically-conductive elastic body 22.

When needle holes 41 are arranged in one direction, depending on the interval between the needle holes 41, a fissure may be caused between needle holes 41 due to a tensile force in a direction of widening the base members 11, 21, and the base members 11, 21 may tear at a portion of the seam. In this regard, in Reference Example 2, as shown in the above expressions (1), (2), the pitch p between the needle holes 41 formed so as to be arranged in one direction through sewing is set to be not less than 1.5 times the reciprocal of the thickness of the base member 11, 21. Therefore, as shown in the examination above, even when a tensile force is applied in a direction of widening the base members 11, 21, the base members 11, 21 are less likely to tear at the portion of the seam. Therefore, the strength of the base members 11, 21 can be increased.

Reference Example 3

In Reference Example 2 above, the seam of the thread member 300 is linearly formed along the outer shape of the base member 11, 21. In contrast to this, in Reference Example 3, as shown in FIG. 28, the seam of the thread member 300 is formed in a meandering manner along the outer shape. In Reference Example 3 as well, the base members 11, 21 are bound to each other by vicinities of the outer peripheries thereof being sewn by the thread member 300. The other configurations of Reference Example 3 are the same as those of Reference Example 2.

FIG. 29A is a plan view of a vicinity of the outer periphery on the Y-axis negative side of the base members 11, 21 in FIG. 28, viewed in the Z-axis negative direction.

Through sewing of the base members 11, 21, needle holes 41, 42 penetrating the base members 11, 21 in the up-down direction (the Z-axis direction) are formed. In the vicinity of the outer periphery of the base member 11, 21, a needle hole row C1 of needle holes 41 linearly arranged along the outer shape, and a needle hole row C2 of needle holes 42 linearly arranged along the outer shape are formed. In FIG. 29A, since the outer shape of the base member 11, 21 extends in the X-axis direction, the needle hole rows C1, C2 extend in the X-axis direction. The needle hole row C1 is formed on the outer side of the needle hole row C2, and the interval between the needle hole row C1 and the needle hole row C2 is w1.

The needle holes 41 are arranged at a constant pitch p along the needle hole row C1 having a linear shape, and the needle holes 42 are arranged at the constant pitch p along the needle hole row C2 having a linear shape. The interval in the direction (in FIG. 29A, the X-axis direction) along the outer shape between a needle hole 41 and a needle hole 42 adjacent to each other is p/2.

FIG. 29B is a B-B' cross-sectional view obtained when the load sensor 1 is cut at an X-Z plane passing through the needle holes 41 in FIG. 29A. In FIG. 29B, the needle thread 302 passing through needle holes 42 positioned on the depth side (the Y-axis positive side) relative to the cut surface is indicated by a broken line.

As shown in FIG. 29B, when viewed in a direction (Y-axis positive direction) perpendicular to the needle hole rows C1, C2, needle holes 41 and needle holes 42 are alternately arranged. In Reference Example 3 as well, the pitch p between adjacent two needle holes 41 and the pitch p between adjacent two needle holes 42 are each set so as to satisfy expressions (1), (2) shown in Reference Example 2 above.

Effects of Reference Example 3

According to Reference Example 3, the following effects are exhibited.

The load sensor 1 according to Reference Example 3 includes:
two base members 11, 21 disposed so as to face each other;
a load detection part 1a disposed so as to be sandwiched by the two base members 11, 21,
the two base members 11, 21 are bound to each other by vicinities of outer peripheries thereof being sewn by a thread member 300,
needle holes 41, 42 formed through sewing are arranged at least in two rows, and
the needle holes 41 in one of the rows are shifted in a direction in which the rows extend, with respect to the needle holes 42 in the other of the rows.

Here, similar to Reference Example 1 shown in FIG. 18A to FIG. 22, the load detection part 1a includes:
a plurality of first electrically-conductive elastic bodies 12 each having a band-like shape and formed at a predetermined interval on an opposing face 11a of the base member 11 being one base member;
a plurality of second electrically-conductive elastic bodies 22 each having a band-like shape and formed so as to respectively oppose the plurality of first electrically-conductive elastic bodies 12 on an opposing face 21a of the base member 21 being the other base member;
an electrically-conductive member (copper wire 15a) sandwiched by the plurality of first electrically-conductive elastic bodies 12 and the plurality of second electrically-conductive elastic bodies 22 and extending in a direction in which the electrically-conductive member crosses the first electrically-conductive elastic bodies 12 and the second electrically-conductive elastic bodies 22; and
a dielectric body 15b disposed between the electrically-conductive member (copper wire 15a), and each first electrically-conductive elastic body 12 and each second electrically-conductive elastic body 22.

In a case where only the needle hole row C1 is provided, and the pitch p between the needle holes 41 is set to be large, as shown in Comparative Example 3 below, close contact between the two base members 11, 21 is weakened in the range between adjacent needle holes 41, and water-resistance performance and dust-resistance performance are decreased.

FIG. 30A is a plan view of a vicinity of the outer periphery on the Y-axis negative side of the base members 11, 21, viewed in the Z-axis negative direction, in Comparative Example 3. In Comparative Example 3, when compared with Reference Example 3, the needle holes 42 are omitted, and only the needle holes 41 are formed. FIG. 30B is a C-C' cross-sectional view obtained when the load sensor 1 is cut at an X-Z plane passing through the needle holes 41 in FIG. 30A. As shown in FIG. 30B, in Comparative Example 3, a gap is generated between the base member 11 and the base member 21 in the vicinity of a middle portion between adjacent needle holes 41. When such a gap is generated, water or dust may enter the inside of the load sensor 1.

In contrast to this, in Reference Example 3, as shown in FIGS. 29A, 29B, the needle holes 41, 42 formed through sewing are arranged in two rows, and the needle holes 42 of the needle hole row C2 are formed so as to be shifted in the direction in which the needle hole rows C1, C2 extend, with respect to the needle holes 41 of the needle hole row C1. Accordingly, lateral portions of the area between adjacent needle holes 41 in the needle hole row C1 are sewn at a needle hole 42 in the needle hole row C2. Therefore, close contact between the lateral portions of the area where close contact is weakened through sewing at needle holes 41 in the needle hole row C1 is enhanced through sewing at a needle hole 42 in the needle hole row C2. Therefore, when sewing is performed at all of the needle holes 41, 42, close contact between the two base members 11, 21 can be enhanced in the entire range. Thus, water-resistance performance and dust-resistance performance of the load sensor 1 can be increased.

The pitch p between the needle holes 41 in the needle hole row C1 and the pitch p between the needle holes 42 in the needle hole row C2 are each set to be not less than 1.5 times the reciprocal of the thickness of the base member 11, 21. Accordingly, as shown in Reference Example 2 above, even when a tensile force is applied in a direction of widening the base members 11, 21, the base members 11, 21 are less likely to tear at the portion of the seam. Therefore, the strength of the base members 11, 21 can be increased. Thus, in Reference Example 3, while water-resistance performance and dust-resistance performance are increased by providing the needle hole rows C1, C2, tearing of the base members 11, 21 can be avoided by setting the pitch p to be large.

In the example in FIG. 29A, the needle holes 41, 42 formed through the sewing are arranged in two rows.

In the example in FIG. 29A, the thread member 300 is alternately passed through the needle holes 41 in one row (the needle hole row C1) and the needle holes 42 in the other row (the needle hole row C2). Accordingly, the two base members 11, 21 can be assuredly bound together through sewing by the thread member 300.

At a lateral portion (the Y-axis positive side) of a middle position between adjacent needle holes 41 in the one row (the needle hole row C1), a needle hole 42 of the other row (the needle hole row C2) is disposed. Accordingly, in a lateral portion at a position where the close contact is weakest due to sewing at needle holes 41 in the needle hole row C1, close contact is enhanced through sewing at a needle hole 42 in the needle hole row C2. Therefore, close contact between the two base members 11, 21 can be more effectively enhanced.

Modification of Reference Example

Various modifications of the configuration of the load sensor 1 can be made in addition to the configurations shown in Reference Examples above.

For example, in Reference Example 3 above, the thread member 300 is sewn to the base member 11, 21 so as to be alternately passed through the needle holes 41 and the needle holes 42. However, sewing by the thread member through the needle holes 41, 42 is not limited thereto, and may be performed as in Modifications 1, 2 below, for example.

FIG. 31A according to Modification 1 is a plan view of a vicinity of the outer periphery on the Y-axis negative side of the base members 11, 21, viewed in the Z-axis negative direction.

In Modification 1 as well, similar to Reference Example 3, needle holes 41, 42 are formed in the base members 11, 21, and needle hole rows C1, C2 are formed. However, in Modification 1, not only the thread member 300 but also a thread member 500 similar to the thread member 300 are used for sewing the base members 11, 21. That is, the thread member includes a first thread member 300 passed through the needle holes 41 of one row (the needle hole row C1), and a second thread member 500 passed through the needle holes 42 of the other row (the needle hole row C2). The thread member 500 includes a bobbin thread 501 and a needle thread 502. In Modification 1, the thread member 300 is sewn only through the needle holes 41, and the thread member 500 is sewn only through the needle holes 42.

In Modification 1 as well, as shown in FIG. 31A, at a lateral portion (the Y-axis positive side) of a middle position between adjacent needle holes 41 in the one row (the needle hole row C1), a needle hole 42 of the other row (the needle hole row C2) is disposed.

FIG. 31B is a D-D' cross-sectional view obtained when the load sensor 1 is cut at an X-Z plane passing through the needle holes 41 in FIG. 31A.

In Modification 1 as well, the needle holes 41 are arranged at the pitch p along the needle hole row C1, and the needle holes 42 are arranged at the pitch p along the needle hole row C2. The pitch p is set so as to satisfy expressions (1), (2) shown in Reference Example 2 above. Accordingly, tearing of the base members 11, 21 along the needle hole rows C1, C2 can be avoided. In Modification 1 as well, similar to Reference Example 3 above, lateral portions of the area between adjacent needle holes 41 in the needle hole row C1 are sewn at a needle hole 42 in the needle hole row C2. Accordingly, close contact of the two base members 11, 21 can be increased. Therefore, water-resistance performance and dust-resistance performance of the load sensor 1 can be increased.

In Modification 1, the thread member 300 passed through the needle holes 41 of the needle hole row C1 and the thread member 500 passed through the needle holes 42 of the needle hole row C2 are used. Therefore, the two base members 11, 21 can be assuredly bound together through sewing by the thread members 300, 500.

FIG. 32A is a plan view of a vicinity of the outer periphery on the Y-axis negative side of the base members 11, 21, viewed in the Z-axis negative direction, according to Modification 2.

In Modification 2 as well, similar to Reference Example 3, needle holes 41, 42 are formed in the base members 11, 21, and needle hole rows C1, C2 are formed. However, in Modification 2, the order in which the thread member 300 is sewn through the needle holes 41, 42 is different from that in Reference Example 3 above. In Modification 2, instead of sewing being alternately performed in a needle hole 41 and a needle hole 42, sewing is performed at consecutive two needle holes 41, and then performed at consecutive two needle holes 42. Accordingly, as shown in FIG. 32A, sewing of the base members 11, 21 is performed such that the thread member 300 extends in a meandering manner. In Modification 2 as well, effects similar to those in Reference Example 3 are exhibited.

In Reference Example 3 above, the needle holes formed through sewing are arranged in two rows, but not limited thereto, may be arranged in three or more rows.

FIG. 32B is a plan view of a vicinity of the outer periphery on the Y-axis negative side of the base members 11, 21, viewed in the Z-axis negative direction, according to Modification 3.

In Modification 3, when compared with Modification 2 above, a needle hole row C3 in which needle holes 43 are arranged is provided in addition to the needle hole rows C1, C2. The needle hole row C3 is provided between the needle hole row C1 and the outer edge of the base member 11, 21, and is parallel to the needle hole rows C1, C2. The positions of the needle holes 41, 42, 43 in the X-axis direction are different from each other. In the X-axis direction, the interval between the needle holes 41, 42, the interval between the needle holes 42, 43, and the interval between the needle holes 43, 41 are each p/3. In Modification 3, not only the thread members 300, 500 but also a thread member 600 similar to the thread members 300, 500 is used for sewing the base members 11, 21. The thread member 600 includes a bobbin thread 601 and needle thread 602, and is sewn only through the needle holes 43.

In Modification 3, the Y-axis positive side and the Y-axis negative side of an area between adjacent needle holes 41 in the needle hole row C1 are respectively sewn at a needle hole 42 of the needle hole row C2 and a needle hole 43 of the needle hole row C3. Accordingly, close contact of lateral portions on both sides of the area where close contact is weakened through sewing at the needle holes 41 can be enhanced through sewing at the needle holes 42, 43. Therefore, water-resistance performance and dust-resistance performance of the load sensor 1 can be further increased.

In the X-axis direction, the interval between the needle holes 41, 42, the interval between the needle holes 42, 43, and the interval between the needle holes 43, 41 need not necessarily be p/3. It is only necessary that the needle holes 42, 43 are positioned so as to be shifted with respect to each other in the X-axis direction, at lateral portions of the areas between the needle holes 41.

In Reference Examples above, the electrically-conductive elastic bodies 12, 22 are formed on the respective opposing faces 11a, 21a by a predetermined printing method. However, not limited thereto, the electrically-conductive elastic bodies 12, 22 may be set to the respective opposing faces 11a, 21a with an adhesive or the like.

In Reference Examples above, the width of each electrically-conductive elastic body 22 on the base member 21 side is set to be shorter than the width of each electrically-conductive elastic body 12 on the base member 11 side. However, not limited thereto, the width of the electrically-conductive elastic body 12 on the base member 11 side may be set to be shorter than the width of the electrically-conductive elastic body 22 on the base member 21 side.

In Reference Example 1 above, the load sensor 1 includes a plurality of covered copper wires 15, but only needs to include at least one covered copper wire 15. For example, the number of covered copper wires 15 included in the load sensor 1 may be one. In Reference Examples 2, 3 above, the load sensor 1 only needs to include at least one electrically-conductive elastic body 12 and at least one covered copper wire 15.

In Reference Examples above, instead of the covered copper wire 15, an electrode composed of an electrically-conductive member having a linear shape and formed from a substance other than copper, and a dielectric body covering the electrically-conductive member may be used. In this case, the electrically-conductive member of the electrode is implemented by, for example: a metal body; a glass body and an electrically-conductive layer formed on the surface thereof; a resin body and an electrically-conductive layer formed on the surface thereof; or the like.

In Reference Examples above, the load sensor 1 may not necessarily have a configuration in which a combination of the covered copper wire 15 and the electrically-conductive elastic body 12 is used, and may have a configuration in which, for example, a dielectric body having an expanding and contracting characteristic is sandwiched between the upper and lower electrodes.

In Reference Examples above, the configuration of the load detection part 1a disposed so as to be sandwiched between the base members 11, 21 shown in FIG. 19B is not limited to the configuration described above.

In the configurations of Reference Examples 2, 3, the configuration of the load detection part 1a need not necessarily be the same as that of Reference Example 1. For example, in Reference Examples 2, 3, the widths in the short direction of the electrically-conductive elastic bodies 12, 22 in the load detection part 1a may be the same. In this case as well, the effect of preventing tearing of the base members 11, 21 in Reference Example 2, and the effect of improving the close contact between the base members 11, 21 in Reference Example 3 can be exhibited.

In Reference Examples 1 to 3 and modifications thereof as well, a conductor wire 13 implemented by a twisted wire may be used, instead of the covered copper wire 15.

In addition to the above, various modifications can be made as appropriate to the embodiments of the present invention without departing from the scope of the technical idea defined by the claims.

What is claimed is:

1. A load sensor comprising:
   a first base member and a second base member disposed so as to face each other;
   an electrically-conductive elastic body disposed on an opposing face of the first base member; and
   a conductor wire disposed between the second base member and the electrically-conductive elastic body, and configured as a plurality of element wires being twisted, wherein
   each element wire is configured as an electrically-conductive member which has a linear shape and of which a surface is covered by a dielectric body, and
   a twist pitch of the plurality of element wires satisfies a conditional expression below p≤12nd
   where parameters in the expression are each defined as follows
   p: the twist pitch of the plurality of element wires,
   n: the number of the element wires included in the conductor wire, and
   d: an outer diameter of each element wire.

2. The load sensor according to claim 1, wherein
   a plurality of the electrically-conductive elastic bodies are disposed at a predetermined interval on the opposing face of the first base member, and
   the conductor wire is disposed so as to cross the plurality of the electrically-conductive elastic bodies.

3. The load sensor according to claim 1, wherein
   the electrically-conductive elastic body has a band-like shape that is long in a direction perpendicular to a direction in which the conductor wire extends, and
   a plurality of the conductor wires are disposed so as to cross the electrically-conductive elastic body.

4. The load sensor according to claim 1, comprising
   another electrically-conductive elastic body disposed so as to oppose the electrically-conductive elastic body, on an opposing face of the second base member, and
   the conductor wire is disposed between the electrically-conductive elastic body and the other electrically-conductive elastic body.

5. The load sensor according to claim 1, wherein
   the conductor wire is disposed in a wave shape in a plane parallel to the first base member and the second base member.

* * * * *